US008612775B2

(12) United States Patent
Kito et al.

(10) Patent No.: US 8,612,775 B2
(45) Date of Patent: Dec. 17, 2013

(54) COMPUTER SYSTEM FOR MANAGING STORAGE AREA STATE OF A STORAGE SYSTEM

(75) Inventors: Daisuke Kito, Machida (JP); Kyoko Mikami, Kawasaki (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1299 days.

(21) Appl. No.: 12/155,356

(22) Filed: Jun. 3, 2008

(65) Prior Publication Data
US 2009/0327757 A1  Dec. 31, 2009

(30) Foreign Application Priority Data
Apr. 8, 2008  (JP) ................................. 2008-100124

(51) Int. Cl.
*G06F 21/00*  (2013.01)
(52) U.S. Cl.
USPC ............................................ 713/193; 726/26
(58) Field of Classification Search
USPC ................. 713/164–167, 182–186; 726/1–30
See application file for complete search history.

(56) References Cited

U.S. PATENT DOCUMENTS

| 7,263,190 | B1* | 8/2007 | Moritz ........................... 380/258 |
| 2003/0070077 | A1* | 4/2003 | Redlich et al. .................. 713/182 |
| 2005/0220305 | A1 | 10/2005 | Fujimoto et al. |
| 2007/0180239 | A1 | 8/2007 | Fujibayashi et al. |
| 2008/0089517 | A1* | 4/2008 | Bianco et al. .................. 380/259 |

FOREIGN PATENT DOCUMENTS

| JP | 2005-322201 | 8/2004 |
| JP | 2007-028502 | 7/2005 |

* cited by examiner

*Primary Examiner* — Fikremariam A Yalew
*Assistant Examiner* — Kendall Dolly
(74) *Attorney, Agent, or Firm* — Stites & Harbison PLLC; Juan Carlos A. Marquez, Esq.; Nicholas B. Trenkle

(57) ABSTRACT

There is provided a computer system, having a host and at least one storage system. The at least one storage system provides storage area includes at least one of an encrypted storage area and a plaintext storage area The at least one storage system is configured to: receive an instruction about what type of storage area is available to the host computer; present the encrypted storage area to the host as an available storage area separate from unavailable storage areas in the case of the type of storage area being available according to the instruction indicating "encrypted"; and present, in the case of the type of storage area being available according to the instruction indicating other than "encrypted", one of both the encrypted storage area and the plaintext storage area to the host computer as available storage areas, and only the plaintext storage area as an available storage area.

20 Claims, 47 Drawing Sheets

LU MANAGEMENT INFORMATION 201

| PORT (WWN) | LU NUMBER (LUN) | CAPACITY | ACCESS-GRANTED COMPUTER (WWN) | STATE (ENCRYPTED/PLAINTEXT) | KEY ID | CONSTITUENT LDEV |
|---|---|---|---|---|---|---|
| CLA1 (FF:00:00:00 : 00:00:00:FF) | 000 | 100GB | 10:00:00:00: 00:00:00:70 | ENCRYPTED | 1 | LDEV 1 |
| | 001 | 100GB | 10:00:00:00: 00:00:00:70 | ENCRYPTED | 1 | LDEV 2 |
| | 002 | 100GB | | ENCRYPTED | 1 | LDEV 5 |
| ... | ... | ... | ... | ... | ... | ... |

LDEV MANAGEMENT INFORMATION 202

| LDEV NUMBER | STATE (ENCRYPTED/PLAINTEXT) | AFFILIATION RAID GROUP |
|---|---|---|
| 1 | ENCRYPTED | 1 |
| 2 | ENCRYPTED | 1 |
| ... | ... | ... |
| 22 | PLAINTEXT | 2 |
| 23 | PLAINTEXT | 2 |
| ... | ... | ... |

PHYSICAL DISK MANAGEMENT INFORMATION 203

| 501 | 502 | 503 | 504 | 505 | 506 |
|---|---|---|---|---|---|
| DISK NUMBER | CAPACITY | RAID | RAID GROUP | STATE (ENCRYPTED/ PLAINTEXT) | ENCRYPTION KEY |
| 001 | 200GB | 5 | 1 | ENCRYPTED | 1 |
| 002 | 200GB | 5 | 1 | ENCRYPTED | 1 |
| 003 | 200GB | 5 | 1 | ENCRYPTED | 1 |
| 004 | 200GB | 5 | 1 | ENCRYPTED | 1 |
| 005 | 200GB | 5 | 1 | ENCRYPTED | 1 |
| 006 | 500GB | 1 | 2 | PLAINTEXT |  |
| ... | ... | ... | ... | ... | ... |

FIG. 5

ENCRYPTION KEY MANAGEMENT INFORMATION 204

| 601 | 602 | 603 | 604 |
|---|---|---|---|
| KEY ID | KEY DATA | KEY LENGTH | ALGORITHM |
| 1 | O35tuobdg5j6ki... | 256 | AES-ECB |
| 2 | l0cc-ai0-ci0ags... | 256 | AES-ECB |
| 3 | 052pgrmkg3jp9... | 128 | AES-ECB |
| 4 | 0jfwi0fwj9ew09... | 128 | AES-ECB |
| 5 | 65p54m13lp5kl... | 128 | AES-CBC |
| ... | ... | ... | ... |

FIG. 6

VOL CORRELATION MANAGEMENT INFORMATION 205

| FUNCTION | TYPE | NUMBER | ASSOCIATED LU (PORT-LUN) | STATE (ENCRYPTED/ PLAINTEXT/MIXED) | CORRELATED VOL AND POOL |
|---|---|---|---|---|---|
| COPY | P-VOL | 1 | CLA1-000 | ENCRYPTED | S-VOL1 IN COPY |
| | | ... | ... | ... | ... |
| | S-VOL | 1 | CLA3-000 | ENCRYPTED | P-VOL 1 IN COPY |
| | | ... | ... | ... | ... |
| SNAPSHOT | P-VOL | 1 | CLA1-001 | ENCRYPTED | S-VOL 1, POOL 1 IN SNAPSHOT |
| | | 2 | CLA1-002 | ENCRYPTED | S-VOL 2, POOL 2 IN SNAPSHOT |
| | | ... | ... | ... | ... |
| | S-VOL | 1 | CLA3-005 | ENCRYPTED | S-VOL1, POOL 1 IN SNAPSHOT |
| | | 2 | CLA3-006 | MIXED | S-VOL 2, POOL 2 IN SNAPSHOT |
| | | ... | ... | ... | ... |
| | POOL | 1 | CLA5-001, CLA5-002, CLA5-003 | ENCRYPTED | S-VOL 1, POOL 1 IN SNAPSHOT |
| | | 2 | CLA5-004, CLA5-005 | PLAINTEXT | S-VOL 2, POOL 2 IN SNAPSHOT |
| | | ... | ... | ... | ... |
| CAPACITY EXPANSION | P-VOL | 1 | CLA1-010, CLA1-011 | ENCRYPTED | |
| | | 2 | CLA1-012, CLA1-013 | MIXED | |
| | | ... | ... | ... | ... |
| ... | ... | ... | ... | ... | ... |

*FIG. 7A*

VOL CORRELATION MANAGEMENT INFORMATION 205

| FUNCTION | TYPE | NUMBER | ASSOCIATED LU (PORT-LUN) | STATE (ENCRYPTED/ PLAINTEXT/ MIXED) | CORRELATED VOL AND POOL | CASCADE FLAG (GROUP-LAYER) |
|---|---|---|---|---|---|---|
| COPY | P-VOL | 1 | CLA1-000 | ENCRYPTED | S-VOL 1 IN COPY | A-1 |
| | | ... | ... | ... | ... | |
| | S-VOL | 1 | CLA3-000 | ENCRYPTED | P-VOL 1 IN COPY | A-1 |
| | | ... | ... | ... | ... | |
| SNAPSHOT | P-VOL | 1 | CLA1-001 | ENCRYPTED | S-VOL 1, POOL 1 IN SNAPSHOT | |
| | | 2 | CLA1-002 | ENCRYPTED | S-VOL 2, POOL 2 IN SNAPSHOT | |
| | | ... | ... | ... | ... | |
| | S-VOL | 1 | CLA3-005 | ENCRYPTED | S-VOL 1, POOL 1 IN SNAPSHOT | |
| | | 2 | CLA3-006 | MIXED | S-VOL 2, POOL 2 IN SNAPSHOT | |
| | | ... | ... | ... | ... | |
| | POOL | 1 | CLA5-001, CLA5-002, CLA5-003 | ENCRYPTED | S-VOL 1, POOL 1 IN SNAPSHOT | |
| | | 2 | CLA5-004, CLA5-005 | PLAINTEXT | S-VOL 2, POOL 2 IN SNAPSHOT | |
| | | ... | ... | ... | ... | |
| CAPACITY EXPANSION | P-VOL | 1 | CLA1-010, CLA1-011 | ENCRYPTED | | |
| | | 2 | CLA1-012, CLA1-013 | MIXED | | |
| | | ... | ... | ... | ... | |
| ... | ... | ... | ... | ... | ... | ... |

*FIG. 7B*

VOL TYPE MANAGEMENT INFORMATION 206

| FUNCTION | PRIMARY VOL | SECONDARY VOL | SUBSIDIARY VOL (AREA) |
|---|---|---|---|
| COPY | P-VOL | S-VOL | |
| REMOTE COPY | P-VOL | S-VOL(EXT) | |
| SNAPSHOT | P-VOL | S-VOL | POOL |
| FULL COPY | P-VOL | S-VOL(EXT) | JNL-VOL, JNL-VOL(EXT) |
| CAPACITY EXPANSION | P-VOL | | |
| DYNAMIC CAPACITY ALLOCATION | | | POOL |
| ... | ... | ... | ... |

*FIG. 8*

ADMINISTRATOR AUTHENTICATION INFORMATION 242

| USER ID | PASSWORD | ROLE |
|---|---|---|
| aaa | Abiec ... | SECURITY ADMINISTRATOR |
| bbb | 39ivjpa ... | STORAGE ADMINISTRATOR |
| 10001 | Dpfapo ... | ACCOUNT ADMINISTRATOR |
| ... | ... | ... |

*FIG. 9*

MIXING ALLOWING/FORBIDDING SETTING WINDOW

1101

MANAGEMENT WINDOW

1102

| # | MIXING ALLOWING/FORBIDDING SETTINGS IN VOL OR POOL |
|---|---|
| 1 | ☑ ALLOW MIXED STATE (ISSUE ALERT). |
| 2 | ☐ ENCRYPT ENTIRE VOL WHEN MIXED STATE ARISES. |
| 3 | ☐ FORBID MIXED STATE. |

1103

| # | MIXING ALLOWING/FORBIDDING SETTINGS BETWEEN CORRELATED VOLS OR POOLS |
|---|---|
| 1 | ☑ FORBID SUBSIDIARY VOL AND SECONDARY VOL TO BE IN PLAINTEXT/MIXED STATE WHILE PRIMARY VOL IS IN ENCRYPTED STATE. |
| 2 | ☐ CHANGE SUBSIDIARY VOL AND SECONDARY VOL FROM PLAINTEXT/MIXED STATE TO ENCRYPTED STATE WHILE PRIMARY VOL IS IN ENCRYPTED STATE. |
| 3 | ☐ ISSUE ALERT AND PERMIT OPERATION WHILE SUBSIDIARY VOL AND SECONDARY VOL ARE IN PLAINTEXT/MIXED STATE AND PRIMARY VOL IS IN ENCRYPTED STATE. |
| 4 | ☑ ALLOW SUBSIDIARY VOL AND SECONDARY VOL TO BE IN ENCRYPTED/MIXED/PLAINTEXT STATE WHILE PRIMARY VOL IS IN PLAINTEXT STATE |
| 5 | ☐ ALLOW SUBSIDIARY VOL AND SECONDARY VOL TO BE ONLY IN MIXED/PLAINTEXT STATE WHILE PRIMARY VOL IS IN PLAINTEXT STATE. |
| 6 | ☐ SET SUBSIDIARY VOL AND SECONDARY VOL TO PLAINTEXT STATE WITHOUT EXCEPTION WHILE PRIMARY VOL IS IN PLAINTEXT STATE. |
| 7 | ☑ ALLOW SUBSIDIARY VOL AND SECONDARY VOL TO BE IN ENCRYPTED/MIXED/PLAINTEXT STATE WHILE PRIMARY VOL IS IN MIXED STATE. |
| 8 | ☐ ALLOW SUBSIDIARY VOL AND SECONDARY VOL TO BE ONLY IN MIXED/PLAINTEXT STATE WHILE PRIMARY VOL IS IN MIXED STATE. |
| 9 | ☐ SET SUBSIDIARY VOL AND SECONDARY VOL TO MIXED STATE WITHOUT EXCEPTION WHILE PRIMARY VOL IS IN MIXED STATE. |

1104    1105

[ OK ]   [ CANCEL ]

*FIG. 11A*

MIXING ALLOWING/FORBIDDING SETTING WINDOW

1111

| MANAGEMENT WINDOW | |
|---|---|

1112

| # | MIXING ALLOWING/FORBIDDING SETTINGS IN POOL |
|---|---|
| 1 | ☐ ALLOW MIXED STATE (ISSUE ALERT). |
| 2 | ☐ SET ENTIRE VOL TO ENCRYPTED STATE WHEN MIXED STATE ARISES. |
| 3 | ☑ FORBID MIXED STATE. |

| # | MIXING ALLOWING/FORBIDDING SETTINGS IN CAPACITY EXPANSION |
|---|---|
| 4 | ☑ ALLOW MIXED STATE (ISSUE ALERT). |
| 5 | ☐ SET ENTIRE VOL TO ENCRYPTED STATE WHEN MIXED STATE ARISES. |
| 6 | ☐ FORBID MIXED STATE. |

1113

| # | SETTINGS OF STATE CONSISTENCY/INCONSISTENCY BETWEEN CORRELATED VOLS OR POOLS |
|---|---|
| 1 | ☑ ALLOW STATE INCONSISTENCY BETWEEN PRIMARY VOL AND SECONDARY AND SUBSIDIARY VOLS. |
| 2 | ☐ FORBID STATE INCONSISTENCY BETWEEN PRIMARY VOL AND SECONDARY AND SUBSIDIARY VOLS. |

1114   1115

| OK | | CANCEL |

FIG. 11B

MIXING ALLOWING/FORBIDDING SETTING WINDOW 1121

MANAGEMENT WINDOW

1122 MANAGEMENT FUNCTION
- COPY
- SNAPSHOT
- CAPACITY EXPANSION

1123 SETTING FUNCTION
- ENCRYPTION SETTING
- MIXING ALLOWING/ FORBIDDING SETTING

1124

| # | MIXING ALLOWING/FORBIDDING SETTINGS IN P-VOL |
|---|---|
| 1 | ☑ ALLOW MIXED STATE (ISSUE ALERT). |
| 2 | ☐ SET ENTIRE VOL TO ENCRYPTED STATE WHEN MIXED STATE ARISES. |
| 3 | ☐ FORBID MIXED STATE |

| # | MIXING ALLOWING/FORBIDDING SETTINGS IN S-VOL |
|---|---|
| 4 | ☑ ALLOW MIXED STATE (ISSUE ALERT). |
| 5 | ☐ SET ENTIRE VOL TO ENCRYPTED STATE WHEN MIXED STATE ARISES. |
| 6 | ☐ FORBID MIXED STATE |

1125

| # | MIXING ALLOWING/FORBIDDING SETTINGS BETWEEN CORRELATED VOLS OR POOLS |
|---|---|
| 1 | ☑ FORBID S-VOL TO BE IN PLAINTEXT/MIXED STATE WHILE P-VOL IS IN ENCRYPTED STATE. |
| 2 | ☐ SET S-VOL TO ENCRYPTED STATE WHILE P-VOL IS IN ENCRYPTED STATE. |
| 3 | ☐ ISSUE ALERT AND PERMIT OPERATION WHILE S-VOL IS IN PLAINTEXT/MIXED STATE AND P-VOL IS IN ENCRYPTED STATE. |
| 4 | ☑ ALLOW S-VOL TO BE IN ENCRYPTED/MIXED/PLAINTEXT STATE WHILE P-VOL IS IN PLAINTEXT STATE. |
| 5 | ☐ ALLOW S-VOL TO BE ONLY IN MIXED/PLAINTEXT STATE WHILE P-VOL IS IN PLAINTEXT STATE. |
| 6 | ☐ SET S-VOL TO PLAINTEXT STATE WITHOUT EXCEPTION WHILE P-VOL IS IN PLAINTEXT STATE. |
| 7 | ☑ ALLOW S-VOL TO BE IN ENCRYPTED/MIXED/PLAINTEXT STATE WHILE P-VOL IS IN MIXED STATE. |
| 8 | ☐ ALLOW S-VOL TO BE ONLY IN MIXED/PLAINTEXT STATE WHILE P-VOL IS IN MIXED STATE. |
| 9 | ☐ SET S-VOL TO MIXED STATE WITHOUT EXCEPTION WHILE P-VOL IS IN MIXED STATE. |

1126 OK  1127 CANCEL

*FIG. 11C*

MIXING ALLOWING/FORBIDDING SETTING WINDOW  1131

| 1132 | MANAGEMENT WINDOW 1134 | |
|---|---|---|
| MANAGEMENT FUNCTION | MIXING AND CONSISTENCY/INCONSISTENCY ALLOWING/FORBIDDING SETTINGS | |
| COPY | # | ALLOWING/FORBIDDING SETTINGS OF STATE CONSISTENCY/INCONSISTENCY BETWEEN P-VOL AND S-VOL |
| | 1 | ☑ ALLOW STATE INCONSISTENCY BETWEEN P-VOL AND S-VOL. |
| | 2 | ☐ FORBID STATE INCONSISTENCY BETWEEN P-VOL AND S-VOL. |
| SNAPSHOT | # | MIXING ALLOWING/FORBIDDING SETTINGS IN POOL |
| | 1 | ☑ ALLOW MIXED STATE (ISSUE ALERT). |
| | 2 | ☐ SET ENTIRE VOL TO ENCRYPTED STATE WHEN MIXED STATE ARISES. |
| | 3 | ☐ FORBID MIXED STATE. |
| | # | ALLOWING/FORBIDDING SETTINGS OF STATE CONSISTENCY/INCONSISTENCY BETWEEN POOL AND P-VOL |
| | 4 | ☑ ALLOW STATE CONSISTENCY/INCONSISTENCY BETWEEN POOL AND P-VOL. |
| | 5 | ☐ FORBID STATE CONSISTENCY/INCONSISTENCY BETWEEN POOL AND P-VOL. |
| CAPACITY EXPANSION | # | MIXING ALLOWING/FORBIDDING SETTINGS IN CAPACITY EXPANSION |
| | 1 | ☑ ALLOW MIXED STATE (ISSUE ALERT). |
| | 2 | ☐ ENCRYPT ENTIRE VOL WHEN MIXED STATE ARISES. |
| | 3 | ☐ FORBID MIXED STATE. |
| 1133 SETTING FUNCTION | | |
| ENCRYPTION SETTING | 1135 OK | 1136 CANCEL |
| MIXING ALLOWING/ FORBIDDING SETTING | | |

*FIG. 11D*

MIXING ALLOWING/FORBIDDING SETTINGS INFORMATION 207

| MIXING ALLOWING/FORBIDDING SETTINGS IN VOL OR POOL (1201) | MIXING ALLOWING/FORBIDDING SETTINGS BETWEEN CORRELATED VOLS OR POOLS (1202) |
|---|---|
| 1 | 1, 4, 7 |

FIG. 12A

MIXING ALLOWING/FORBIDDING SETTINGS INFORMATION 207

| MIXING ALLOWING/FORBIDDING SETTINGS IN POOL OR CAPACITY EXPANSION (1211) | MIXING ALLOWING/FORBIDDING SETTINGS BETWEEN CORRELATED VOLS OR POOLS (1212) |
|---|---|
| 1, 4 | 1 |

FIG. 12B

MIXING ALLOWING/FORBIDDING SETTINGS INFORMATION 207

| MANAGEMENT FUNCTION | MIXING ALLOWING/FORBIDDING SETTINGS IN VOL OR POOL | MIXING ALLOWING/FORBIDDING SETTINGS BETWEEN CORRELATED VOLS OR POOLS |
|---|---|---|
| COPY | 1, 4 | 1, 4, 7 |
| SNAPSHOT | 1, 4, 7 | 1, 4, 7 |
| ... | ... | |

MIXING ALLOWING/FORBIDDING SETTINGS INFORMATION 207

| MANAGEMENT FUNCTION | MIXING AND CONSISTENCY/INCONSISTENCY ALLOWING/FORBIDDING SETTINGS |
|---|---|
| COPY | 1 |
| SNAPSHOT | 1, 4 |
| ... | ... |

STORAGE MANAGEMENT/STATE DISPLAY WINDOW

| MANAGEMENT WINDOW | | | | |
|---|---|---|---|---|
| MANAGEMENT FUNCTION | # | COMPUTER (WWN) | IP ADDRESS | AVAILABLE VOL |
| COPY | 1 | 10:00:00:00:00:00:00:50 | 10.10.10.1 | ENCRYPTED |
| SNAPSHOT | 2 | 10:00:00:00:00:00:00:70 | 10.10.10.5 | PLAINTEXT |
| CAPACITY EXPANSION | | | | |
| DYNAMIC CAPACITY ALLOCATION | | | | |
| SETTING FUNCTION | ☑ AVAILABLE VOL : | | ENCRYPTED ▼ | |
| ENCRYPTION SETTING | | | | |
| MIXING ALLOWING/ FORBIDDING SETTING | OK | | CANCEL | |

AVAILABLE VOL MANAGEMENT INFORMATION 208

1401

| AVAILABLE VOL |
|---|
| ENCRYPTED |

FIG. 14

COPY FUNCTION
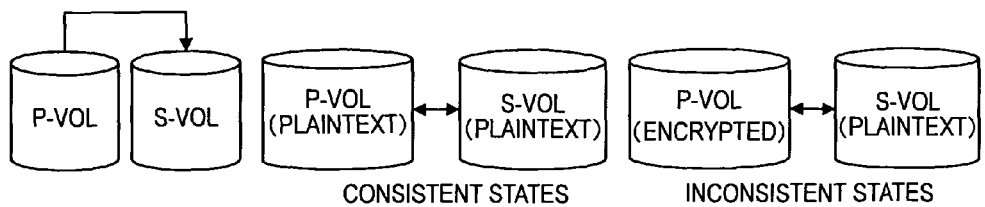
FIG. 22A
SNAPSHOT FUNCTION
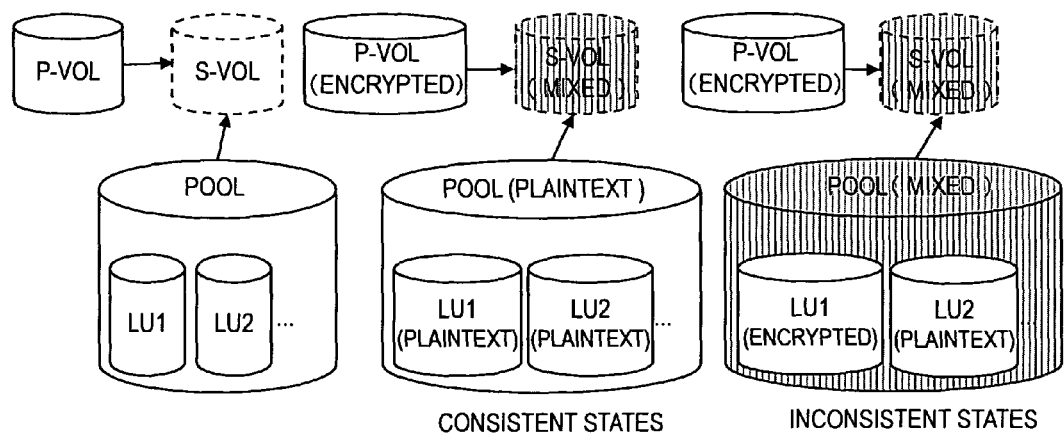
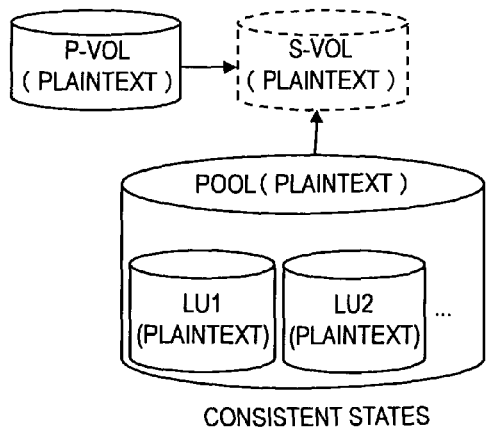
FIG. 22B

LU MANAGEMENT INFORMATION (INCLUDING PROTECTION ATTRIBUTE) 201

| PORT (WWN) 2701 | LU NUMBER (LUN) 2702 | CAPACITY 2703 | ACCESS GRANTED COMPUTER (WWN) 2704 | STATE (ENCRYPTED/ PLAINTEXT) 2705 | KEY ID 2706 | CONSTITUENT LDEV 2707 | PROTECTION ATTRIBUTE 2708 |
|---|---|---|---|---|---|---|---|
| CLA1 (FF:00:00:00: 00:00:00:FF) | 000 | 100GB | 10:00:00:00: 00:00:00:70 | ENCRYPTED | 1 | LDEV 1 | ATTACHED |
| | 001 | 100GB | 10:00:00:00: 00:00:00:70 | ENCRYPTED | 1 | LDEV 2 | ATTACHED |
| | 002 | 100GB | | ENCRYPTED | 1 | LDEV 5 | NOT ATTACHED |
| ... | | | | | | | |

FIG. 27

MIXING ALLOWING/FORBIDDING SETTING WINDOW 2901

MANAGEMENT WINDOW

2902

| # | MIXING ALLOWING/FORBIDDING SETTINGS IN VOL OR POOL |
|---|---|
| 1 | ☑ ALLOW MIXED STATE (ISSUE ALERT). |
| 2 | ☐ SET ENTIRE VOL TO ENCRYPTED STATE WHEN MIXED STATE ARISES. |
| 3 | ☐ FORBID MIXED STATE. |
| 4 | ☑ SET ENTIRE VOL TO ENCRYPTED STATE UPON ATTACHMENT OF PROTECTION ATTRIBUTE. FORBID OPERATION THAT SETS TO PLAINTEXT/MIXED STATE WHILE PROTECTION ATTRIBUTE IS ATTACHED (THIS OVERRIDES OTHER SETTINGS). |
| 5 | ☐ SET ENTIRE VOL TO ENCRYPTED STATE WHEN OR WHILE PROTECTION ATTRIBUTE IS ATTACHED (THIS OVERRIDES OTHER SETTINGS). |
| 6 | ☐ PROTECTION ATTRIBUTE CAN BE ATTACHED ONLY TO ENCRYPTED STATE VOL. FORBID OPERATION THAT SETS TO PLAINTEXT/MIXED STATE WHILE PROTECTION ATTRIBUTE IS ATTACHED (THIS OVERRIDES OTHER SETTINGS). |

2903

| # | MIXING ALLOWING/FORBIDDING SETTINGS BETWEEN CORRELATED VOLS OR POOLS |
|---|---|
| 1 | ☑ FORBID SUBSIDIARY VOL AND SECONDARY VOL TO BE IN PLAINTEXT/MIXED STATE WHILE PRIMARY VOL IS IN ENCRYPTED STATE. |
| 2 | ☐ SET SUBSIDIARY VOL AND SECONDARY VOL TO ENCRYPTED STATE WHILE PRIMARY VOL IS IN ENCRYPTED STATE. |
| 3 | ☐ ISSUE ALERT AND PERMIT OPERATION WHILE SUBSIDIARY VOL AND SECONDARY VOL ARE IN PLAINTEXT/MIXED STATE AND PRIMARY VOL IS IN ENCRYPTED STATE. |
| 4 | ☑ ALLOW SUBSIDIARY VOL AND SECONDARY VOL TO BE IN ENCRYPTED/MIXED/PLAINTEXT STATE WHILE PRIMARY VOL IS IN PLAINTEXT STATE. |
| 5 | ☐ ALLOW SUBSIDIARY VOL AND SECONDARY VOL TO BE ONLY IN MIXED/PLAINTEXT STATE WHILE PRIMARY VOL IS IN PLAINTEXT STATE. |
| 6 | ☐ SET SUBSIDIARY VOL AND SECONDARY VOL TO PLAINTEXT STATE WITHOUT EXCEPTION WHILE PRIMARY VOL IS IN PLAINTEXT STATE. |
| 7 | ☑ ALLOW SUBSIDIARY VOL AND SECONDARY VOL TO BE IN ENCRYPTED/MIXED/PLAINTEXT STATE WHILE PRIMARY VOL IS IN MIXED STATE. |
| 8 | ☐ ALLOW SUBSIDIARY VOL AND SECONDARY VOL TO BE ONLY IN MIXED/PLAINTEXT STATE WHILE PRIMARY VOL IS IN MIXED STATE. |
| 9 | ☐ SET SUBSIDIARY VOL AND SECONDARY VOL TO MIXED STATE WITHOUT EXCEPTION WHILE PRIMARY VOL IS IN MIXED STATE. |
| 10 | ☑ SET PRIMARY VOL, SUBSIDIARY VOL, AND SECONDARY VOL TO ENCRYPTED STATE WHEN OR WHILE PROTECTION ATTRIBUTE IS ATTACHED TO PRIMARY VOL. |
| 11 | ☐ SET PRIMARY VOL, SUBSIDIARY VOL, AND SECONDARY VOL TO ENCRYPTED STATE WHEN OR WHILE PROTECTION ATTRIBUTE IS ATTACHED TO PRIMARY VOL. ATTACH PROTECTION ATTRIBUTE ALSO TO SUBSIDIARY VOL AND SECONDARY VOL. |
| 12 | ☐ DISPLAY ERROR MESSAGE WHEN OR WHILE PROTECTION ATTRIBUTE IS ATTACHED TO PRIMARY VOL AND SUBSIDIARY VOL AND SECONDARY VOL ARE IN PLAINTEXT/MIXED STATE. |
| 13 | ☑ SET ALL CORRELATED SUBSIDIARY AND SECONDARY VOLS TO ENCRYPTED STATE, OVERRIDING OTHER SETTING, WHEN OR WHILE PROTECTION ATTRIBUTE IS NOT ATTACHED TO PRIMARY VOL BUT IS ATTACHED TO OTHER VOLS THAN SUBSIDIARY AND SECONDARY VOLS. |
| 14 | ☐ ATTACH PROTECTION ATTRIBUTE TO ALL CORRELATED VOLS AND POOLS AND SET THEM TO ENCRYPTED STATE, OVERRIDING OTHER SETTINGS, WHEN OR WHILE PROTECTION ATTRIBUTE IS NOT ATTACHED TO PRIMARY VOL BUT IS ATTACHED TO OTHER VOLS THAN SUBSIDIARY AND SECONDARY VOLS. |
| 15 | ☐ FORBID ATTACHING PROTECTION ATTRIBUTE TO OTHER VOLS THAN SUBSIDIARY AND SECONDARY VOLS, OR FORBID OTHER VOLS THAN SUBSIDIARY AND SECONDARY VOLS FROM KEEPING PROTECTION ATTRIBUTE WHILE PROTECTION ATTRIBUTE IS NOT ATTACHED TO PRIMARY VOL. |

2904 [ OK ]   [ CANCEL ] 2905

FIG. 29A

MIXING ALLOWING/FORBIDDING SETTING WINDOW

| | MANAGEMENT WINDOW |
|---|---|
| # | MIXING ALLOWING/FORBIDDING SETTING IN POOL |
| 1 | ☐ ALLOW MIXED STATE (ISSUE ALERT). |
| 2 | ☑ SET ENTIRE VOL TO ENCRYPTED STATE WHEN MIXED STATE ARISES. |
| 3 | ☐ FORBID MIXED STATE. |
| # | MIXING ALLOWING/FORBIDDING SETTING IN CAPACITY EXPANSION |
| 4 | ☑ ALLOW MIXED STATE (ISSUE ALERT). |
| 5 | ☐ SET ENTIRE VOL TO ENCRYPTED STATE WHEN MIXED STATE ARISES. |
| 6 | ☐ FORBID MIXED STATE. |

2911 / 2912 / 2913

| # | STATE CONSISTENCY/INCONSISTENCY ALLOWING/FORBIDDING SETTINGS BETWEEN CORRELATED VOLS OR POOLS |
|---|---|
| 1 | ☑ ALLOW STATE INCONSISTENCY BETWEEN PRIMARY VOL AND SECONDARY AND SUBSIDIARY VOLS. |
| 2 | ☐ FORBID STATE INCONSISTENCY BETWEEN PRIMARY VOL AND SECONDARY AND SUBSIDIARY VOLS. |

2914

| # | PROTECTION SETTINGS |
|---|---|
| 1 | ☐ SET OWN VOL AND ALL RELEVANT VOLS TO ENCRYPTED STATE WHEN OR WHILE PROTECTION ATTRIBUTE IS ATTACHED. |
| 2 | ☐ ATTACH PROTECTION ATTRIBUTE TO OWN VOL AND ALL RELEVANT VOLS AND SET THEM TO ENCRYPTED STATE WHEN OR WHILE PROTECTION ATTRIBUTE IS ATTACHED. |
| 3 | ☑ DISPLAY ERROR MESSAGE WHEN OR WHILE PROTECTION ATTRIBUTE IS ATTACHED AND NOT ALL OF OWN VOL AND RELEVANT VOLS ARE IN ENCRYPTED STATE. |

2915  2916
[OK]  [CANCEL]

FIG. 29B

MIXING-ALLOWING/FORBIDDING SETTING WINDOW

MANAGEMENT WINDOW — 2921

2922 — MANAGEMENT FUNCTION
- COPY
- SNAPSHOT
- CAPACITY EXPANSION

2923 — SETTING FUNCTION
- ENCRYPTION SETTING
- MIXING ALLOWING/ FORBIDDING SETTING

2924

| # | MIXING ALLOWING/FORBIDDING SETTINGS IN P-VOL |
|---|---|
| 1 | ☑ ALLOW MIXED STATE (ISSUE ALERT). |
| 2 | ☐ ENCRYPT ENTIRE VOL WHEN MIXED STATE ARISES. |
| 3 | ☐ FORBID MIXED STATE. |

| # | MIXING ALLOWING/FORBIDDING SETTINGS IN S-VOL |
|---|---|
| 4 | ☑ ALLOW MIXED STATE (ISSUE ALERT). |
| 5 | ☐ ENCRYPT ENTIRE VOL WHEN MIXED STATE ARISES. |
| 6 | ☐ FORBID MIXED STATE. |

2925

| # | MIXING ALLOWING/FORBIDDING SETTINGS BETWEEN CORRELATED VOLS OR POOLS |
|---|---|
| 1 | ☑ FORBID S-VOL TO BE IN PLAINTEXT/MIXED STATE WHILE P-VOL IS IN ENCRYPTED STATE. |
| 2 | ☐ SET S-VOL TO ENCRYPTED STATE WHILE P-VOL IS IN ENCRYPTED STATE. |
| 3 | ☐ ISSUE ALERT AND PERMIT OPERATION WHILE S-VOL IS IN PLAINTEXT/MIXED STATE AND P-VOL IS IN ENCRYPTED STATE. |
| 4 | ☑ ALLOW S-VOL TO BE IN ENCRYPTED/MIXED/PLAINTEXT STATE WHILE P-VOL IS IN PLAINTEXT STATE. |
| 5 | ☐ ALLOW S-VOL TO BE ONLY IN MIXED/PLAINTEXT STATE WHILE P-VOL IS IN PLAINTEXT STATE. |
| 6 | ☐ SET S-VOL TO PLAINTEXT STATE WITHOUT EXCEPTION WHILE P-VOL IS IN PLAINTEXT STATE. |
| 7 | ☐ ALLOW S-VOL TO BE IN ENCRYPTED/MIXED/PLAINTEXT STATE WHILE P-VOL IS IN MIXED STATE. |
| 8 | ☐ ALLOW S-VOL TO BE ONLY IN MIXED/PLAINTEXT STATE WHILE P-VOL IS IN MIXED STATE. |
| 9 | ☐ SET S-VOL TO MIXED STATE WITHOUT EXCEPTION WHILE P-VOL IS IN MIXED STATE |
| 10 | ☑ SET P-VOL AND S-VOL TO ENCRYPTED STATE WHEN OR WHILE PROTECTION ATTRIBUTE IS ATTACHED TO P-VOL. |
| 11 | ☐ SET P-VOL AND S-VOL TO ENCRYPTED STATE WHEN OR WHILE PROTECTION ATTRIBUTE IS ATTACHED TO P-VOL. ATTACH PROTECTION ATTRIBUTE ALSO TO S-VOL. |
| 12 | ☐ DISPLAY ERROR MESSAGE WHEN OR WHILE PROTECTION ATTRIBUTE IS ATTACHED TO P-VOL AND S-VOL IS IN PLAINTEXT/MIXED STATE. |
| 13 | ☑ SET ALL CORRELATED VOLS TO ENCRYPTED STATE, OVERRIDING OTHER SETTINGS, WHEN OR WHILE PROTECTION ATTRIBUTE IS NOT ATTACHED TO P-VOL BUT IS ATTACHED TO OTHER VOLS THAN P-VOL. |
| 14 | ☐ ATTACH PROTECTION ATTRIBUTE TO ALL CORRELATED VOLS AND SET THEM TO ENCRYPTED STATE, OVERRIDING OTHER SETTINGS, WHEN OR WHILE PROTECTION ATTRIBUTE IS NOT ATTACHED TO P-VOL BUT IS ATTACHED TO OTHER VOLS THAN P-VOL. |
| 15 | ☐ FORBID ATTACHING PROTECTION ATTRIBUTE TO OTHER VOLS THAN P-VOL, OR FORBID OTHER VOLS THAN P-VOL FROM KEEPING PROTECTION ATTRIBUTE WHILE PROTECTION ATTRIBUTE IS NOT ATTACHED TO P-VOL. |

2926 — OK    CANCEL — 2927

FIG. 29C

MIXING ALLOWING/FORBIDDING SETTING WINDOW

| MANAGEMENT FUNCTION | MIXING AND CONSISTENCY/INCONSISTENCY ALLOWING/FORBIDDING SETTINGS | | PROTECTION SETTINGS | |
|---|---|---|---|---|
| COPY | # | ALLOWING/FORBIDDING SETTINGS OF STATE CONSISTENCY/INCONSISTENCY BETWEEN P-VOL AND S-VOL | # | PROTECTION SETTINGS |
| | 1 | ☑ ALLOW STATE INCONSISTENCY BETWEEN P-VOL AND S-VOL. | 1 | ☑ SET OWN VOL AND ALL RELEVANT VOLS TO ENCRYPTED STATE WHEN OR WHILE PROTECTION ATTRIBUTE IS ATTACHED. |
| | 2 | ☐ FORBID STATE INCONSISTENCY BETWEEN P-VOL AND S-VOL. | 2 | ☐ ATTACH PROTECTION ATTRIBUTE TO OWN VOL AND ALL RELEVANT VOLS AND SET THEM TO ENCRYPTED STATE WHEN OR WHILE PROTECTION ATTRIBUTE IS ATTACHED. |
| SNAPSHOT | # | MIXING ALLOWING/FORBIDDING SETTINGS IN POOL | 3 | ☐ DISPLAY ERROR MESSAGE WHEN OR WHILE PROTECTION ATTRIBUTE IS ATTACHED AND NOT ALL OF RELEVANT VOLS ARE IN ENCRYPTED STATE. |
| | 1 | ☑ ALLOW MIXED STATE (ISSUE ALERT). | | |
| | 2 | ☐ SET ENTIRE VOL ENCRYPTED STATE WHEN MIXED STATE ARISES. | | |
| | 3 | ☐ FORBID MIXED STATE. | | |
| | # | SETTINGS OF STATE CONSISTENCY/INCONSISTENCY BETWEEN POOL AND P-VOL | | |
| | 4 | ☑ ALLOW STATE INCONSISTENCY BETWEEN POOL AND P-VOL. | | |
| | 5 | ☐ FORBID STATE INCONSISTENCY BETWEEN POOL AND P-VOL. | | |
| CAPACITY EXPANSION | # | MIXING ALLOWING/FORBIDDING SETTINGS IN CAPACITY EXPANSION | | |
| | 1 | ☑ ALLOW MIXED STATE (ISSUE ALERT). | | |
| | 2 | ☐ ENCRYPT ENTIRE VOL WHEN MIXED STATE ARISES. | | |
| | 3 | ☐ FORBID MIXED STATE. | | |

SETTING FUNCTION

ENCRYPTION SETTING

MIXING ALLOWING/FORBIDDING SETTING

[ OK ]  [ CANCEL ]

*FIG. 29D*

MIXING ALLOWING/FORBIDDING SETTINGS INFORMATION 207

| MIXING ALLOWING/FORBIDDING SETTINGS IN VOL OR POOL ~3001 | MIXING ALLOWING/FORBIDDING SETTINGS BETWEEN CORRELATED VOLS OR POOLS ~3002 |
|---|---|
| 1 | 1, 4, 7, 10, 13 |

FIG. 30A

MIXING ALLOWING/FORBIDDING SETTINGS INFORMATION 207

| MIXING ALLOWING/FORBIDDING SETTINGS IN VOL OR POOL CAPACITY EXPANSION ~3011 | MIXING ALLOWING/FORBIDDING SETTINGS BETWEEN CORRELATED VOLS OR POOLS ~3012 | PROTECTION SETTINGS ~3013 |
|---|---|---|
| 1, 4 | 1 | 1 |

FIG. 30B

MIXING ALLOWING/FORBIDDING SETTINGS INFORMATION 207

| MANAGEMENT FUNCTION (3021) | MIXING ALLOWING/FORBIDDING SETTINGS IN VOL OR POOL (3022) | MIXING ALLOWING/FORBIDDING SETTINGS BETWEEN CORRELATED VOLS OR POOLS (3023) |
|---|---|---|
| COPY | 1, 4 | 1, 4, 7, 10, 13 |
| SNAPSHOT | 1, 4, 7 | 2, 4, 7, 10, 13 |
| ... | ... | |

FIG. 30C

MIXING ALLOWING/FORBIDDING SETTINGS INFORMATION 207

| MANAGEMENT FUNCTION (3031) | MIXING AND CONSISTENCY/INCONSISTENCY ALLOWING/FORBIDDING SETTINGS (3032) | PROTECTION SETTINGS (3033) |
|---|---|---|
| COPY | 1 | 1 |
| SNAPSHOT | 1, 4 | 1 |
| ... | ... | |

FIG. 30D

COMPUTER SYSTEM FOR MANAGING STORAGE AREA STATE OF A STORAGE SYSTEM

CLAIM OF PRIORITY

The present application claims priority from Japanese patent applications JP 2008-100124 filed on Apr. 8, 2008, the content of which are hereby incorporated by reference into this application.

BACKGROUND

This invention relates to a computer system containing a storage system where data used by a computer is stored, and more particularly, to a technology of controlling the state (encrypted/plaintext/mixed) of a storage area when the storage system has a function of encrypting data stored in a storage area and a function of decrypting data read out of a storage area.

The recent popularization of storage area networks (SANs) in which a storage system, a computer, and a management computer are coupled to one another by a dedicated line such as Fibre Channel is accelerating the increase in scale of computer systems. Also increasing is the public interest in secure data preservation and management as more information leaks from stolen recording disks or the like are reported. One of the methods to secure stored data is to give a storage system a storage area encrypting function for encrypting data read out of and written in a storage area (see JP 2007-28502 A and JP 2005-322201, for example).

SUMMARY

With data encrypted by a technology described in JP 2007-28502 A or JP 2005-322201, an information leak can be avoided when a third party gains access to the data through a theft of a disk recording the data or other measures.

Giving a storage system an encrypting function as the one described above is not enough to prevent information leaks completely unless the storage area state is properly managed.

A storage area has three states: an encrypted state, a plaintext state, and a mixed state.

In a storage area in the encrypted state, data is encrypted before written in the storage area and decrypted before read out of the storage area. In a storage area in the plaintext state, data is written in and read out of the storage area as it is. The mixed state means that the encrypted state and the plaintext state are both found in one storage area. A storage area in the encrypted state is called an encrypted storage area. A storage area in the plaintext state is called a plaintext storage area. A storage area in the mixed state is called a mixed storage area.

For example, in the case where data is copied from one storage area in a storage system to another storage area and the case where the copy source storage area is in the encrypted state whereas the copy destination storage area is in the plaintext state, the encrypted data of the copy source becomes unencrypted (plaintext data) when written in the copy destination storage area, thus rendering the anti-information leak measure incomplete. To give another example, in the case where one or more storage areas are grouped to form a pool, adding a plaintext storage area to a pool of encrypted storage areas creates the mixed state, which makes the anti-information leak measure incomplete.

The storage area state thus needs to be controlled properly by determining to which of the encrypted, plaintext, and mixed states a storage area can be set in order to prevent information leaks. The simplest anti-information leak measure is to set every storage area in a storage system to the encrypted state. On the other hand, considering the increase in processing load and data size due to data encryption, setting only necessary storage areas to the encrypted state and the rest of the storage areas to the plaintext state might be better than setting every storage area to the encrypted state.

A storage area state can be set on a RAID group basis, a logical device (Ldev: logical area obtained by logically partitioning a RAID group) basis, or the like.

A RAID group set to the encrypted state is called an encrypted RAID group. A RAID group set to the plaintext state is called a plaintext RAID group. A RAID group set to the mixed state is called a mixed RAID group.

When a storage area state is set on a RAID group basis, for example, the administrator may set up an encrypted RAID group and a plaintext RAID group to store only data that needs protection in storage areas within the encrypted RAID group.

If an extremely small portion of data stored in storage areas of this setup needs protection by encryption whereas a large portion of the data does not need protection by encryption, the plaintext RAID group is intensively used, leaving the plaintext RAID group short of free capacity and the encrypted RAID group abundant with free capacity. For efficient utilization of capacity, data that does not need protection by encryption needs to be allowed to use storage areas within the encrypted RAID group.

However, allowing data that by nature does not need protection by encryption to use encrypted storage areas may raise a problem in that it is difficult to tell which data in the encrypted storage area really needs protection by encryption.

Using the plaintext RAID group and the encrypted RAID group in combination to store data that does not need protection by encryption also creates an unintended mixed state. To avoid this problem, the storage area state (encrypted/plaintext/mixed) needs to be managed and the use of storage areas has to be controlled properly.

By the way, storing data that needs protection by encryption in a plaintext storage area when the remaining capacity is small in the encrypted RAID group and large in the plaintext RAID group should be prohibited.

It is therefore an object of this invention to make a storage system which is used in a computer system and which has the above-mentioned function of encrypting data to be stored in a storage area of the storage system capable of properly controlling the storage area state by determining to which of the encrypted, plaintext, and mixed states a storage area can be set and thus reducing the risk of an information leak. Another object of this invention is to provide a storage system capable of discriminating which data in an encrypted storage area needs protection by encryption and which data does not when storing data that does not need protection by encryption in an encrypted storage area is allowed for efficient utilization of storage capacity.

A representative aspect of this invention is as follows. That is, there is provided a computer system, having: a host computer; and at least one storage system coupled to the host computer via a network. The host computer comprises a first interface coupled to the network, a first processor coupled to the first interface, and a first memory coupled to the first processor. The at least one storage system comprises a second interface coupled to the network, a second processor coupled to the second interface, and a second memory coupled to the second processor. The at least one storage system provides at least one storage area where data written from the host computer is stored. The at least one storage area includes a first storage area which includes at least one of an encrypted storage area and a plaintext storage area, the encrypted storage area storing data that needs protection by encryption, the plaintext storage area storing data that does not need protection by encryption. The at least one storage system is configured to: encrypt, in the case of reception of a request to write data in the encrypted storage area from the host computer, the data requested to be written with an encryption key that is assigned to the encrypted storage area, and write the encrypted data in the encrypted storage area; receive an instruction about what type of storage area is available to the host computer; present the encrypted storage area to the host computer as an available storage area separate from unavailable storage areas in the case of which the type of storage area that is available according to the instruction is "encrypted"; and present, in the case of which the type of storage area that is available according to the instruction is other than "encrypted", one of both the encrypted storage area and the plaintext storage area to the host computer as available storage areas, and only the plaintext storage area as an available storage area.

According to an embodiment of this invention, a storage system having an encrypting function can prevent data that needs protection by encryption from being accidentally stored in a mixed storage area or a plain text storage area.

BRIEF DESCRIPTION OF THE DRAWINGS

The present invention can be appreciated by the description which follows in conjunction with the following figures, wherein:

FIG. 3 is an explanatory diagram showing an example of LU management information in accordance with a first embodiment of this invention;

FIG. 4 is an explanatory diagram showing an example of Ldev management information in accordance with a first embodiment of this invention;

FIG. 5 is an explanatory diagram showing an example of physical disk management information in accordance with a first embodiment of this invention;

FIG. 6 is an explanatory diagram showing an example of encryption key management information in accordance with a first embodiment of this invention;

FIG. 7A is an explanatory diagram showing an example of Vol correlation management information in accordance with a first embodiment of this invention;

FIG. 7B is an explanatory diagram showing an example of Vol correlation management information in the storage system that can have a cascade configuration in accordance with a first embodiment of this invention;

FIG. 8 is an explanatory diagram showing an example of Vol type management information in accordance with a first embodiment of this invention;

FIG. 9 is an explanatory diagram showing an example of administrator authentication information in accordance with a first embodiment of this invention;

FIGS. 11A to 11D are explanatory diagrams showing examples of a mixing allowing/forbidding setting window in accordance with a first embodiment of this invention;

FIGS. 12A to 12D are explanatory diagrams each showing an example of mixing allowing/forbidding settings information in accordance with a first embodiment of this invention;

FIGS. 13A to 13C are explanatory diagrams each showing an example of a storage management/state display window in accordance with a first embodiment of this invention;

FIG. 14 is an explanatory diagram showing an example of available Vol management information in accordance with a first embodiment of this invention;

FIG. 22A is an explanatory diagram showing an example of a copy function of the storage systems in accordance with first and second embodiments of this invention;

FIG. 22B is an explanatory diagram showing an example of a snapshot function of the storage systems in accordance with the first and second embodiments of this invention;

FIG. 27 is an explanatory diagram showing an example of the LU management information in accordance with a second embodiment of this invention;

FIGS. 29A to 29D are explanatory diagrams each showing an example of a mixing allowing/forbidding setting window in accordance with the second embodiment of this invention;

FIGS. 30A to 30D are explanatory diagrams each showing an example of the mixing allowing/forbidding settings information in accordance with the second embodiment of this invention;

DETAILED DESCRIPTION OF THE PREFERRED EMBODIMENTS

Embodiments of this invention will be described below. The following embodiments are given merely for exemplification and are not to limit this invention.

A first embodiment of this invention will be described with reference to FIG. 1 to FIGS. 26A-26D.

Figure 1:
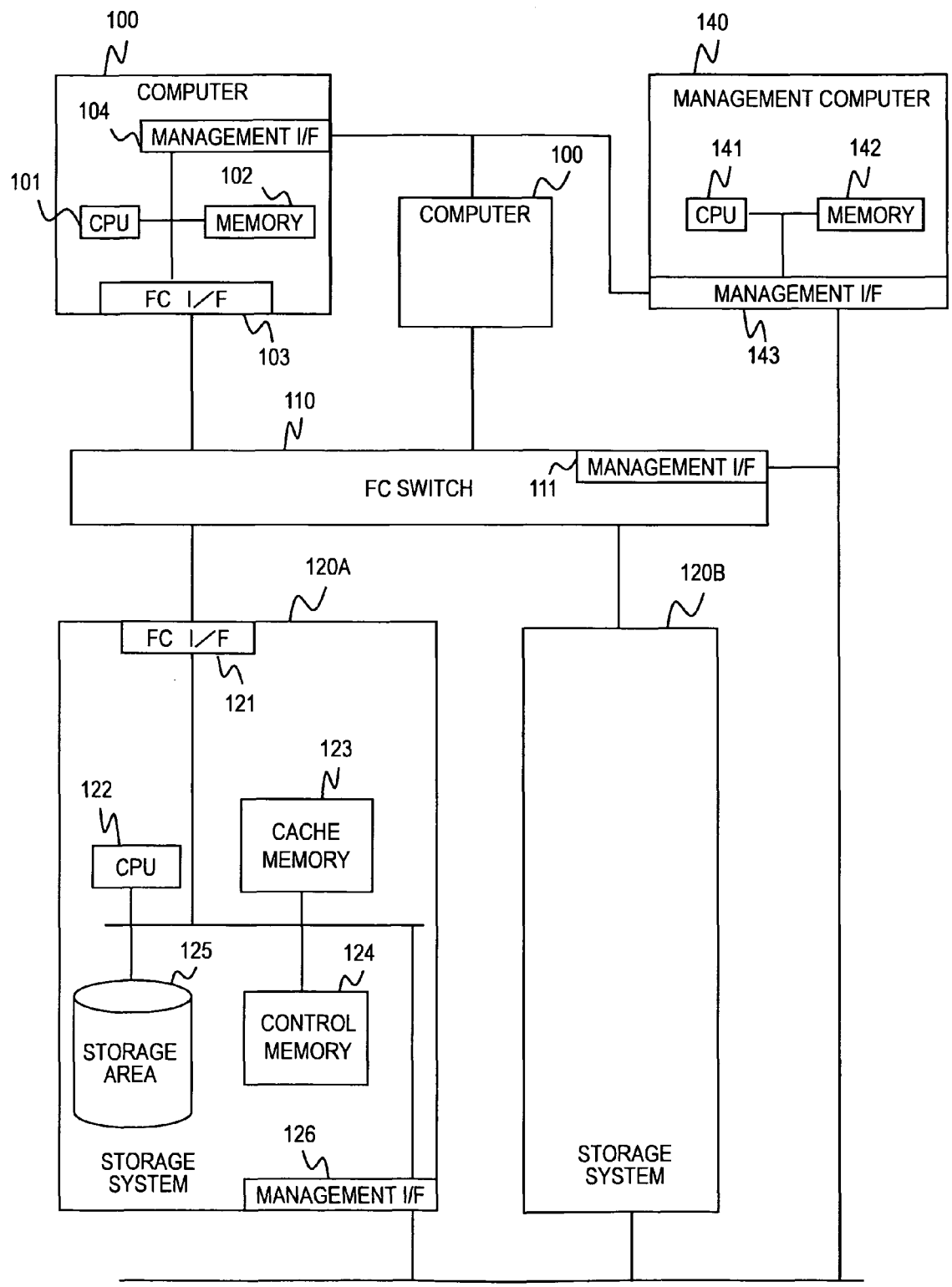
FIG. 1 is a block diagram showing a hardware configuration of a computer system in accordance with a first embodiment of this invention.

FIG. 1 is a block diagram showing a hardware configuration of a computer system according to the first embodiment of this invention.

The computer system has one or more computers 100, a fibre channel switch (FC switch) 110, one or more storage systems 120 (here, storage systems 120A and 120B, which will collectively be denoted by "120"), and one or more management computers 140 (only one management computer 140 is shown in FIG. 1).

The computers 100 and the storage systems 120 are coupled to the FC switch 110 via FC interfaces (FC I/Fs) 103 and 121, respectively.

The computers 100, the FC switch 110, and the storage systems 120 are coupled to the management computer 140 over an IP network via management I/Fs 104, 111 and 126, respectively, to be managed by the management computer 140.

The computers 100 each have a CPU 101, a memory 102, which is coupled to the CPU 101, one or more FC I/Fs 103, which are coupled to the CPU 101, and the management I/F 104, which is coupled to the CPU 101.

The memory 102 keeps a program executed by the CPU 101 and data read or written in the storage systems 120.

The storage systems 120 each have one or more FC I/Fs 121, which are coupled to the FC switch 110, one or more CPUs 122, one or more cache memories 123, one or more control memories 124, one or more storage areas 125, and one or more management I/Fs 126. The components of each storage system 120 are intercoupled by, for example, an internal bus.

Each FC I/F 121 has one or more ports (omitted from the drawing) coupled to the FC switch 110.

The CPUs 122 in the storage systems 120 receive data read/write requests from the computers 100 through the FC I/Fs 121, and perform processing of reading/writing requested data in the storage areas 125.

The storage areas 125 in the storage systems 120 are logical devices provided by physical storage areas (e.g., storage areas of not-shown hard disk drives) within the storage systems 120. The computers 100 recognize the storage areas 125 and make data read/write requests to the storage systems 120.

Specifically, when one storage system 120 receives from one computer 100 a request to read/write data in one storage area 125, the storage system 120 executes data write or data read in a physical storage area within the storage system 120 that is associated with the storage area 125, and sends a result of the data write or data read to the computer 100.

FIG. 1 shows only one storage area 125, but each storage system 120 may have a plurality of storage areas 125.

The CPUs 122 in the storage systems 120 also receive management operation requests for managing the storage systems 120 from the management computer 140 via the management I/Fs 126, and execute the requested management operation. The CPUs 122 send a result of the management operation and configuration information or the like of the storage systems 120 to the management computer 140.

The cache memory 123 temporarily stores data received from the computers 100 and data read out of the storage area 125.

The control memory 124 stores such information as configuration information of the storage area 125, the attributes of the storage area 125 (e.g., information indicating whether the storage area 125 is an encrypted storage area or a plaintext storage area), and an encryption key.

In the following description, that the storage area 125 (or storage system) is in an encrypted state will be expressed as "Encryption On" and that the storage area 125 (or storage system) is not in an encrypted state (i.e., the storage area 125 is storing plaintext data) will be expressed as "Encryption Off".

The storage systems 120 have a data encrypting function. Using the data encrypting function, the storage systems 120 encrypt data requested to be written in an encrypted storage area before writing the data in the encrypted storage area. The storage systems 120 also use the data encrypting function when requested by one of the computers 100 to read data out of an encrypted storage area, to decrypt the requested data after reading the data out of the encrypted storage area and before sending the data to the computer 100.

The management computer 140 has a CPU 141, a memory 142, and a management I/F 143, which are coupled to one another by an internal bus or the like.

The management I/F 143 is coupled to the computers 100, the FC switch 110, and the storage systems 120 over an IP network.

When booted up, the management computer 140 loads a program for managing storage systems and computers onto the memory 142 from a not-shown non-volatile recording medium such as a magnetic disk drive.

The CPU 141 executes the program loaded onto the memory 142 to thereby obtain configuration information of the storage systems 120, detect a failure in the storage systems 120, monitor the performance of the storage systems 120, and the like. The management computer 140 is used by an administrator to manage the entire computer system.

The aforementioned program may be recorded on other recording media than a magnetic disk drive (a CD-ROM or a floppy disk, for example). The program may be loaded to be executed on the management computer 140 from the alternative recording medium, or from other recording medium over a network.

Described next are the software configurations of the storage systems 120 and the management computer 140 according to this embodiment.

Figure 2A:
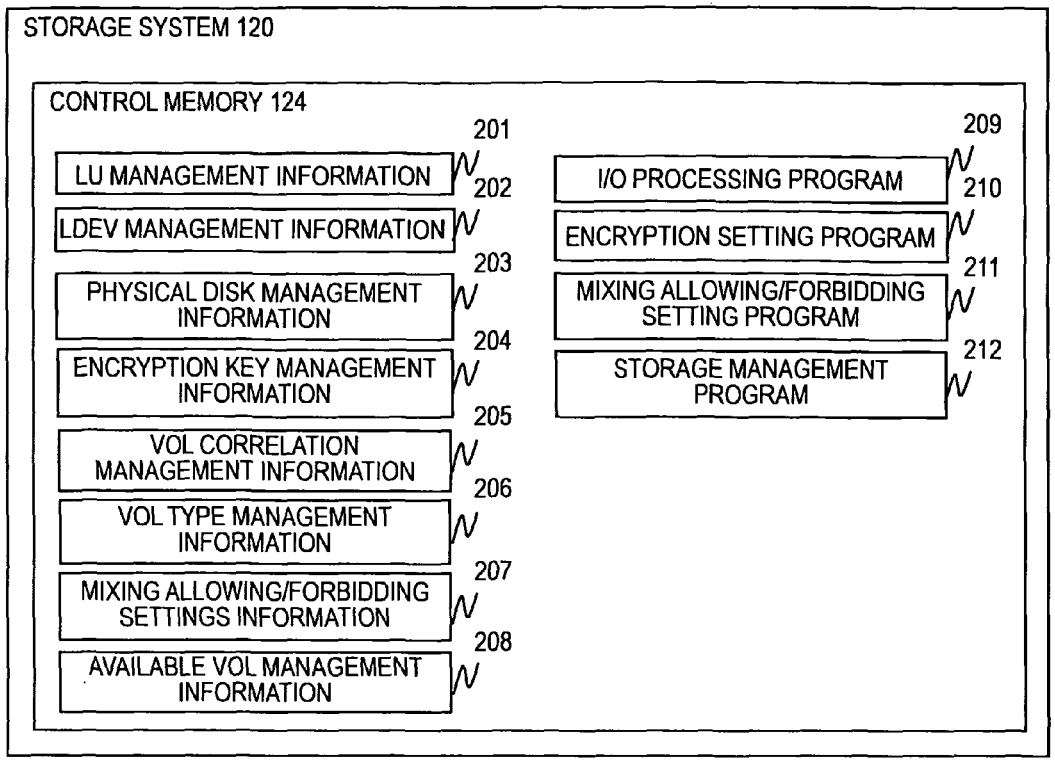
FIG. 2A is an explanatory diagram showing an example of a software configuration of the storage systems in accordance with a first embodiment of this invention.

FIG. 2A is an explanatory diagram showing an example of a software configuration of the storage systems 120 according to the first embodiment of this invention.

Each control memory 124 in the storage systems 120 stores storage area (logical unit: LU) management information 201, Ldev management information 202, physical disk management information 203, encryption key management information 204, Vol (volume) correlation management information 205, Vol type management information 206, mixing allowing/forbidding settings information 207, and available Vol management information 208. The control memory 124 also stores four programs: an I/O processing program 209, an encryption setting program 210, a mixing allowing/forbidding setting program 211, and a storage management program 212.

The configuration information stored in the control memory 124 will be described first and then the program information stored in the control memory 124. LUs are logical storage areas in the storage systems 120 which are used by the computers 100 in reading/writing data in the storage systems 120. The computers 100 use information of the LUs to identify where to read/write data.

The LU management information 201, the Ldev management information 202, the physical disk management information 203, the encryption key management information 204, the Vol correlation management information 205, and the Vol type management information 206 are information indicating the settings and state of a storage area in a storage system. The mixing allowing/forbidding settings information 207 and the available Vol management information 208 are information referred to when storage management operation, which will be described later, is performed.

FIG. 3 is an explanatory diagram showing an example of the LU management information 201 according to the first embodiment of this invention.

The LU management information 201 contains seven data items: items 301, 302, 303, 304, 305, 306, and 307.

The item 301 is a port number in the storage system 120. A port number is a value assigned to each port (omitted from the drawing) in each FC I/F 121 of the storage system 120 for unique identification. The storage system 120 can associate one or more LUs with one port. The storage system 120 can have a plurality of ports. The computers 100 access LUs through the ports.

The item 302 is an LU number for identifying the storage area (LU) 125 that is associated with a port identified by the item 301. LU numbers may be unique throughout each port. The computers 100 use a port number and an LU number to specify which storage area is to be accessed.

The item 303 is the capacity of an LU identified by the items 301 and 302.

The item 304 is identification information of the computer 100 that is allowed to access an LU identified by the items 301 and 302. For example, a value such as a World Wide Name (WWN) assigned to the port in the computer 100 that is allowed to access the LU is stored as the item 304.

The item 305 is information indicating whether an LU identified by the items 301 and 302 is set to the encrypted state or the plaintext state. For example, when the LU is set to the encrypted state, "encrypted" is stored as the state information as shown in FIG. 3.

An LU set to the encrypted state is called an encrypted LU and an LU set to the plaintext state is called a plaintext LU.

The item 306 is the identifier of an encryption key (key ID) used to encrypt data before writing the data in an encrypted LU identified by the items 301 and 302 and to decrypt data before reading the data out of the encrypted LU. The key ID 306 is an identifier by which an encryption key used for encryption and decryption is identified uniquely throughout the storage system 120. When the LU is not set to the encrypted state (for example, when the LU is set to the plaintext state), no value is held as the key ID 306. In this embodiment, an encryption key is set on a RAID group basis, making LUs that belong to the same RAID group share the same value as the key ID 306. Encryption key setting is not limited to this mode and an encryption key may be set on an LU basis.

The key ID 306 is the same as a key ID 601, which will be described later, and can be used to retrieve encryption key detailed information from the encryption key management information 204.

The item 307 is an Ldev number for identifying an Ldev that constitutes the storage area (LU) 125 identified by the items 301 and 302.

FIG. 4 is an explanatory diagram showing an example of the Ldev management information 202 according to the first embodiment of this invention.

The Ldev management information 202 contains three data items: items 401, 402, and 403.

The item 401 is an Ldev number for identifying each Ldev in the storage system 120. The relation between an Ldev and an LU is as follows.

Each storage system 120 manages its internal logical storage areas as Ldevs by assigning an Ldev number to each of the logical storage areas. The Ldevs are mapped onto LUs associated with an arbitrary port in the storage system 120, and paths are set between the mapped LUs and the computers 100. The computers 100 can thus access the LUs, in other words, the Ldevs mapped onto the LUs.

The item 402 is information indicating whether an Ldev identified by the item 401 is set to the encrypted state or the plaintext state.

The item 403 is a RAID group number assigned to a RAID group to which an Ldev identified by the item 401 belongs.

FIG. 5 is an explanatory diagram showing an example of the physical disk management information 203 according to the first embodiment of this invention.

The physical disk management information 203 contains six data items: items 501, 502, 503, 504, 505, and 506.

The item 501 is a disk number for identifying each physical disk drive in the storage system 120.

The item 502 is information indicating the capacity of a physical disk drive in the storage system 120 that is identified by the item 501.

The item 503 is information indicating the RAID configuration (RAID level) of a physical disk drive in the storage system 120 that is identified by the item 501.

The item 504 is information of a RAID group to which a physical disk drive in the storage system 120 that is identified by the item 501 belongs.

The item 505 is information indicating whether a physical disk drive in the storage system 120 that is identified by the item 501 is set to the encrypted state or the plaintext state.

The item 506 is the identifier of an encryption key (key ID) used to encrypt data before writing the data in an encrypted RAID group identified by the item 504 and to decrypt data before reading the data out of the encrypted RAID group. A RAID group is set to the encrypted state (Encryption On) and then encrypted data is written in an LU within the RAID group, and decrypted data is read out of an LU within the RAID group. The key ID 506 is an identifier by which an encryption key used for encryption and decryption is identified uniquely throughout the storage system 120. When the RAID group is not set to the encrypted state, no value is held as the key ID 506. The key ID 506 is the same as the key ID 601, which will be described later, and can be used to retrieve encryption key detailed information from the encryption key management information 204.

FIG. 6 is an explanatory diagram showing an example of the encryption key management information 204 according to the first embodiment of this invention.

The encryption key management information 204 contains four data items: items 601, 602, 603, and 604.

The item 601 is an identifier (key ID) for identifying an encryption key throughout the storage system 120. As described above, the key ID 601 has the same value as the key ID 306 in the LU management information 201 of FIG. 3 and the key ID 506 in the physical disk management information 203 of FIG. 5.

The item 602 is data (in other words, a data string used as an encryption key) of an encryption key identified by the item 601.

The item 603 is a value indicating the length of an encryption key identified by the item 601.

The item 604 is algorithm information indicating an encryption algorithm and mode in which an encryption key identified by the item 601 is used. For example, when data is to be encrypted with AES in ECB mode, "AES-ECB" is stored as the item 604.

FIG. 7A is an explanatory diagram showing an example of the Vol correlation management information 205 according to the first embodiment of this invention.

The Vol correlation management information 205 contains six data items: items 701, 702, 703, 704, 705, and 706.

The item 701 is information about a function that the storage system 120 has. Examples of functions of the storage system 120 include a copy function, a snapshot function, a capacity expanding function, and a dynamic capacity allocating function. Those functions will be outlined with reference to FIGS. 22A, 22B, 22C, and 22D.

FIGS. 22A to 22D are explanatory diagrams showing an example of what management function the storage systems of this embodiment have.

A copy function shown in FIG. 22A is a function of making a copy of data stored in an arbitrary LU and storing the copy in another LU, so the copy source LU and the copy destination LU store the same data. In this embodiment, the copy source LU is called a P-Vol and the copy destination LU is called an S-Vol. Creating a P-Vol and an S-Vol which have the copy source-copy destination relation is expressed as creating a copy pair.

Managing storage areas to be used while distinguishing P-Vols and S-Vols from each other, instead of managing the storage areas simply by their LU numbers, makes it easier to understand the relation between LUs. For that reason, a storage area to be used may be called by names suitable to the respective functions.

Copying data from one storage system 120 to another storage system 120, for example, copying data from an LU in the storage system 120A to an LU in the storage system 120B, is called remote copy. With the copy function, as shown in FIG. 22A, the state of the P-Vol and the state of the S-Vol match in some cases (for example, the P-Vol and the S-Vol are both plaintext storage areas) and do not match in other cases (for example, the P-Vol is an encrypted storage area whereas the S-Vol is a plaintext storage area) in remote copy from an encrypted RAID group to a plaintext RAID group.

A snapshot function shown in FIG. 22B is a function of restoring data that has been stored in an LU at an arbitrary time. Specifically, the snapshot function uses LUs used by the computers 100 to read/write data and a Pool which stores differential data from a time when a snapshot is taken (information indicating what data has been stored in a storage area before an update that is made after the snapshot has been taken). Data in the LU at the snapshot obtained time is restored by overwriting the current data in the LU with the differential data from the snapshot obtained time.

A Pool is a storage area constituted of one or more LUs. The capacity of a Pool is increased by adding a new LU to the Pool. In this embodiment, an LU used by the computers 100 to read/write data is called a P-Vol and an LU where data at a snapshot obtained time is restored is called an S-Vol.

The S-Vol, which is created by referring to data stored in the P-Vol and data stored in the Pool, does not actually store data, and is a virtual volume which does not hold actual data. In this embodiment, a volume that does not hold actual data such as the S-Vol is called a virtual Vol and a volume that holds actual data is called an actual Vol.

Creating an S-Vol using a P-Vol and a Pool as described above is called creating a snapshot. With the snapshot function, as shown in FIG. 22B, the state of the P-Vol, the state of the Pool, and the state of the S-Vol, which is a virtual Vol created by referring to the P-Vol and the Pool, match in some cases (for example, the P-Vol, the Pool, and the S-Vol are all plaintext storage areas) and do not match in other cases (for example, the P-Vol is an encrypted storage area, the Pool is a plaintext storage area, and the S-Vol is accordingly a mixed storage area which is a mixture of an encrypted storage area and a plaintext storage area). The Pool itself can be in a mixed state if constituted of an encrypted LU and a plaintext LU.

Figure 22C:
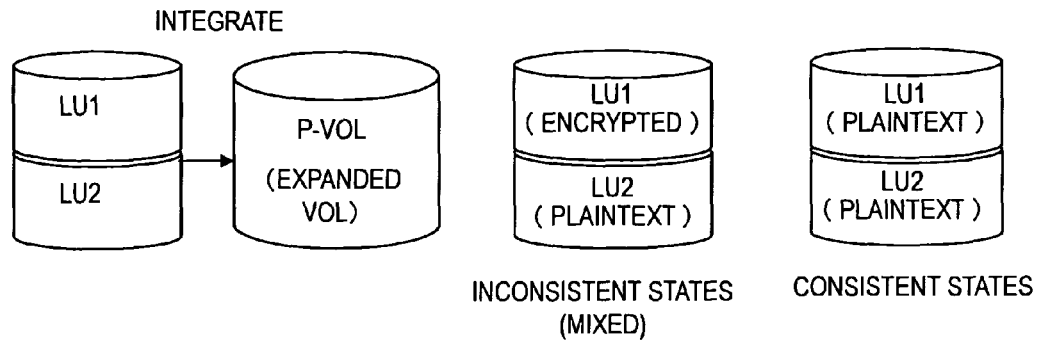
FIG. 22C is an explanatory diagram showing an example of a capacity expanding function of the storage systems in accordance with the first and second embodiments of this invention.

A capacity expanding function shown in FIG. 22C is a function of expanding the capacity of a storage area by combining one LU with another LU. A storage area whose capacity is expanded in this manner is called in this embodiment an expanded Vol or a capacity-expanded P-Vol. With the capacity expanding function, as shown in FIG. 22C, LUs constituting an expanded Vol are in consistent states in some cases (for example, the expanded Vol is constituted of a plaintext LU and another plaintext LU, and accordingly in a plaintext state), and in different states in other cases (for example, the expanded Vol is constituted of an encrypted LU and a plaintext LU, and accordingly in a mixed state).

Figure 22D:
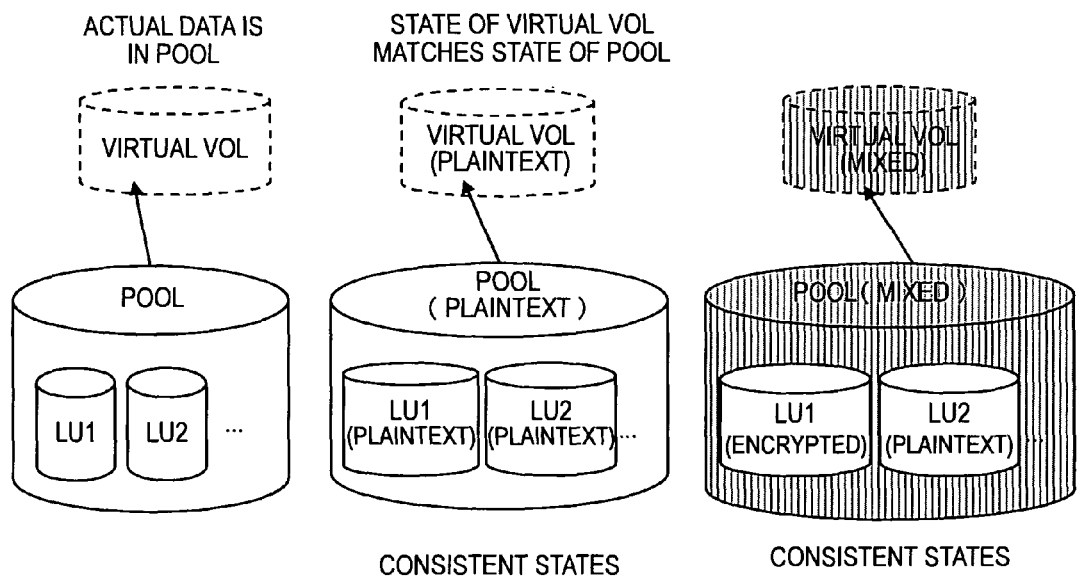
FIG. 22D are explanatory diagrams showing an example of a dynamic capacity allocating function of the storage systems in accordance with the first and second embodiments of this invention.

A dynamic capacity allocating function shown in FIG. 22D is a function of allocating an LU or LUs in a Pool whose combined capacity reaches a capacity necessary for the computers 100 to read/write data. The dynamic capacity allocating function is useful for effective utilization of the storage capacity of the storage system 120. With the dynamic capacity allocating function, actual data is stored in the Pool and a storage area allocated dynamically for the use of the computers 100 is a virtual storage area. A virtual storage area as this is called a virtual Vol in this embodiment. With the dynamic capacity allocating function, as shown in FIG. 22D, the state of the virtual Vol is dependent on the state of the Pool, which makes the state of the virtual Vol and the state of the Pool match.

The storage system 120 does not always need to have all of those functions, and may have other functions than the ones described above.

Returning to FIG. 7A, the item 702 is information indicating the type of storage area used by a function identified by the item 701. For example, the copy function uses P-Vol type storage areas and S-Vol type storage areas where copies of data in P-Vol type storage areas are stored, and storage areas used by the copy function are discriminated by the P-Vol type and the S-Vol type.

The item 703 is information indicating a storage area number which is set for each storage area type of a function identified by the item 701 so that the number is unique throughout storage areas belonging to the type. For example, storage areas used by the copy function are discriminated by assigning such numbers as P-Vol1, P-Vol2, and S-Vol1 to the storage areas.

The item 704 is information about which LU is associated with which storage area. For example, information in a port number-LU number format is stored as the associated LU 704.

The item 705 is information indicating whether a storage area that is used by a function identified by the item 701 is set to the encrypted state, the plaintext state, or the mixed state which is a mixture of the encrypted state and the plaintext state.

The item 706 is information about a storage area having a correlation with a storage area that is used by a function identified by the item 701. In the case of the copy function, for example, P-Vol1 and S-Vol1 have a correlation (the copy source-copy destination relation), and "S-Vol1 in copy" is stored as a Vol that is correlated with P-Vol1 in a field for the correlated Vol and Pool 706.

FIG. 8 is an explanatory diagram showing an example of the Vol type management information 206 according to the first embodiment of this invention.

The Vol type management information 206 contains four data items: items 801, 802, 803, and 804.

The item 801 is information about a function that the storage system 120 has.

The item 802 is information about the type of a storage area that is used by a function identified by the item 801 and that is normally used by the computers 100 to read/write data.

The item 803 is the type of a storage area that is used by a function identified by the item 801 and that is subordinate to a storage area indicated by the item 802. In the case of the copy function, for example, a copy of data in a P-Vol is stored in an S-Vol, and the S-Vol is subordinate to the P-Vol (the S-Vol is never used alone).

The item 804 is information about the type of a storage area that is needed subsidiarily when storage areas of types indicated by the items 802 and 803 are used. In the case of the snapshot function, for example, a Pool storing differential data of a P-Vol is necessary as well as the P-Vol in order to use data of an S-Vol, and "Pool" is registered as the item 804.

The Vol types described above are examples, and storage areas can be of other types than the above.

The LU management information 201, the Ldev management information 202, the physical disk management information 203, the encryption key management information 204, the Vol correlation management information 205, and the Vol type management information 206 described above enable the administrator to understand the configurations and states of storage areas in the storage system 120.

FIGS. 12A to 12D are explanatory diagrams showing examples of the mixing allowing/forbidding settings information 207 according to the first embodiment of this invention.

The mixing allowing/forbidding settings information 207 is settings information indicating whether or not a storage area used by the storage system 120 is allowed to be in the mixed state and whether or not correlated storage areas are allowed to be in different states (for example, the P-Vol is in the encrypted state whereas the S-Vol is in the plaintext state).

The mixing allowing/forbidding settings information 207 is information set in advance by operating the management computer 140 or the computers 100. Mixing allowing/forbidding settings can be set through a setting window of FIGS. 11A to 11D which is displayed on the management computer 140 to the administrator, or may be set with the use of a dedicated command.

Using the setting window shown in FIGS. 11A to 11D is one way to set mixing allowing/forbidding settings. How mixing allowing/forbidding settings are set and how the mixing allowing/forbidding settings information 207 looks in the respective cases will be described below.

FIGS. 11A to 11D are explanatory diagrams showing examples of a mixing allowing/forbidding setting window according to the first embodiment of this invention. FIGS. 12A to 12D are explanatory diagrams showing examples of mixing allowing/forbidding settings information according to the first embodiment of this invention.

How mixing allowing/forbidding settings are set with the use of a setting window shown in FIG. 11A will be described first.

The mixing allowing/forbidding setting window of FIG. 11A is denoted by 1101 and contains four display items: items 1102, 1103, 1104, and 1105.

The item 1102 is an input field for setting whether or not a Vol or Pool is allowed to be in the mixed state. Setting the item 1102 sets whether or not a P-Vol in the capacity expanding function, a Pool in the snapshot function, or the like is allowed to be in the mixed state. When #3 in the item 1102 is chosen, for example, the mixed state is forbidden and creating a Pool from a plaintext storage area and an encrypted storage area is accordingly prohibited.

The reason for forbidding the mixed state is that, in the storage system 120 where encrypted storage areas and plaintext storage areas are both used, an unintended mixture of storage areas in different states can happen. Accidental storing of data that needs protection by encryption in a mixed storage area has to be prevented without fail by forbidding the mixed state, so the risk of a data leak is reduced when a third party gains access to the data through a theft of a disk recording the data or other measures.

The reason for permitting the mixed state is that it increases in number LUs that can possibly be registered to a Pool (encrypted LUs and plaintext LUs both can be registered), thereby enabling the storage system 120 to efficiently utilize the storage area capacity.

The item 1103 is an input field for setting whether or not the state consistency/inconsistency is allowed between correlated storage areas. For example, choosing #1 in the item 1103 prohibits the copy function from creating a copy pair from an encrypted state P-Vol and a plaintext state S-Vol.

The item 1104 is a button for enabling the settings of the items 1102 and 1103. The item 1105 is a button for canceling the settings of the items 1102 and 1103.

FIG. 12A shows the mixing allowing/forbidding settings information 207 when mixing allowing/forbidding settings are set by the method of FIG. 11A, and the information contains two data items: items 1201 and 1202.

The item 1201 is information set in the item 1102 of FIG. 11A, and the item 1202 is information set in the item 1103 of FIG. 11A. For example, when #1 in the item 1102 is chosen in FIG. 11A, "1" is stored as the item 1201 and "1, 4, 7" is stored as the item 1202 when #1, #4, and #7 in the item 1102 of FIG. 11A are chosen.

How mixing allowing/forbidding settings are set with the use of a setting window shown in FIG. 11B will be described next.

The mixing allowing/forbidding setting window of FIG. 11B is denoted by 1111 and contains four display items: items 1112, 1113, 1114, and 1115.

A setting method using the setting window of FIG. 11B can set mixing allowing/forbidding settings suitable for a mixed state that results from creating a Pool and from expanding the capacity by combining a plurality of storage areas.

The item 1112 is an input field for setting whether or not the mixed state is allowed when a Pool is created, and whether or not the mixed state is allowed when the capacity is expanded. When #3 and #4 in the item 1112 are chosen, the mixed state is forbidden in creating a Pool and the mixed state is allowed in expanding the capacity. By setting the item 1112, settings that are suitable for the respective cases can be set. However, the item 1112 is not limited to this mode and the same mixing allowing/forbidding settings can be set, for example, for a case where a Pool is created and a case where the capacity is expanded without discriminating one from the other.

The item 1113 is an input field for setting whether or not the state consistency/inconsistency is allowed between correlated storage areas. For example, choosing #2 in the item 1113 prohibits the copy function from creating a copy pair Vol from an encrypted state P-Vol and a plaintext state S-Vol.

The setting window shown in FIG. 11B is simpler and easier to understand for the administrator than the setting window shown in FIG. 11A. On the other hand, with the setting window of FIG. 11B, the administrator cannot set as detailed settings as in FIG. 11A, for example, allowing the S-Vol to be in the encrypted state or other states when the P-Vol is in the plaintext state and allowing the S-Vol to be in no other states than the encrypted state when the P-Vol is in the encrypted state.

The item 1114 is an operating button for enabling the settings of the items 1112 and 1113. The item 1115 is an operating button for canceling the settings of the items 1112 and 1113.

As for the states consistency/inconsistency, in the case where correlated storage areas are in different states, for example, the states of the correlated storage areas are made to match. Specifically, more detailed settings may be set such as setting all correlated storage areas to the encrypted state when the correlated storage areas are in different states and the correlated storage areas include an encrypted storage area, or setting all correlated storage areas to the plaintext state when the correlated storage areas are in different states and the correlated storage areas do not include an encrypted storage area.

FIG. 12B shows the mixing allowing/forbidding settings information 207 when mixing allowing/forbidding settings are set by the method of FIG. 11B, and the information contains two data items: items 1211 and 1212.

The item 1211 is information set in the item 1112, and the item 1212 is information set in the item 1113.

How mixing allowing/forbidding settings are set with the use of a setting window shown in FIG. 11C will be described next.

The mixing allowing/forbidding setting window of FIG. 11C is denoted by 1121 and contains six display items: items 1122, 1123, 1124, 1125, 1126, and 1127.

A setting method shown in FIG. 11C sets mixing allowing/forbidding settings for each function that the storage system 120 has, and is capable of more detailed settings than the methods shown in FIGS. 11A and 11B.

The item 1122 is an input field for selecting a management function of the storage system 120. The storage system 120 has the copy function, the snapshot function, and the capacity expanding function and, in the example of FIG. 11C, the item 1124 is being set with the copy function selected.

The item 1123 is an input field for selecting a setting function of the storage system 120. The storage system 120 has the encryption setting function for setting a storage area to the encrypted state and the mixing allowing/forbidding setting function for setting mixing allowing/forbidding settings and, in the example of FIG. 11C, the items 1124 and 1125 are being set with the mixing allowing/forbidding setting function selected.

The item 1124 is an input field for setting mixing allowing/forbidding settings of a storage area for each function of the storage system 120. In the example of FIG. 11C, the item 1124 is an input field for setting mixing allowing/forbidding settings to the P-Vol and the S-Vol each in the case of the copy function.

The item 1125 is an input field for setting whether or not the state consistency/inconsistency is allowed between correlated storage areas for each function of the storage system 120. In the example of FIG. 11C, the item 1125 is an input field for setting whether or not the state consistency/inconsistency is allowed between the P-Vol and the S-Vol in the case of the copy function.

The item 1126 is a button for enabling the settings of the items 1124 and 1125. The item 1127 is a button for canceling the settings of the items 1124 and 1125.

FIG. 12C shows the mixing allowing/forbidding settings information 207 when mixing allowing/forbidding settings are set by the method of FIG. 11C, and the information contains three data items: items 1221, 1222, and 1223.

The item 1221 is information about what management function the storage system 120 has. The item 1222 is information set in the item 1124. The item 1123 is information set in the item 1125.

How mixing allowing/forbidding settings are set with the use of a setting window shown in FIG. 11D will be described next.

The mixing allowing/forbidding setting window of FIG. 11D is denoted by 1131 and contains five display items: items 1132, 1133, 1134, 1135, and 1136.

A setting method shown in FIG. 11D sets mixing allowing/forbidding settings for each function that the storage system 120 has. The setting method of FIG. 11D cannot set as detailed settings as the setting method of FIG. 11C, but is simpler and easier to understand for the administrator.

The item 1132 shows management functions that the storage system 120 has. The storage system 120 has the copy function, the snapshot function, and the capacity expanding function and, in the example of FIG. 11D, settings of those functions are being set.

The item 1133 is an input field for selecting a setting function of the storage system 120. The storage system 120 has the encryption setting function for setting a storage area to the encrypted state and the mixing allowing/forbidding setting function for setting mixing allowing/forbidding settings and, in the example of FIG. 11D, the item 1134 is being set with the mixing allowing/forbidding setting function selected.

The item 1134 is an input field for setting mixing allowing/forbidding settings of a storage area and whether or not the state consistency/inconsistency is allowed between correlated storage areas for each function of the storage system 120. In the example of FIG. 11D, mixing allowing/forbidding settings specific to the respective functions are being set.

The item 1135 is a button for enabling the settings of the item 1134. The item 1136 is a button for canceling the settings of the item 1134.

FIG. 12D shows the mixing allowing/forbidding settings information 207 when mixing allowing/forbidding settings are set by the method of FIG. 11D, and the information contains two data items: items 1231 and 1232.

The item 1231 is information about what management function the storage system 120 has.

The item 1232 is information set in the item 1134.

This concludes the description of the mixing allowing/forbidding settings information 207 and the management window through which mixing allowing/forbidding settings are set.

FIG. 14 is an explanatory diagram showing an example of the available Vol management information 208 according to the first embodiment of this invention.

The available Vol management information 208 contains information 1401 for limiting storage areas in the storage system 120 that are available to the administrator. For instance, the available Vol management information 208 can be used to make only encrypted storage areas out of all the storage areas in the storage system 120 available, or to make both plaintext storage areas and encrypted storage areas unavailable.

The available Vol management information 208 is set in advance by operating the management computer 140 or the computers 100. The available Vol management information 208 can be set through a management window of FIG. 13A which is displayed on the management computer 140 to the administrator, or may be set with the use of a dedicated command. An example of setting the available Vol management information 208 with the use of the management window shown in FIG. 13A will be described below.

Figure 13A:
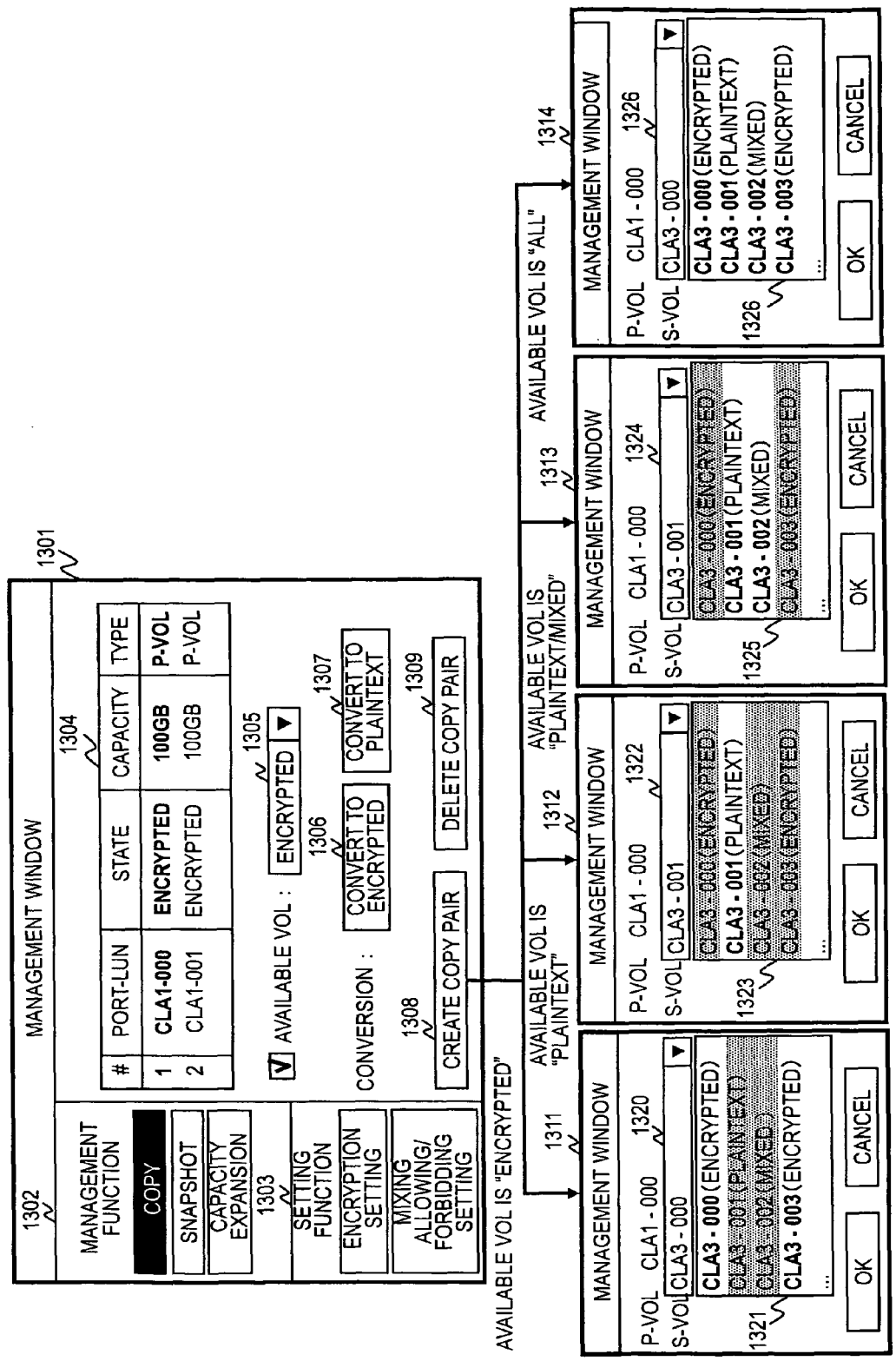

FIG. 13A is an explanatory diagram showing an example of a storage management/state display window according to the first embodiment of this invention.

The management window of FIG. 13A is denoted by 1301 and contains eight display items: items 1302, 1303, 1304, 1305, 1306, 1307, 1308, and 1309.

The item 1302 is an input field for selecting a management function of the storage system 120. The storage system 120 has the copy function, the snapshot function, and the capacity expanding function and, in the example of the management window shown in FIG. 13A, the copy function is selected to set various settings related to the copy function.

The item 1303 is an input field for selecting a setting function of the storage system 120. In the example of FIG. 13A, a setting function of the storage system 120 is selected from the encryption setting function for setting a storage area to the encrypted state and the mixing allowing/forbidding setting function for setting mixing allowing/forbidding settings.

The item 1304 is a display field showing storage areas used by the respective functions of the storage systems 120. In the example of FIG. 13A, the copy function uses a storage area CLA1-000.

The item 1305 is a selection field used to set the available Vol management information 208. In the example of FIG. 13A, "encrypted" is displayed in the item 1305, which means that only encrypted storage areas are available (only encrypted storage areas are displayed as selectable options) to the administrator.

The item 1306 is an operating button for converting the states of Vol, Pool, and other storage areas used by the functions of the storage system 120 into the encrypted state. The item 1307 is an operating button for converting the states of Vol, Pool, and other storage areas used by the functions of the storage system 120 into the plaintext state.

The items 1308 and 1309 are operating buttons for executing operations that are involved in the respective functions of the storage system 120. In the example of FIG. 13A where the copy function is selected, a copy pair creating operation and a copy pair deleting operation are executed.

Management windows 1311 to 1314 are windows displayed when the copy pair creating button 1308 is operated.

In the case where the copy pair creating button 1308 is operated with the item 1305 set to "encrypted", for example, the management window 1311 is displayed which shows available Vols (encrypted storage areas) and unavailable Vols (plaintext storage areas and mixed storage areas) in an item 1321 separately from each other. The item 1321 may display available Vols alone, or may display available and unavailable Vols both with available Vols shown in a highlighted manner.

An item 1320 is a selection field for selecting a Vol that is actually used from among available Vols displayed in the item 1321.

In the case where the copy pair creating button 1308 is operated with the item 1305 set to "plaintext", for example, the management window 1312 is displayed which shows available Vols (plaintext storage areas) and unavailable Vols (encrypted storage areas and mixed storage areas) in an item 1323 separately from each other. The item 1323 displays Vols in the same manner as the item 1321. An item 1322 is a selection field for selecting a Vol that is actually used from among available Vols displayed in the item 1323.

In the case where the copy pair creating button 1308 is operated with the item 1305 set to "plaintext/mixed", for example, the management window 1313 is displayed which shows available Vols (plaintext storage areas and mixed storage areas) and unavailable Vols (encrypted storage areas) in an item 1325 separately from each other. The item 1325 displays Vols in the same manner as the item 1321. An item 1324 is a selection field for selecting a Vol that is actually used from among available Vols displayed in the item 1325.

In the case where the copy pair creating button 1308 is operated with the item 1305 set to "all", for example, the management window 1314 is displayed which shows all the storage areas as available Vols in an item 1327. An item 1326 is a selection field for selecting a Vol that is actually used from among available Vols displayed in the item 1327.

The available Vol management information 208 of FIG. 14 is one created by setting available Vols by the method that uses the management window shown in FIG. 13A, and contains one data item: the item 1401. The item 1401 holds information set in the item 1305.

The available Vols can be set by other methods than the setting method that uses the management window on the management computer 140, and the storage system 120 may control available Vols with the use of the item 1401 registered in the storage system 120.

Figure 13B:
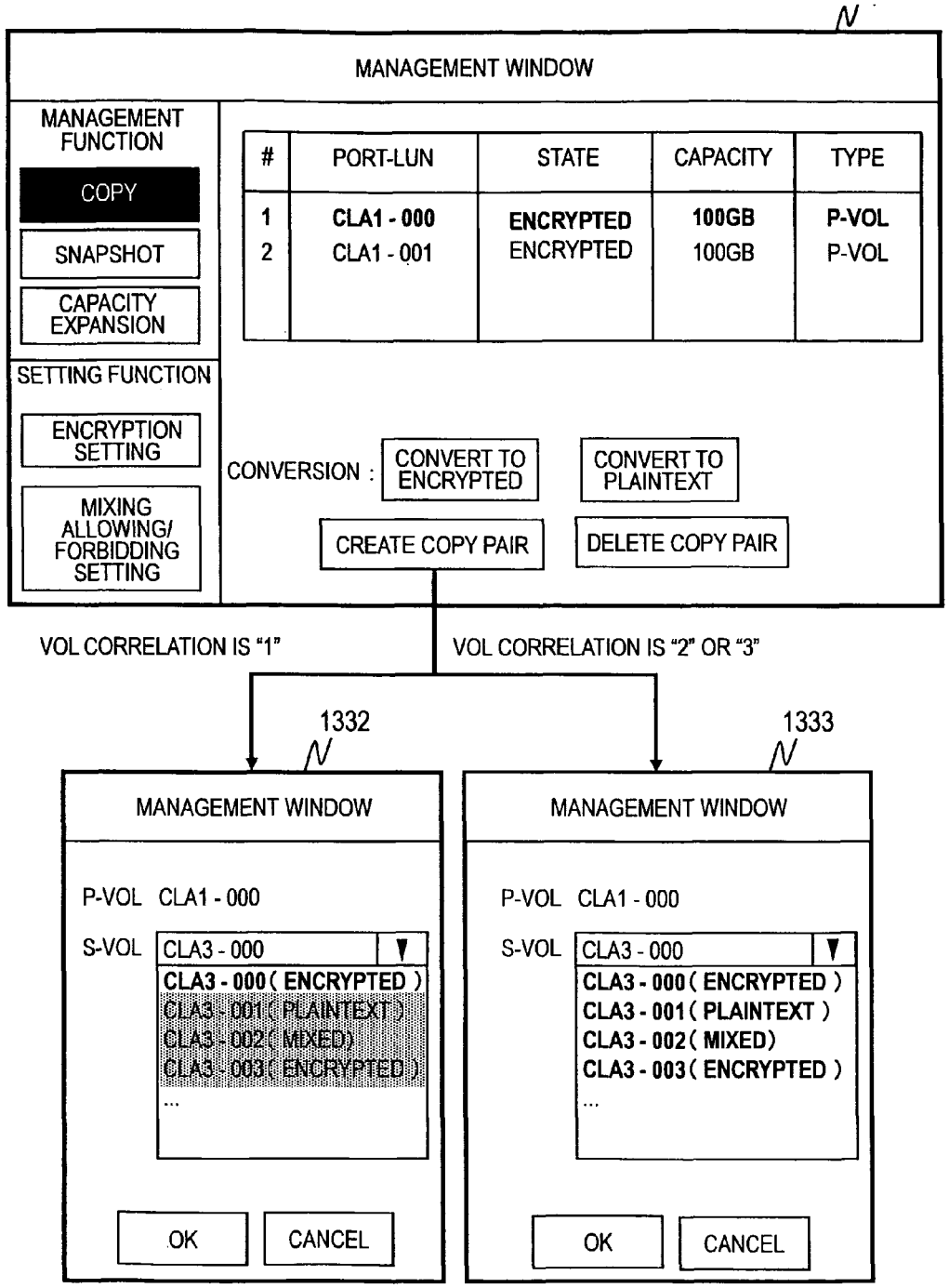

An alternative to a setting method in which the administrator can freely control available Vols as the method that uses the management window shown in FIG. 13A is a setting method of FIG. 13B in which the storage system 120 automatically controls available Vols according to mixing allowing/forbidding settings set with the use of the mixing allowing/forbidding setting windows of FIGS. 11A to 11D. Given below is a description of FIG. 13B which focuses on differences from FIG. 13A.

FIG. 13B is an explanatory diagram showing another example of the storage management/state display window according to the first embodiment of this invention.

The management window shown in FIG. 13B is denoted by 1331 and, unlike the management window of FIG. 13A, does not contain the item 1305 used to control available Vols. Instead, the management window 1331 is used to control available Vols according to mixing allowing/forbidding settings set with the use of the mixing allowing/forbidding setting windows of FIGS. 11A to 11D.

Take as an example a case of creating a copy pair from an encrypted storage area (CLA1-000) through the management window 1331 of FIG. 13B. When #1 is set in the item 1103 of FIG. 11A, for instance, the subsidiary Vol and the secondary Vol are prohibited from being set to the plaintext/mixed state while the primary Vol is in the encrypted state, and a management window 1332 is accordingly displayed which shows only encrypted storage areas as selectable options (only encrypted storage areas are available). When #2 or #3 is set in the item 1103 of FIG. 11A, on the other hand, the subsidiary Vol and the secondary Vol are allowed to be in the plaintext/ mixed state while the primary Vol is in the encrypted state, and a management window 1333 is accordingly displayed which shows all storage areas as selectable options (all storage areas are available).

With the setting method that uses the management window of FIG. 13B, the available Vol management information 208 as the one shown in FIG. 14 is not used since available Vols are controlled according to mixing allowing/forbidding settings set with the use of the mixing allowing/forbidding setting windows of FIGS. 11A to 11D.

The available Vol control processing executed by the storage system 120 described above will be described below with reference to flow charts of FIGS. 21A, 21B, and 21C.

(Processing Executed by the Storage System to Control Available Vols)

Figure 21A:
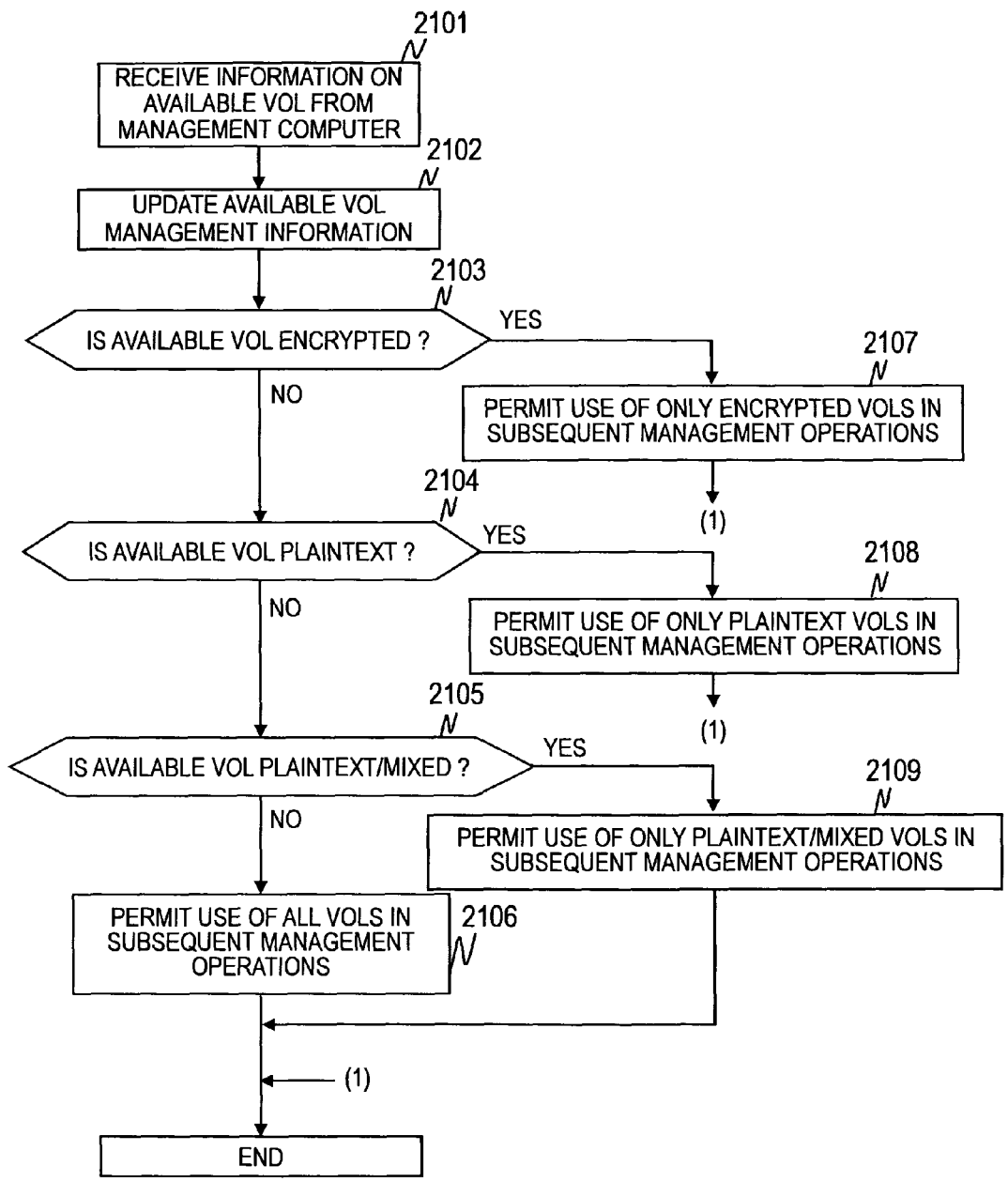
FIG. 21A is a flow chart showing an example of available Vol control processing that is executed by a storage management program of the storage system in accordance with a first embodiment of this invention.

FIG. 21A is a flow chart showing an example of available Vol control processing that is executed by a storage management program 212 of the storage system 120 according to the first embodiment of this invention.

The storage management program 212 of the storage system 120 receives information about available Vols from the management computer 140 (Step 2101). Information about available Vols is entered to the storage system 120 from the management computer 140 when, for example, the copy pair creating button 1308 or the copy pair deleting button 1309 is operated while an available Vol checkbox is checked and an option such as "encryption" is selected in the item 1305 of FIG. 13A.

The storage management program 212 updates the available Vol management information 208 with the information received in Step 2101 (Step 2102). To give a specific example, the item 1401 is updated to "encrypted" when the management computer 140 gives an instruction to set encrypted Vols as available volumes.

The storage management program 212 judges whether or not the available Vol management information updated with the received information is "encrypted" (Step 2103). When it is judged that the available Vol management information is not "encrypted", the storage management program 212 further judges whether or not the available Vol management information is "plaintext" (Step 2104). When it is judged that the available Vol management information is not "plaintext", the storage management program 212 judges whether or not the available Vol management information is "plaintext/ mixed" (Step 2105). When it is judged that the available Vol management information is not "plaintext/mixed", the storage management program 212 makes all volumes available to management operations performed through the management computer 140 from then on (Step 2106). In the case of creating a new Vol, for example, the administrator is allowed to use Vols in the encrypted state or Vols in the plaintext or mixed state.

When it is judged in Step 2103 that the available Vol management information is "encrypted", the storage management program 212 makes only encrypted state Vols available to management operations performed through the management computer 140 from then on (Step 2107). For instance, in the case of creating a new P-Vol of a copy pair, only encrypted LUs are allowed to be used in the creation of the P-Vol, and the storage management program 212 does not allow the P-Vol of the copy pair from being created from, for example, plaintext LUs.

When it is judged in Step 2104 that the available Vol management information is "plaintext", the storage management program 212 makes only plaintext state Vols available to management operations performed through the management computer 140 from then on (Step 2108).

When it is judged in Step 2105 that the available Vol management information is "plaintext/mixed", the storage management program 212 makes both plaintext state Vols and mixed state Vols available to management operations performed through the management computer 140 from then on (Step 2109).

The processing is ended after available Vols are set in Steps 2106, 2107, 2108, and 2109.

Changing the mixing allowing/forbidding settings information 207 and the available Vol management information 208 by the above-mentioned method makes state control described below flexible and precise.

(Processing Executed by the Administrator Through a Management Window on the Management Computer to Control Available Vols Freely)

Figure 21B:
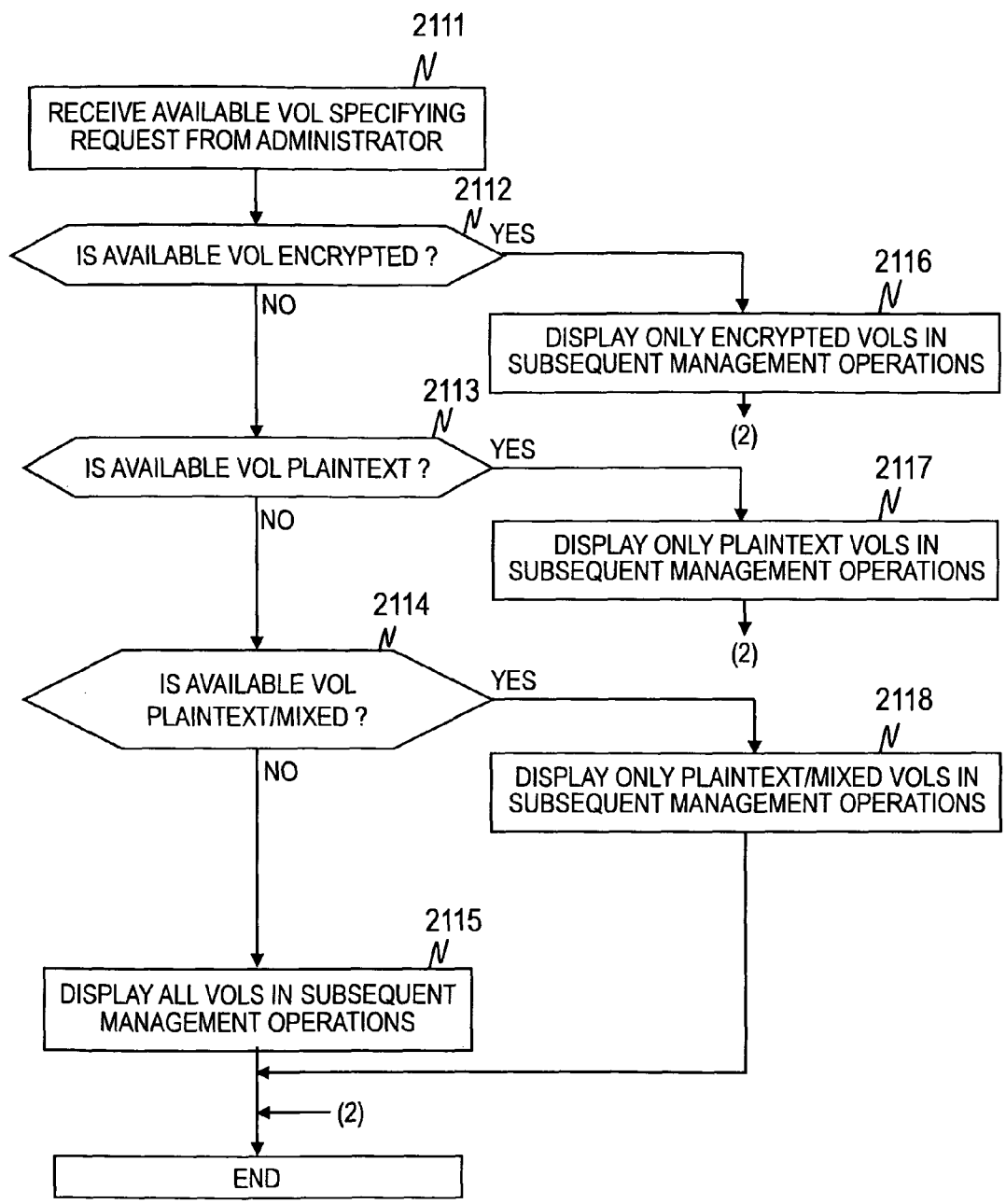
FIG. 21B is a flow chart showing an example of available Vol control processing that is executed by a storage management instruction program of the management computer in accordance with a first embodiment of this invention.

FIG. 21B is a flow chart showing an example of available Vol control processing that is executed by a storage management instruction program 245 of the management computer 140 according to the first embodiment of this invention. The processing is based on settings that are set through the management window shown in FIG. 13A.

The storage management instruction program 245 of the management computer 140 receives information about available Vols from the administrator (Step 2111). Information about available Vols is entered to the management computer 140 when, for example, the copy pair creating button 1308 or the copy pair deleting button 1309 is operated while the available Vol checkbox is checked and an option such as "encryption" is selected in the item 1305 of FIG. 13A.

The storage management instruction program 245 judges whether or not the available Vol management information updated with the information received in Step 2111 is "encrypted" (Step 2112). When it is judged that the available Vol management information is not "encrypted", the storage management instruction program 245 further judges whether or not the available Vol management information is "plaintext" (Step 2113). When it is judged that the available Vol management information is not "plaintext", the storage management instruction program 245 judges whether or not the available Vol management information is "plaintext/mixed" (Step 2114). When it is judged that the available Vol management information is not "plaintext/mixed", the storage management instruction program 245 makes all volumes available to management operations performed through the management computer 140 from then on (Step 2115). In creating a new Vol, for example, the management computer 140 displays all volumes including encrypted state Vols and plaintext or mixed state Vols to the administrator, thus making all the volumes available to the administrator.

When it is judged in Step 2112 that the available Vol management information is "encrypted", the storage management instruction program 245 displays only encrypted state Vols to the administrator in the subsequent management operations performed through the management computer 140, so only Vols in the encrypted state are available for use (Step 2116). In creating a new P-Vol of a copy pair, for example, the storage management instruction program 245 displays only encrypted LUs as candidates for available LUs on the screen.

When it is judged in Step 2113 that the available Vol management information is "plaintext", the storage management instruction program 245 displays only plaintext state Vols to the administrator in the subsequent management operations performed through the management computer 140, so only Vols in the plaintext state are available for use (Step 2117).

When it is judged in Step 2114 that the available Vol management information is "plaintext/mixed", the storage management instruction program 245 displays only plaintext or mixed state Vols to the administrator in the subsequent management operations performed through the management computer 140, so Vols in the plaintext or mixed state are available for use (Step 2118).

(Processing in which the Management Computer Automatically Controls Available Vols Through a Management Window)

Figure 21C:
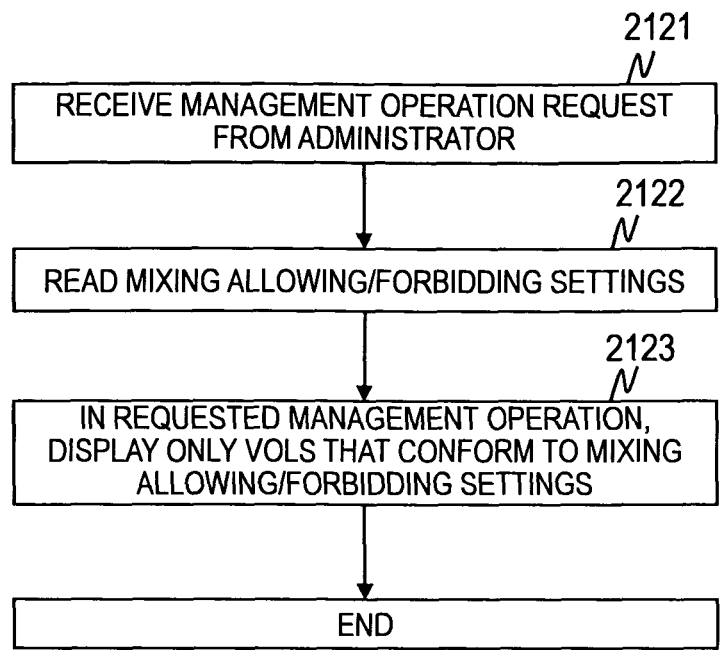
FIG. 21C is a flow chart showing another example of available Vol control processing that is executed by the storage management instruction program of the management computer in accordance with a first embodiment of this invention.

FIG. 21C is a flow chart showing another example of available Vol control processing that is executed by the storage management instruction program 245 of the management computer 140 according to the first embodiment of this invention.

The storage management instruction program 245 of the management computer 140 receives a management operation execution request from the administrator (Step 2121). A management operation execution request is entered to the management computer 140 when, for example, the copy pair creating button of FIG. 13B is operated.

The storage management instruction program 245 reads the mixing allowing/forbidding settings information 207 (Step 2122).

The storage management instruction program 245 next displays, as selectable options, only Vols that are determined from the mixing allowing/forbidding settings information 207 read in Step 2122 as available to the administrator with regard to the management operation execution request received in Step 2121 (Step 2123). To give a specific example, when "#1" is set in the item 1103 of FIG. 11A and the copy pair creating button is operated in the management window 1331 of FIG. 13B while an encrypted LU is designated as the P-Vol, only encrypted LUs are displayed in the management window 1332 as candidates for the LU (S-Vol) that is paired with this designated encrypted LU.

In the available Vol control processing described above, available Vol settings may be set separately for the computers 100 and the management computer 140, so settings specific to the computers 100 and settings specific to the management computer 140 are set. Also, available LUs, Pools, and other storage areas may be displayed as selectable options in addition to available Vols. An example of processing of controlling Vols available to the computers 100 will be described below with reference to a management window of FIG. 13C.

FIG. 13C is an explanatory diagram showing another example of the storage management/state display window according to the first embodiment of this invention.

The management window of FIG. 13C is denoted by 1341 and an example of a management window that is displayed on the management computer 140 when the dynamic capacity allocating function of the storage system 120 is used. The management window 1341 is composed of three display items: items 1342, 1343, and 1344.

The item 1342 is a field for displaying the computer 100 to which a storage area in the storage system 120 is allocated. In the example of FIG. 13C, the item 1342 shows the WWN of the computer 100, the IP address of the computer 100, and information on storage areas available to the computer 100.

The item 1343 is an operating button for setting dynamic capacity allocation settings to the computer 100 specified in the item 1342. The item 1344 is an operating button for canceling dynamic capacity allocation settings to be set to the computer 100 specified in the item 1342.

In the example of FIG. 13C, "encrypted" is set as available Vols to a computer having a WWN "10:00:00:00:00:00:00:50", which means that only encrypted storage areas are allocated to the computer. As a result, only encrypted storage areas are allocated as storage areas where the computer reads/writes data, and the computer reads/writes data in encrypted storage areas from then on. To give a specific example of processing executed by the storage system 120 in dynamic capacity allocation, the storage system 120 allocates a storage area or storage areas whose combined capacity reaches the necessary capacity from an encrypted state Pool, or encrypted storage areas alone from a mixed state Pool, to the computer 100 to which "encrypted" is set as available Vols.

This concludes the description of management information kept by the storage systems 120.

Each storage system 120 stores four programs: the I/O processing program 209, the encryption setting program 210, the mixing allowing/forbidding setting program 211, and the storage management program 212 as shown in FIG. 2A. Those programs are executed by the CPU 122. Accordingly, processing executed by those programs in the following description is actually executed by the CPU 122.

The I/O processing program 209 receives data read/write requests from the computers 100 and reads/writes data in storage areas of the storage system 120.

The encryption setting program 210 sets encryption settings of a storage area in the storage system 120. For instance, the encryption setting program 210 sets the state of the storage area to "Encryption On", thus changing the storage area into an encrypted storage area and setting an encryption key to the storage area. The I/O processing program 209 from then on uses the set encryption key to encrypt data received from the computers 100 and write the encrypted data in this storage area, and to decrypt data read out of this storage area and send the decrypted data to the computers 100.

In the following description, a storage area state is set on a RAID group basis. A conversion from encrypted data to plaintext data or a conversion from plaintext data to encrypted data is made on an LU basis. In other words, a conversion from encrypted data to plaintext data or a conversion from plaintext data to encrypted data is accomplished by moving data from an encrypted LU to a plaintext LU or from a plaintext LU to an encrypted LU. This invention, however, is not limited to this method, and a storage area state may be set on an LU basis to execute a conversion from the encrypted state to the plaintext state by overwriting the same LU with decrypted data.

Encryption setting processing and encrypted-plaintext conversion processing will be described below with reference to FIGS. 23 and 24.

Figure 23:
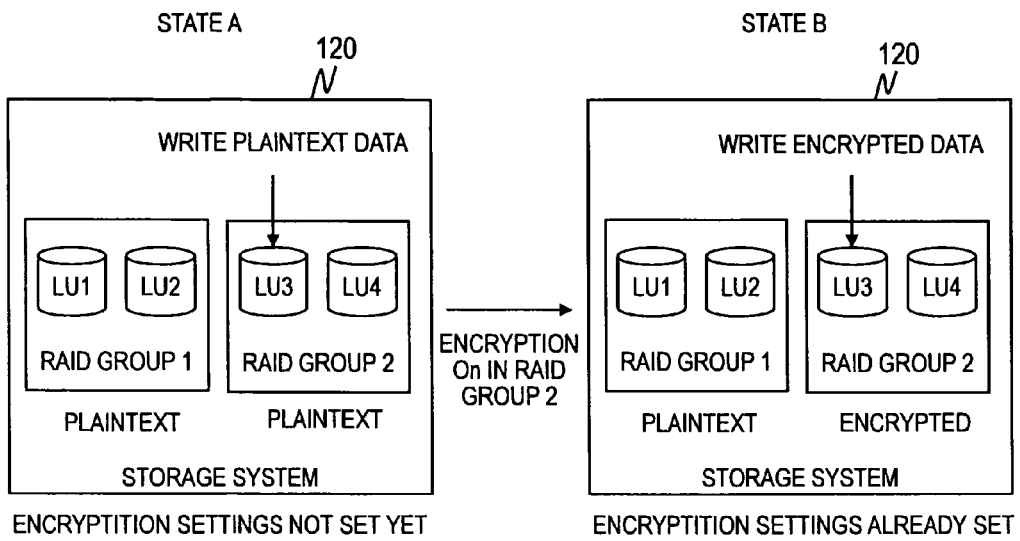
FIG. 23 is an explanatory diagram showing an example of setting a state of the storage system upon changing encryption settings in accordance with the first embodiment of this invention.

FIG. 23 is an explanatory diagram showing an example of how setting encryption settings changes the storage system state according to the first embodiment of this invention.

In a state A of FIG. 23, the storage system 120 contains a RAID group 1 and a RAID group 2, which are both set to the plaintext state. Data in the state A is stored in LUs within the RAID groups without being encrypted. The storage system 120 is changed to a state B of FIG. 23 by setting the RAID group 2 to "Encryption On". In the state B, the RAID group 2 is an encrypted RAID group and data is encrypted before stored in LUs within the RAID group 2.

Figure 24:
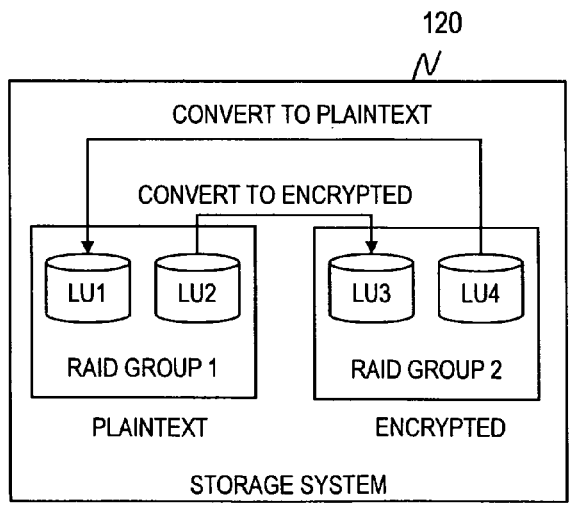
FIG. 24 is an explanatory diagram showing an example of a method of changing the state of data stored in a storage area of a storage system between encrypted and plaintext in accordance with the first embodiment of this invention.

FIG. 24 is an explanatory diagram showing an example of a method of changing the state of data stored in a storage area of a storage system between encrypted and plaintext according to the first embodiment of this invention.

To convert data stored in LU2 into the encrypted state, for example, data in LU2 is moved to an LU that is located within the encrypted RAID group 2. Specifically, data in LU2 is encrypted and the encrypted data is copied to LU3 within the encrypted RAID group 2. Data in LU2 is thus encrypted to be written in LU3 and converted from plaintext data into encrypted data. This enables the storage system 120 to handle encrypted data from then on by reading/writing data in LU3 instead of LU2. The now unnecessary data stored in LU2 may be deleted or kept.

To convert encrypted data in an encrypted LU into plaintext data, on the other hand, the encrypted data is moved to an LU that is located within a plaintext RAID group. For example, encrypted data in LU4 of FIG. 24 is converted into plaintext data by reading the encrypted data out of the LU, decrypting the read data, and writing the decrypted, plaintext data in LU 1.

A specific example of the above-mentioned encryption setting and encrypted-plaintext data conversion method will be described with reference to FIG. 10.

Figure 10:
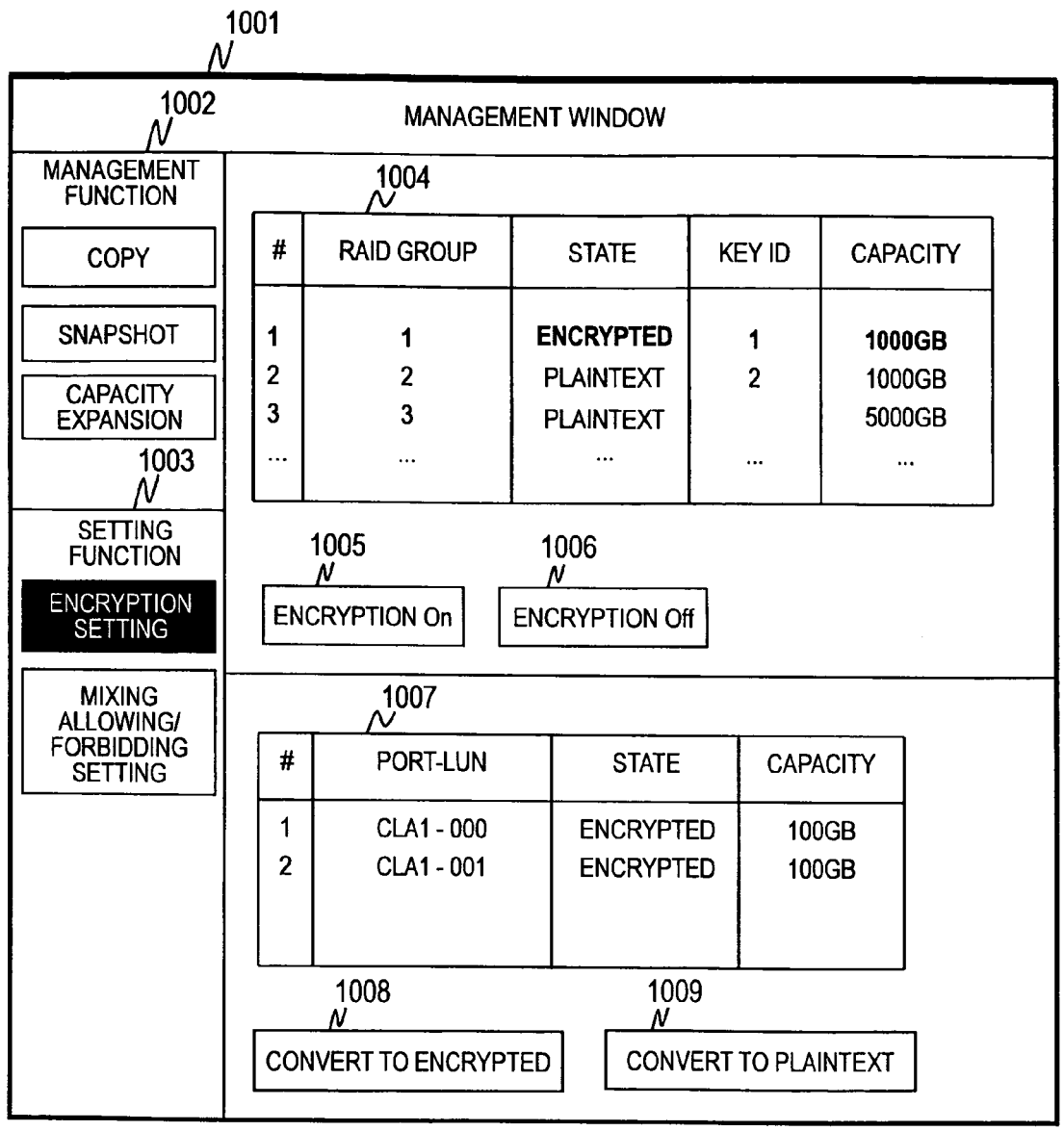
FIG. 10 is an explanatory diagram showing an example of an encryption setting window in accordance with a first embodiment of this invention.

FIG. 10 is an explanatory diagram showing an example of an encryption setting window according to the first embodiment of this invention.

A management window 1001 contains eight display items: items 1002, 1003, 1004, 1005, 1006, 1007, 1008, and 1009.

The item 1002 shows management functions that the storage system 120 has.

The item 1003 is an input field for selecting one of setting functions that the storage system 120 has. The storage system 120 has the encryption setting function and the mixing allowing/forbidding setting function and, in FIG. 10, settings about encryption are being set with the encryption setting function selected.

The item 1004 is a field for displaying RAID groups relevant to the encryption setting.

The item 1005 is an operating button for setting a RAID group to the encrypted state (for turning a RAID group into an encrypted RAID group). The item 1006 is an operating button for bringing a RAID group out of the encrypted state and into the plaintext state (for turning a RAID group into a plaintext RAID group).

The item 1007 is a field for displaying LUs to which encryption settings are to be set.

The item 1008 is an operating button for converting data stored in an LU from plaintext data to encrypted data. The item 1009 is an operating button for converting data stored in an LU from encrypted data to plaintext data.

When the Encryption On button 1005 is operated, the processing described above with reference to FIG. 23 is executed inside the storage system 120. When the convert-to-encrypted button 1008 is operated, the processing described above with reference to FIG. 24 is executed inside the storage system 120. This is the end of the description on the encryption setting program 210.

The mixing allowing/forbidding setting program 211 sets whether or not the mixed state is allowed in a storage area of the storage system 120, and whether or not state inconsistency is allowed between correlated storage areas. For example, mixing allowing/forbidding settings are set by the administrator through the management windows shown in FIGS. 11A to 11D, and the settings information is stored as the mixing allowing/forbidding settings information 207. Other methods than the above can be employed and fixed mixing allowing/forbidding settings may be set in the storage system 120 in advance.

The storage management program 212 executes a management function of the storage system 120, for example, a copy pair function, a snapshot function, or a capacity expanding function.

This concludes the description of the software configuration of the storage systems 120.

Figure 2B:
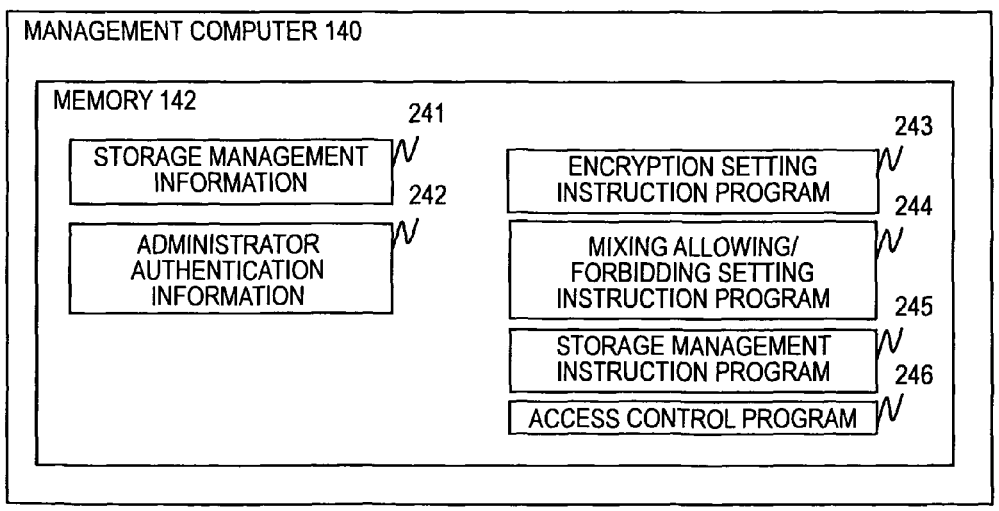
FIG. 2B is an explanatory diagram showing an example of a software configuration of the management computer in accordance with a first embodiment of this invention.

FIG. 2B is an explanatory diagram showing an example of a software configuration of the management computer 140 according to the first embodiment of this invention.

The memory 142 of the management computer 140 stores storage management information 241 and administrator authentication information 242.

The storage management information 241 is information for managing the storage systems 120. Specifically, the storage management information 241 includes the LU management information 201, the Ldev management information 202, the physical disk management information 203, the encryption key management information 204, the Vol correlation management information 205, and the Vol type management information 206, which are kept in each storage system 120. The management computer 140 usually uses the storage management information 241 to manage the storage system 120 (120A, 120B . . . ). The storage management information 241 is updated when configuration information kept in the storage system 120 (120A, 120B . . . ) is updated. Configuration information in the management computer 140 and configuration information in the storage system 120 are thus synchronized with each other.

The administrator authentication information 242 is information used to authenticate an administrator who operates the management computer 140.

FIG. 9 is an explanatory diagram showing an example of the administrator authentication information 242 according to the first embodiment of this invention.

The administrator authentication information 242 contains three data items: items 901, 902, and 903.

The item 901 is a user ID for uniquely identifying each administrator.

The item 902 is a password assigned to an administrator that is identified by the item 901.

The item 903 is role information. The role information indicates what operation an administrator identified by the item 901 has authority to perform through the management computer 140. For example, an administrator whose role is the account administrator can create and delete account information within the management computer 140. An administrator whose role is the security administrator can perform operations concerning the security of the storage systems 120 (operations such as setting encryption settings and mixing allowing/forbidding settings to the storage systems 120). An administrator whose role is the storage administrator can perform operations relevant to the copy pair creating function and other management functions of the storage systems 120. One administrator may have a plurality of roles.

The management computer 140 stores four programs: an encryption setting instruction program 243, a mixing allowing/forbidding setting instruction program 244, a storage management instruction program 245, and an access control program 246. Those programs are executed by the CPU 141. Accordingly, processing executed by those programs in the following description is actually executed by the CPU 141.

The encryption setting instruction program 243 instructs the storage systems 120 to set encryption settings such as setting a storage area to the encrypted state.

The mixing allowing/forbidding setting instruction program 244 instructs the storage systems 120 to set whether or not the mixed state is allowed in storage areas of the storage systems 120 and whether or not state inconsistency is allowed between correlated storage areas.

The storage management instruction program 247 instructs the storage systems 120 to perform other functions than the encryption setting function and the mixing allowing/forbidding setting function, for example, copying data in a storage area or setting a path between a computer and a storage area.

The access control program 248 authenticates an administrator who operates the management computer 140 based on the administrator authentication information 242, and performs such processing as permitting or prohibiting the execution of a management operation requested by the administrator.

This concludes the description of the software configurations of the storage systems 120 and the management computer 140 according to this embodiment.

The following is a detailed description on a series of processing procedures from encryption setting to mixing allowing/forbidding setting according to this embodiment in the perspective of the software configurations described above. The series of processing procedures includes the following two processing procedures.

In the first processing procedure, one storage system 120 receives an instruction from the management computer 140 and sets a RAID group to the encrypted state (encryption setting) within the storage system 120. Storage areas within the RAID group set to the encrypted state store encrypted data from then on.

In the second processing procedure, the storage system 120 receives an instruction from the management computer 140 and sets mixing allowing/forbidding settings (mixing allowing/forbidding setting) within the storage system 120. From then on, upon reception of an instruction from the management computer 140 to execute a storage management operation, the operation is permitted or prohibited based on the set encryption settings and mixing allowing/forbidding settings described above. Details of those processing procedures will be given below.

(Processing Relevant to Encryption Setting in the Storage Systems)

Figure 15:
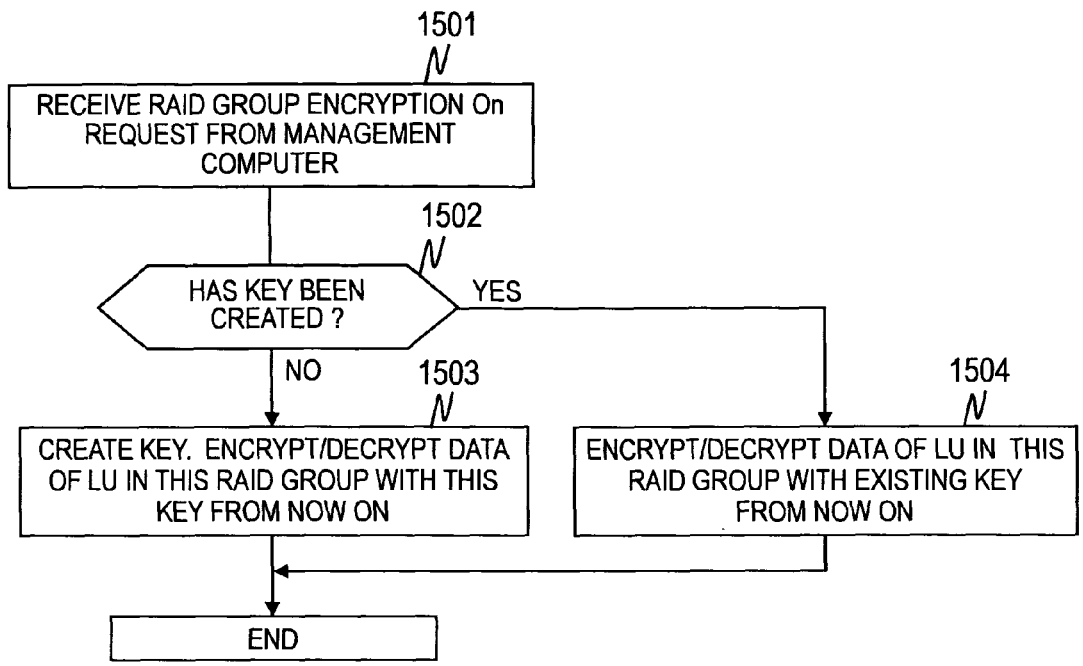
FIG. 15 is a flow chart showing an example of processing of storage area encryption setting which is executed by the encryption setting program of each storage system in accordance with a first embodiment of this invention.

FIG. 15 is a flow chart showing an example of processing relevant to storage area encryption setting which is executed by the encryption setting program 210 of each storage system 120 according to the first embodiment of this invention.

The encryption setting program 210 of the storage system 120 receives a request made by the management computer 140 to set a RAID group in the storage system 120 to "Encryption On" (Step 1501). A request to set a RAID group to "Encryption On" is input from the management computer 140 to the storage system 120 by, for example, operating the Encryption On operating button 1005 of FIG. 10.

The encryption setting program 210 next judges whether or not an encryption key has already been created for the RAID group requested to be set to "Encryption On" (Step 1502). For example, the encryption setting program 210 searches for the key ID 506 that is associated with the RAID group requested to be set to "Encryption On" and, when the encryption key ID 506 is not found, judges that the encryption key has not been created yet.

When it is judged that no encryption key has been created for the RAID group requested to be set to "Encryption On", the encryption setting program 210 newly creates an encryption key and adds the created encryption key to the encryption key management information 204. Data subsequently read/written in storage areas within the RAID group requested to be set to "Encryption On" is encrypted/decrypted with the created encryption key (Step 1503).

When it is judged that an encryption key has already been created for the RAID group requested to be set to "Encryption On", the encryption setting program 210 uses the already created encryption key to encrypt/decrypt data read/written in storage areas within the requested RAID group (Step 1504).

An encryption key is set on a RAID group basis in this flow chart, but may be set on an LU basis or a storage system basis instead.

After an encryption key is set to the RAID group, the I/O processing program 209 of the storage system 120 uses the encryption key set to the RAID group in a manner shown in Steps 1503 and 1504: upon reception of a request to write data in a storage area within the RAID group to which the encryption key is set, the I/O processing program 209 encrypts received data with the set encryption key and writes the encrypted data in an LU within the RAID group and, upon reception of a request to read data out of the RAID group, the I/O processing program 209 reads requested data out of an LU within the RAID group, decrypts the read data with the set encryption key, and sends the decrypted data to the component that has made the request.

With data encrypted in this manner, if a physical disk drive (HDD, for example) that provides the storage area 125 is taken out of the premises without authorization, a person who does not have an encryption key necessary to decrypt data stored in the illegally carried off HDD cannot use the stored data, and data leaks can thus be prevented.

However, when one storage system 120 has two different types of data storage area, encrypted storage areas and plaintext storage areas, an unintended mixed state is caused where an encrypted storage area and a plaintext storage area are mixed and data to be encrypted is stored in a plaintext storage area, unless the use of the two types of storage area is controlled properly.

This embodiment deals with this problem by setting mixing allowing/forbidding settings in advance and controlling the use of encrypted storage areas and plaintext storage areas appropriately. Given below is a description of setting mixing allowing/forbidding processing.

(Processing Relevant to Mixing Allowing/Forbidding Setting in the Storage Systems)

Figure 16:
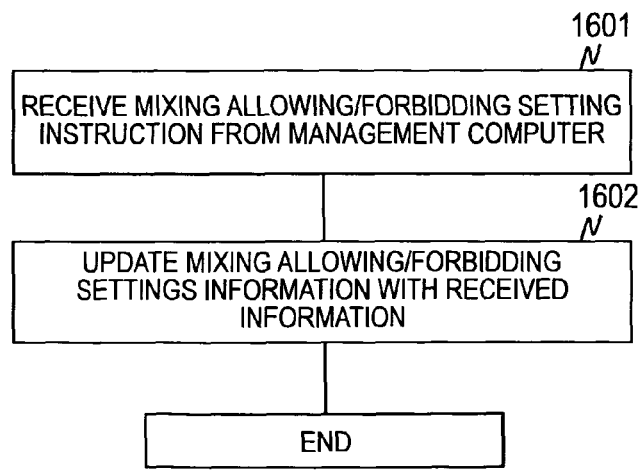
FIG. 16 is a flow chart showing an example of mixing allowing/forbidding setting processing which is executed by the mixing allowing/forbidding setting program of each storage system in accordance with a first embodiment of this invention.

FIG. 16 is a flow chart showing an example of mixing allowing/forbidding setting processing which is executed by the mixing allowing/forbidding setting program 211 of each storage system 120 according to the first embodiment of this invention.

The mixing allowing/forbidding setting program 211 of the storage system 120 receives an instruction about mixing allowing/forbidding setting from the management computer 140 (Step 1601). An instruction about mixing allowing/forbidding setting is input to the storage system 120 when, for example, buttons or the like in the setting windows of FIGS. 11A to 11D are operated. The mixing allowing/forbidding setting instruction that the storage system 120 receives from the management computer 140 contains the mixing allowing/forbidding settings information shown in FIGS. 12A to 12D.

The mixing allowing/forbidding setting program 211 of the storage system 120 next updates the mixing allowing/forbidding settings information 207 with the mixing allowing/forbidding setting instruction received from the management computer 140. For example, the mixing allowing/forbidding settings information 207 is updated in the items shown in FIGS. 12A to 12D (Step 1602). Subsequent storage area operation is performed according to the updated mixing allowing/forbidding settings information 207.

This is the end of the description on the series of processing procedures from encryption setting to mixing allowing/forbidding setting according to this embodiment.

Described next is processing that is executed in each storage system 120 when the storage system 120 receives an instruction on a storage system management operation such as copy pair creation from the management computer 140.

Receiving an instruction to execute a management operation from the management computer 140, the storage system 120 performs control processing such as permitting or prohibiting the execution of the management operation or issuing an alert based on the encryption setting and mixing allowing/forbidding setting described above. Three types of control processing performed by the storage system 120 will be described below.

First processing is processing performed when an instruction to create an actual Vol or Pool is received from the management computer 140. The first processing is for controlling the generation of a mixed state where plaintext storage areas and encrypted storage areas are mixed in one Vol or Pool.

Second processing is processing performed when an instruction to execute an operation of correlating Vols or Pools is received from the management computer 140. A correlation operation is copy pair creation, snapshot pair creation, or the like. Specifically, in copy pair creation, a P-Vol and an S-Vol are correlated and, in snapshot pair operation, a P-VOL, an S-VOl, and a Pool (differential Vol) are correlated. A capacity expanding operation in which a plurality of storage areas are combined to create a new Vol is qualified as the actual Vol creation of the first processing described above, and is not counted among correlation operations. The second processing is for controlling the state consistency/inconsistency between correlated storage areas in the case where a plurality of storage areas are to be correlated.

Third processing is processing performed when an instruction to execute a storage area state changing operation such as a change from an encrypted storage area to a plaintext storage area is received from the management computer 140. The third processing is for controlling the state consistency/inconsistency between a storage area the state of which should be changed and a storage area that is correlated to the former storage area when a storage area state is changed. Details on those three types of processing will be given below. An example of the first processing will be described first.

(Storage Area State Control Processing in Creating an Actual Vol or Pool in a Storage System)

Figure 17A:
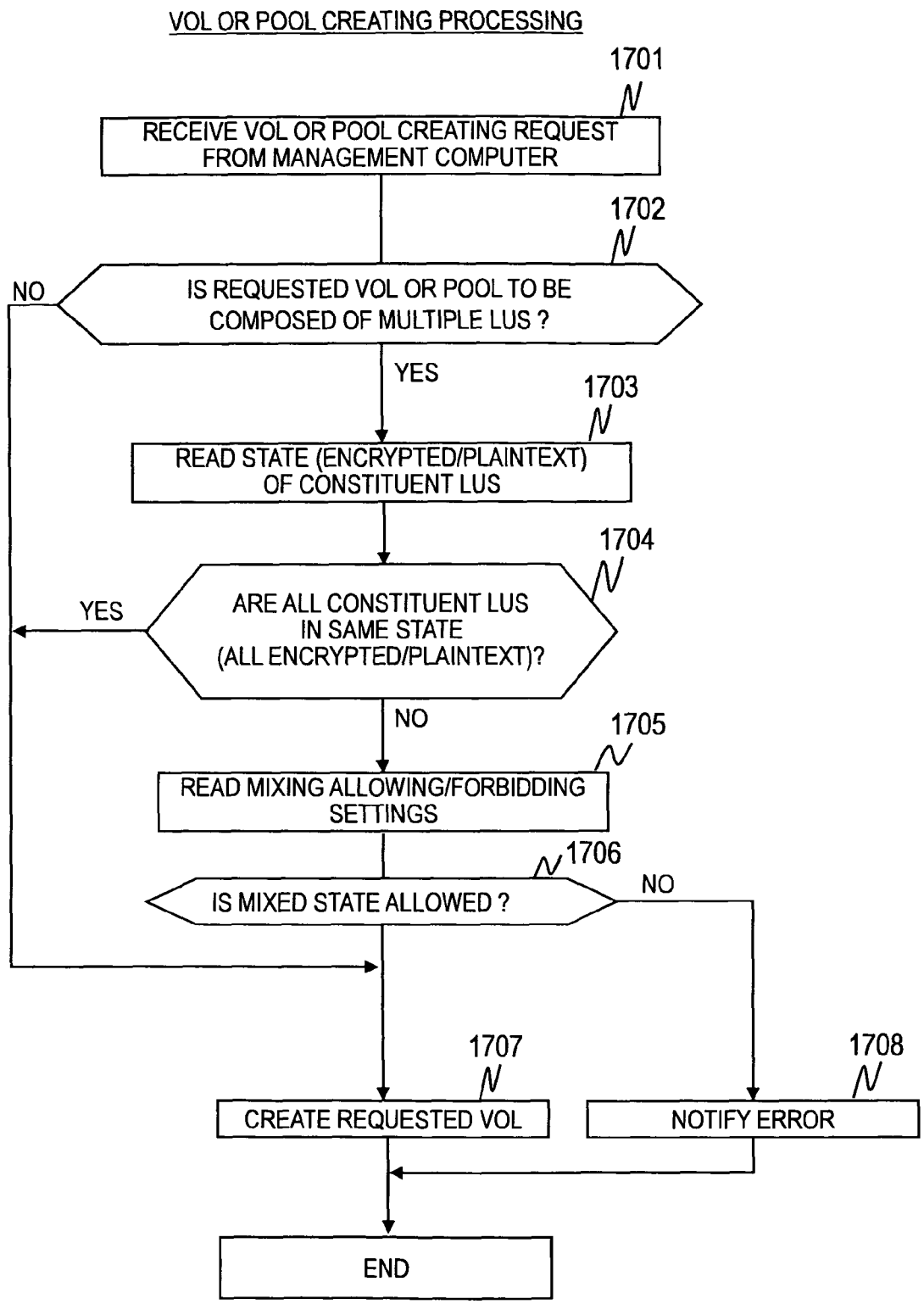
FIG. 17A is a flow chart showing an example of storage area state control processing in actual Vol or Pool creation which is executed by the storage management program of each storage system in accordance with a first embodiment of this invention.

FIG. 17A is a flow chart showing an example of storage area state control processing in actual Vol or Pool creation which is executed by the storage management program 212 of each storage system 120 according to the first embodiment of this invention.

The storage management program 212 of the storage system 120 receives a request to create an actual Vol or Pool from the management computer 140 (Step 1701). The received actual Vol or Pool creating request contains information about which LU is to be used to create an actual Vol or Pool. For example, an actual Vol or Pool creating request in the case of capacity expansion contains information saying that LU1 and LU2 are to be combined to create a new expanded Vol (e.g., P-Vol1 in the capacity expanding function).

The storage management program 212 next judges from the information contained in the received request whether or not the actual Vol or Pool is requested to be created from a plurality of LUs (Step 1702). In the case of creating a Pool from two LUs, for example, the storage management program 212 judges that the Pool is created from a plurality of LUs. In the case of creating a Pool from a single LU, the storage management program 212 judges that the Pool is not created from a plurality of LUs. The judgment is made based on the above-mentioned request information which is received from the management computer 140.

When it is judged that the actual Vol or Pool is requested to be created from a plurality of LUs, the storage management program 212 refers to the item 305 of the LU management information 201 to read the states (encrypted state, plaintext state) of those LUs (Step 1703). When it is judged that the actual Vol or Pool is not requested to be created from a plurality of LUs, the storage management program 212 proceeds to Step 1707.

The storage management program 212 judges from the state information of those LUs read in Step 1703 whether or not all the LUs are in the same state (all the LUs are in the encrypted state or all the LUs are in the plaintext state) (Step 1704).

When it is judged that some of the LUs are in a state different from that of the rest of the LUs, in other words, when it is judged that the actual Vol or Pool created by the request is going to have a mixed state, the storage management program 212 reads the mixing allowing/forbidding settings information 207 (Step 1705). When it is judged that all the LUs are in the same state (all the LUs are in the encrypted state or all the LUs are in the plaintext state), the storage management program 212 proceeds to Step 1707.

The storage management program 212 next judges from the read mixing allowing/forbidding settings information 207 whether the mixed state is allowed or not (Step 1706).

When it is judged that the mixed state is allowed, the storage management program 212 creates the actual Vol or Pool as requested in the actual Vol or Pool creating request (Step 1707).

Whether the mixed state is allowed or not is judged by referring to the item 1201 of FIG. 12A, the item 1211 of FIG. 12B, the item 1222 of FIG. 12C, or the item 1232 of FIG. 12D. For example, when "1" is set to the mixing allowing/forbidding settings item 1201 in the setting method of FIG. 12A, the storage management program 212 allows the mixed state and, if the created actual Vol or Pool is in the mixed state, issues an alert to the management computer 140.

When it is judged in Step 1706 that the mixed state is not allowed, the storage management program 212 notifies the management computer 140 of the error and ends the processing (Step 1708).

(Processing of Controlling the Storage Area State when Adding an LU to an Actual Vol or Pool in a Storage System)

Figure 17B:
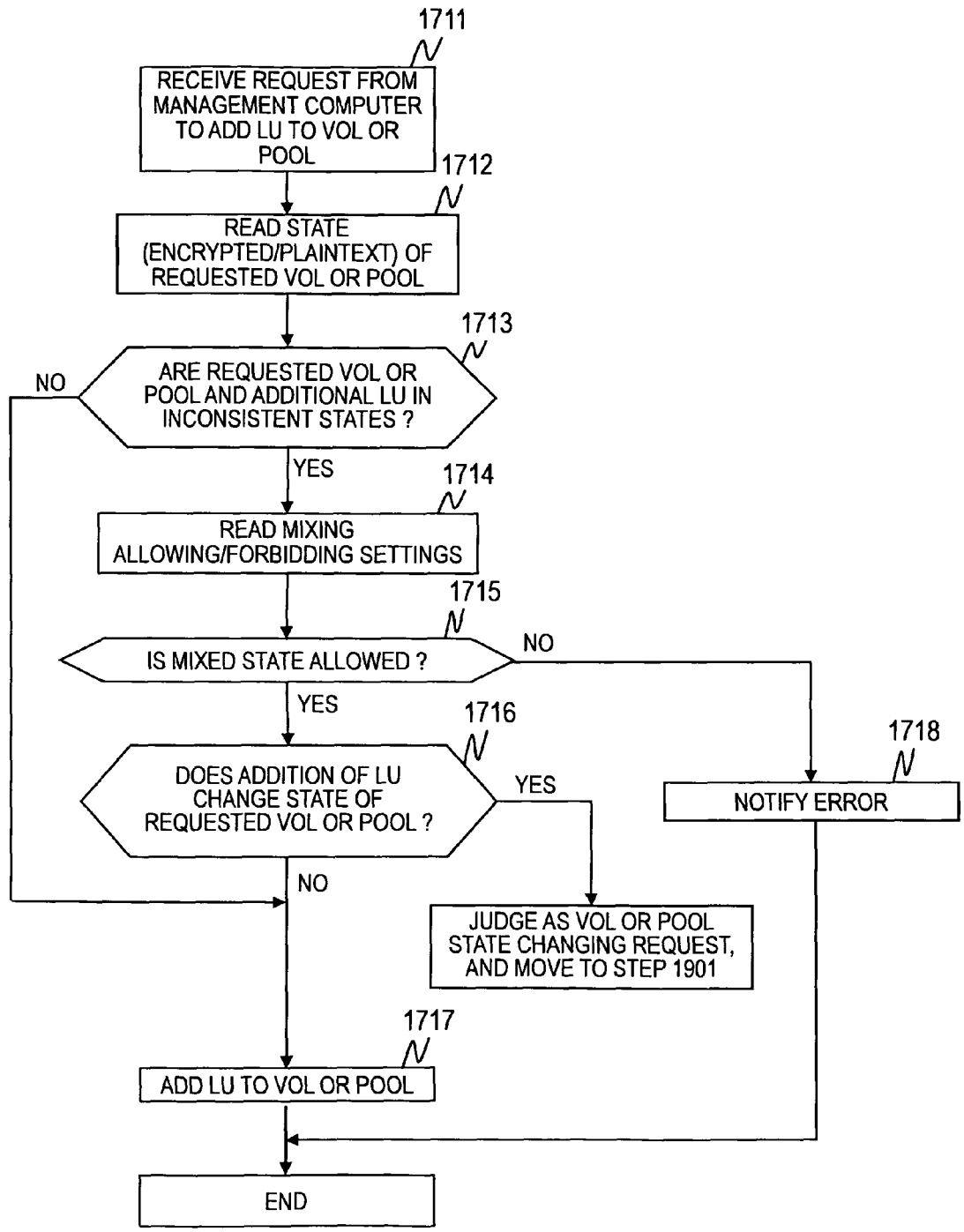
FIG. 17B is a flow chart showing an example of processing of controlling the storage area state when adding an LU to an actual Vol or Pool which is executed by the storage management program of each storage system in accordance with a first embodiment of this invention.

FIG. 17B is a flow chart showing an example of processing of controlling the storage area state when adding an LU to an actual Vol or Pool which is executed by the storage management program 212 of each storage system 120 according to the first embodiment of this invention.

The storage management program 212 of the storage system 120 receives a request to add an LU to an actual Vol or Pool from the management computer 140 (Step 1711). The received request contains which LU is to be added to which actual Vol or Pool. For example, an LU adding request in the case of capacity expansion contains information saying that LU3 is to be added to an existing expanded Vol (e.g., P-Vol1 in the capacity expanding function).

The storage management program 212 next refers to the item 705 that is associated with the Vol or Pool specified in the request to read the state (encrypted state or plaintext state) of the Vol or Pool specified in the request (Step 1712).

The storage management program 212 then judges whether or not the state of the Vol or Pool specified in the request differs from the state of the LU to be added (for example, both are in the encrypted state) (Step 1713).

When it is judged that the Vol or Pool specified in the request and the LU to be added are in different states, in other words, when it is judged that adding this LU creates the mixed state in the specified Vol or Pool, the storage management program 212 reads the mixing allowing/forbidding settings information 207 (Step 1714). When it is judged that the Vol or Pool specified in the request and the LU to be added are in identical states, the storage management program 212 proceeds to Step 1717.

The storage management program 212 next judges from the read mixing allowing/forbidding settings information 207 whether the mixed state is allowed or not (Step 1715).

When it is judged that the mixed state is allowed, the storage management program 212 judges whether or not adding the specified LU to the specified Vol or Pool as requested changes the state of the Vol or Pool to which the LU is added (Step 1716). In the case of adding a plaintext state LU to an encrypted state Pool, for example, the addition turns the Pool into the mixed state and it is judged that the addition causes a state change.

When it is judged that adding the specified LU to the specified Vol or Pool as requested does not change the state of the Vol or Pool to which the LU is added, the storage management program 212 adds this LU to the Vol or Pool specified in the request (Step 1717), and ends the processing. Cases where it is judged that adding the specified LU to the specified Vol or Pool as requested does not change the state of the Vol or Pool to which the LU is added include a case of adding an encrypted state LU to a mixed state Pool. In this case, the state of the Pool after the addition of the LU remains the mixed state as before the addition of the LU.

Whether the mixed state is allowed or not is judged in the same way as in Step 1706, by referring to the item 1201 of FIG. 12A, the item 1211 of FIG. 12B, the item 1222 of FIG. 12C, or the item 1232 of FIG. 12D.

When it is judged in Step 1715 that the mixed state is not allowed, the storage management program 212 notifies the management computer 140 of the error and ends the processing (Step 1718).

When it is judged in Step 1716 that adding the specified LU to the specified Vol or Pool as requested changes the state of the Vol or Pool to which the LU is added, the storage management program 212 judges the received request as a Vol or Pool state changing request, and proceeds to Step 1901, which will be described later.

This is the end of the description on the processing of controlling the storage area state when adding an LU to an actual Vol or Pool in a storage system.

A case of adding a plaintext LU to an encrypted state Pool will be described as a typical example of the above-mentioned processing of controlling the storage area state when adding an LU to an actual Vol or Pool in a storage system. Mixing allowing/forbidding settings in the following example include "#2" as the item 1102, which means that a Pool having a mixed state storage area is automatically set to the encrypted state. Three different methods of automatically setting a Pool to the encrypted state will be described.

First processing method: a case where a request is received to add an unused plaintext LU within a RAID group to an encrypted state Pool Upon reception of the LU adding request, the encryption setting program 210 of the storage system 120 sets the unused plaintext RAID group to "Encryption On" and formats LUs in this RAID group as encrypted data storage LUs. The storage management program 212 then adds the requested LU (now belonging to an encrypted RAID group by the "Encryption On" setting) to the requested Pool.

Second processing method: a case where a request is received to add a used LU (an LU that is already in use and storing data) within a plaintext RAID group to an encrypted state Pool If LUs within the used plaintext RAID group are simply set to "Encryption On", the LUs within the plaintext RAID group are formatted as encrypted data storage LUs and existing data in the LUs of the plaintext RAID group is deleted. For that reason, the storage management program 212 first copies (evacuates) every piece of data stored in the LUs of the plaintext RAID group to another RAID group. The encryption setting program 210 thereafter sets the LUs within the plaintext RAID group to "Encryption On" and the storage management program 212 adds the LU requested to be added to the requested Pool.

Third processing method: another processing method in the same situation as the second processing method The storage management program 212 secures an LU located in an encrypted RAID group and having the same capacity as that of the LU requested to be added. The storage management program 212 adds the secured LU within the encrypted RAID group, instead of the LU in the plaintext RAID group, to the requested Pool. LUs that can be used by the Pool in question are allocated in advance by specifying a sequence of LUs with a RAID group number or the like. The storage management program 212 may take an encrypted LU or encrypted LUs whose combined capacity reaches the necessary capacity (for example, a capacity specified by the user or a capacity used up by data write) out of the sequence of allocated LUs, and add the encrypted LU(s) to the Pool. Alternatively, the storage management program 212 may take an encrypted LU or encrypted LUs whose combined capacity reaches the necessary capacity out of an arbitrary storage area that has a free capacity, and add the encrypted LU(s) to the Pool. This is the end of the description on a typical example of the control processing for adding an LU.

(Storage Area State Control Processing when Correlating Vols or Pools in a Storage System)

Figure 18:
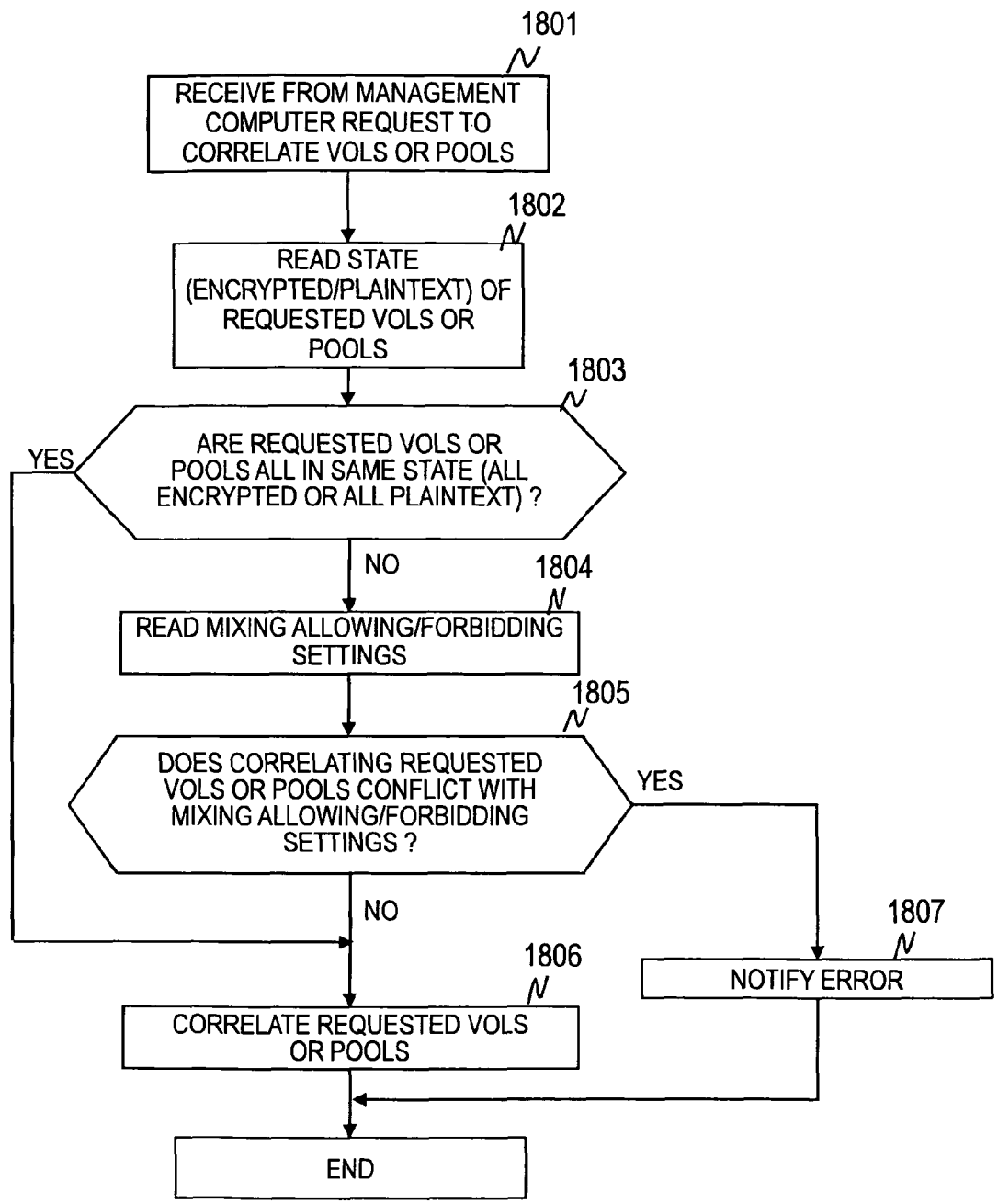
FIG. 18 is a flow chart showing an example of storage area state control processing when correlating Vols or Pools which is executed by the storage management program of each storage system in accordance with a first embodiment of this invention.

FIG. 18 is a flow chart showing an example of storage area state control processing when correlating Vols or Pools which is executed by the storage management program 212 of each storage system 120 according to the first embodiment of this invention.

The storage management program 212 of the storage system 120 receives a request to set a correlation between Vols or Pools from the management computer 140 (Step 1801). The received request to set a correlation between Vols or Pools contains information about which Vols or Pools are to be correlated. For example, a correlation setting request in the case of creating a copy pair contains information saying that LU1 is to be P-Vol1 and LU2 is to be S-Vol1, which is paired with P-Vol1.

The storage management program 212 next reads the states (encrypted state or plaintext state) of the Vols or Pools requested to be correlated (Step 1802). Specifically, in the case where Vols or Pools that are already registered as the item 703 are to be correlated, the states of the Vols or Pools are checked by referring to the item 705. In the case where unregistered Vols or Pools are to be correlated, the information about Vols and Pools received in Step 1801 is used to identify LUs that constitute the Vols or Pools, and the LU management information 201 is searched for the item 305 of each of the constituent LUs to check the states of the Vols or Pools.

For instance, in creating a new copy pair (from P-Vol1 and S-Vol1), the Vols are not registered as the item 703 and accordingly the states of the Vols are checked by referring to the item 305 of the LU management information 201 with the use of information on LUs specified in the copy pair creating request, instead of referring to the item 705. On the other hand, in the case of pairing S-Vol2 with already registered P-Vol1 to create another copy pair, the state of P-Vol1 can be checked from the item 705. As for correlating Pools, all Pools are registered as the item 703 upon their creation prior to correlation. Alternatively, Pools may be registered as the item 703 at the time of correlating the Pools.

The storage management program 212 next judges whether or not the Vols or Pools requested to be correlated are all in the same state (all are in the encrypted state or all are in the plaintext state) (Step 1803).

When it is judged that not all of the Vols or Pools requested to be correlated are in the same state, in other words, when it is judged that the states of the Vols or Pools do not match, the storage management program 212 reads the mixing allowing/forbidding settings information 207 (Step 1804). When it is judged that the Vols or Pools requested to be correlated are all in the same state, the storage management program 212 proceeds to Step 1806.

The storage management program 212 next judges whether or not the request conflicts with the mixing allowing/forbidding settings (Step 1805).

When it is judged that the request does not conflict with the mixing allowing/forbidding settings, the storage management program 212 correlates the Vols or Pools and ends the processing (Step 1806). Specifically, the storage management program 212 updates the items 703 and 706 of FIG. 7A with the correlation information.

Whether or not the request conflicts with the mixing allowing/forbidding settings is judged by referring to the item 1202, 1212, 1223, or 1232 of FIGS. 12A to 12D. For example, in the case where mixing allowing/forbidding settings are set by the method shown in FIG. 12A and "1" is set in the item 1202, the storage management program 212 permits the creation of such a copy pair as one whose P-Vol is in the encrypted state and S-Vol is in the encrypted state, and prohibits the creation of such a copy pair as one whose P-Vol is in the encrypted state and S-Vol is in the plaintext state.

When it is judged in Step 1805 that the request conflicts with the mixing allowing/forbidding settings, the storage management program 212 notifies the management computer 140 of the error and ends the processing (Step 1807).

(Control Processing in an Operation of Changing the Storage Area State in a Storage System)

Figure 19A:
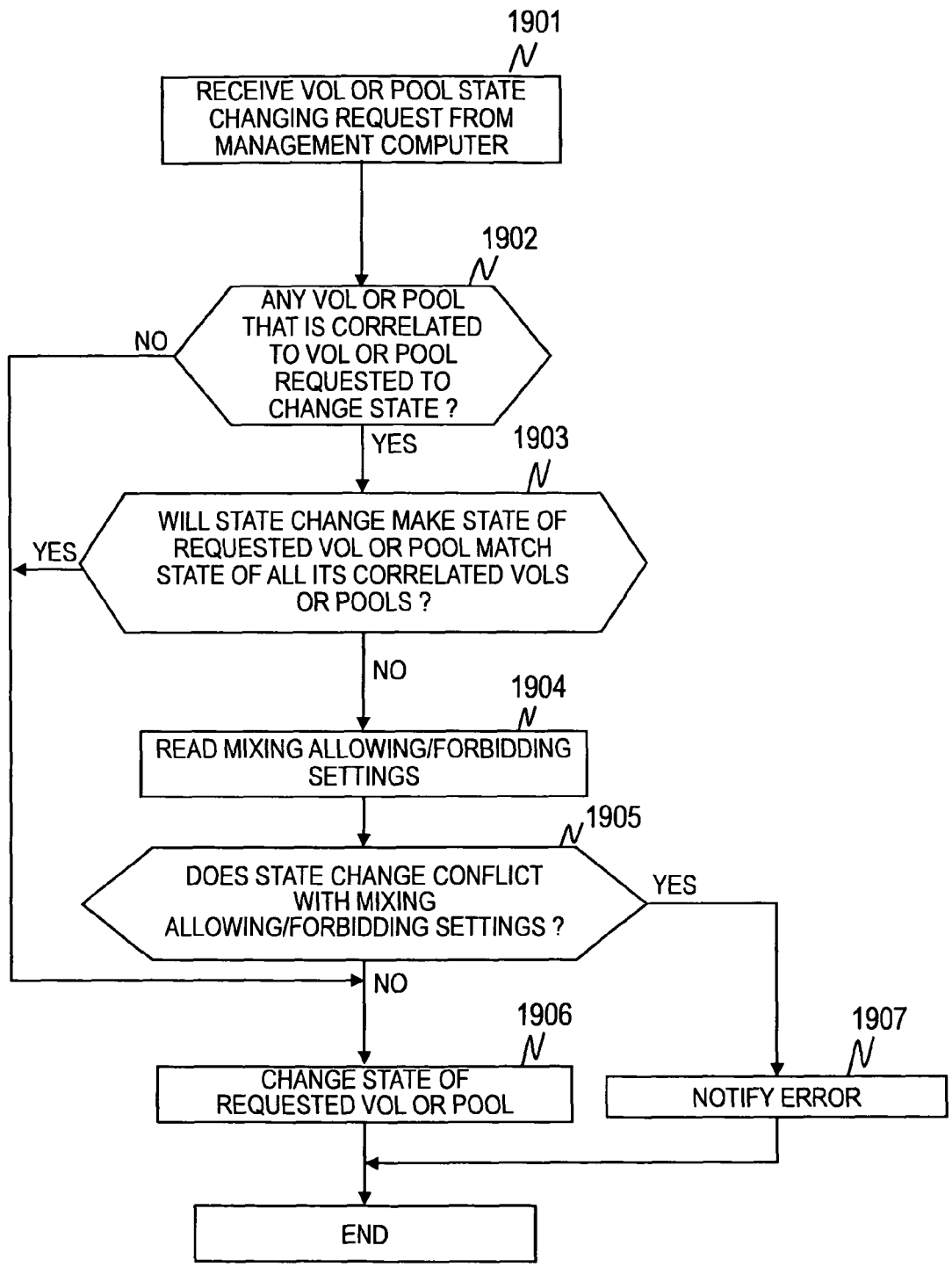
FIG. 19A is a flow chart showing an example of control processing in an operation of changing the Vol or Pool state which is executed by the encryption setting program of each storage system in accordance with a first embodiment of this invention.

FIG. 19A is a flow chart showing an example of control processing in an operation of changing the Vol or Pool state which is executed by the encryption setting program 210 of each storage system 120 according to the first embodiment of this invention. In the following description, changing the storage area state is referred to as state change.

The encryption setting program 210 of the storage system 120 receives from the management computer 140 a request for a state change of a Vol, Pool, or other types of storage area, such as a change from the encrypted state to the plaintext state (Step 1901). The received request contains information about which Vol or Pool is to be changed to which state. For example, the request contains information saying that P-Vol1 used in the copy pair function is to be changed from the encrypted state to the plaintext state.

The encryption setting program 210 next checks whether or not any Vol or Pool is correlated to the Vol or Pool whose state is requested to be changed (Step 1902). Specifically, the encryption setting program 210 refers to the item 706 that is associated with the Vol or Pool whose state is requested to be changed and, when there is a value registered as the item 706, judges that the Vol or Pool has a correlated Vol or Pool.

When it is judged that there is a Vol or Pool correlated to the Vol or Pool whose state is requested to be changed, the encryption setting program 210 judges whether or not the requested state change puts the Vol or Pool whose state is requested to be changed and its correlated Vols or Pools all in the same state (Step 1903). Specifically, the encryption setting program 210 refers to the item 705 to obtain the state of every correlated Vol or Pool, and judges whether or not the obtained state of every correlated Vol or Pool is the same as the changed state of the requested Vol or Pool.

When it is judged that the requested state change does not put the Vol or Pool whose state is requested to be changed and its correlated Vols or Pools all in the same state, in other words, when it is judged that the changed state of the requested Vol or Pool does not match the state of its correlated Vol or Pool, the encryption setting program 210 reads the mixing allowing/forbidding settings information 207 (Step 1904). When it is judged that the requested state change puts the Vol or Pool whose state is requested to be changed and its correlated Vols or Pools all in the same state, the encryption setting program 210 proceeds to Step 1906.

The encryption setting program 210 next judges whether or not the state change request conflicts with the mixing allowing/forbidding settings (Step 1905).

When it is judged that the state change request does not conflict with the mixing allowing/forbidding settings, the encryption setting program 210 further checks whether or not the correlated Vol or Pool has a correlation with any other Vol or Pool, and then changes the state of the Vol or Pool whose state is requested to be changed (Step 1906). Information obtained by checking whether or not the correlated Vol or Pool has a correlation with any other Vol or Pool may be used in a new round of state change processing, or may just be kept. Whether or not the state change request conflicts with the mixing allowing/forbidding settings is judged by referring to the item 1202 of FIG. 12A, the item 1212 of FIG. 12B, the item 1223 of FIG. 12C, and the item 1232 of FIG. 12D.

For example, when mixing allowing/forbidding settings are set by the method shown in FIG. 12A and "1, 4" is set as the item 1202, and a copy pair is to be created from encrypted state P-Vol1 and encrypted state S-Vol1, the encryption setting program 210 prohibits an operation that converts S-Vol1 to the plaintext state according to the settings "1", and permits an operation that converts P-Vol1 to the plaintext state according to the settings "4".

When it is judged in Step 1905 that the state change request conflicts with the mixing allowing/forbidding settings, the encryption setting program 210 notifies the management computer 140 of the error and ends the processing (Step 1907).

Some storage systems 120 can employ a cascade configuration for Vols.

A cascade configuration is a multistage configuration in which, for example, S-Vol1 serves as a copy of P-Vol1 and is further set as a new separate P-Vol (e.g., P-Vol2), and a copy of this P-Vol2 is made in another S-Vol (S-Vol2).

The substance of S-Vol1 and the substance of P-Vol2 in this example are the same. A modification example of the above-mentioned control processing in an operation of changing the storage area state in a storage system will be given below in which the storage system can have a cascade configuration. The description refers to FIGS. 7B and 19B, and focuses on differences from the above-mentioned control processing.

FIG. 7B is an explanatory diagram showing an example of the Vol correlation management information 205 in the storage system 120 that can have a cascade configuration according to the first embodiment of this invention.

FIG. 7B contains a new item 707 in addition to the items shown in FIG. 7A. The item 707 is information indicating whether or not Vols in the storage system 120 take a cascade configuration.

In the example of FIG. 7B, data in a "group-layer" format is stored as the item 707. "Group" is information for identifying an aggregation of Vols connected by cascade connection (cascade group), and indicates to which cascade group the Vol in question belongs. "Layer" indicates in which layer within the identified cascade group the Vol in question is located. In FIG. 7B, "a–1" is registered as the item 707 for P-Vol1, indicating that P-Vol1 belongs to a group "a" and is located in the first layer (topmost layer) within the group. A value "a–2" indicates that the Vol is one layer below "a–1" and is connected to "a–1" by cascade connection. A value "b–1" indicates that the Vol belongs to an entirely different group from the one indicated by "a–1" and "a–2".

Figure 19B:
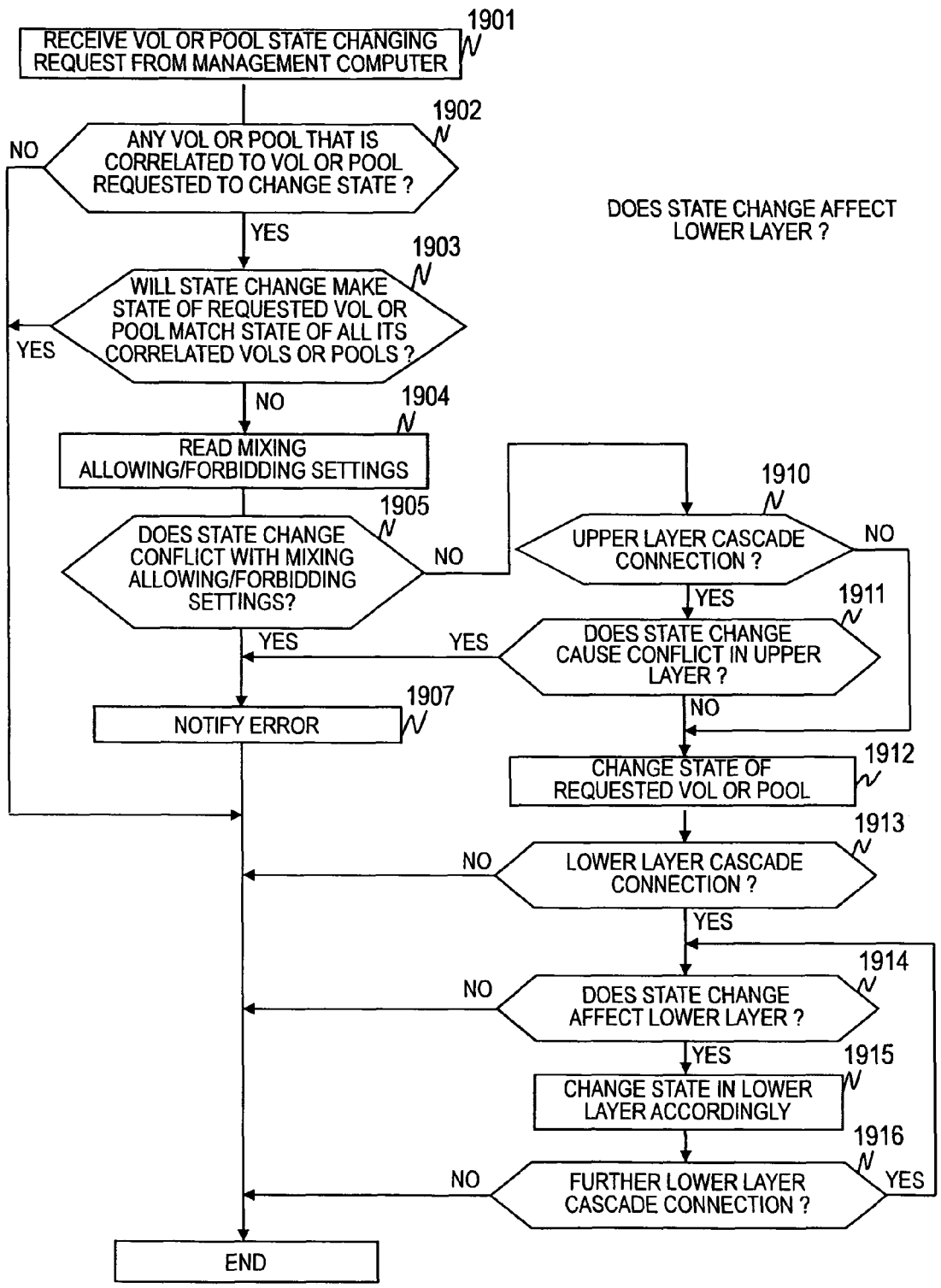
FIG. 19B is a flow chart showing a modification example of the control processing in an operation of changing the Vol or Pool state which is executed by the encryption setting program of a storage system that can have a cascade configuration in accordance with a first embodiment of this invention.

FIG. 19B is a flow chart showing a modification example of the control processing in an operation of changing the Vol or Pool state which is executed by the encryption setting program 210 of a storage system that can have a cascade configuration according to the first embodiment of this invention.

When it is judged in Step 1905 that the state change request does not conflict with the mixing allowing/forbidding settings, the encryption setting program 210 judges whether or not the Vol whose state is requested to be changed is a part of a cascade configuration and is coupled to an upper layer. In other words, whether or not there is a cascade connection with an upper layer is judged (Step 1910). Specifically, the encryption setting program 210 judges whether or not the Vol is a part of a cascade configuration by referring to the item 707, and further judges whether or not there is a storage area in an upper layer by referring to the "layer" part of the item 707. In the case where the "layer" part holds a value "1", this means that the Vol belongs to the topmost layer and the encryption setting program 210 judges that there is no upper layer. In the case where the "layer" part holds a value "2", the encryption setting program 210 judges that there is an upper layer, the layer 1.

When it is judged that the Vol does not have a cascade connection with an upper layer, the encryption setting program 210 proceeds to Step 1912. When it is judged that the Vol has a cascade connection with an upper layer, the encryption setting program 210 judges whether or not the requested state change conflicts with the mixing allowing/forbidding settings in the upper layer storage area as well (Step 1911). Specifically, when changing the state of the lower layer storage area also changes the state of the upper layer storage area, whether the state change in the upper layer storage area conflicts with the mixing allowing/forbidding settings or not is judged.

When it is judged that the state change conflicts with the mixing allowing/forbidding settings in the upper layer storage area, the encryption setting program 210 proceeds to Step 1907. When it is judged that the state change does not conflict with the mixing allowing/forbidding settings in the upper layer storage area as well, the encryption setting program 210 changes the state of the Vol or Pool as requested (Step 1912).

For example, changing the state of a P-Vol in the layer 2 equals to changing the state of an S-Vol in the layer 1 since the substance of the P-Vol in the layer 2 and the substance of the S-Vol in the layer 1 are the same. The encryption setting program 210 judges in Step 1911 whether or not this state change in the upper layer (layer 1) conflicts with the mixing allowing/forbidding settings. For example, when the P-Vol and the S-Vol in the layer 1 are both in the encrypted state and mixing allowing/forbidding settings are set such that the S-Vol has to be in the encrypted state while the P-Vol is in the encrypted state, changing the P-Vol in the layer 2 (the S-Vol in the layer 1) from the encrypted state to the plaintext state conflicts with the mixing allowing/forbidding settings in the upper layer storage area, too, and therefore the requested state change is not executed.

The encryption setting program 210 next judges whether or not there is a Vol in a layer below the Vol whose state is requested to be changed. In other words, whether or not the Vol has a cascade connection with a lower layer is judged (Step 1913). Step 1913 employs the same judging method as the one used in Step 1910.

When it is judged that the Vol does not have a cascade connection with a lower layer, the encryption setting program 210 ends the processing. When it is judged that the Vol has a cascade connection with a lower layer, the encryption setting program 210 judges whether or not changing the state of the Vol or Pool as requested affects the lower layer storage area (Step 1914).

For example, when the P-Vols and the S-Vols are in the plaintext state in both the layer 1 and the layer 2 and mixing allowing/forbidding settings are set such that a conversion of the P-Vol to the encrypted state also converts the S-Vol to the encrypted state, changing the P-Vol in the layer 1 from the plaintext state to the encrypted state changes the S-Vol in the layer 1 to the encrypted state as well. The encryption setting program 210 judges in Step 1914 whether this change carries over to the Vols in the layer 2. Specifically, in the above example, changing the S-Vol in the layer 1 to the encrypted state changes the state of the P-Vol in the layer 2 and, according to the mixing allowing/forbidding settings, the S-Vol in the layer 2 also has to be changed to the encrypted state. In such cases, it is judged that a state change in the layer 1 affects Vols in the layer 2.

When it is judged that the requested state change does not affect the lower layer storage area, the encryption setting program 210 ends the processing. On the other hand, when it is judged that the requested state change affects the lower layer storage area, the encryption setting program 210 changes the state of the lower layer storage area as well (Step 1915), and judges whether or not the Vol has a cascade connection with a further lower layer (Step 1916). When it is judged that there is no cascade connection with a lower layer, the processing is ended. When it is judged that there is a cascade connection with a lower layer, the encryption setting program 210 proceeds to Step 1914, repeats Steps 1914 to 1916 until no cascade connection with a lower layer is left, and then ends the processing.

In the above-mentioned control processing in an operation of changing the storage area state, the storage area state is changed on a Vol or Pool basis which is defined specifically to the respective functions of the storage system 120. Alternatively, the storage area state may be changed on an LU basis which constitutes a Pool.

Control processing of the storage system 120 with an LU set as the unit of state change will be described below.

Figure 20:
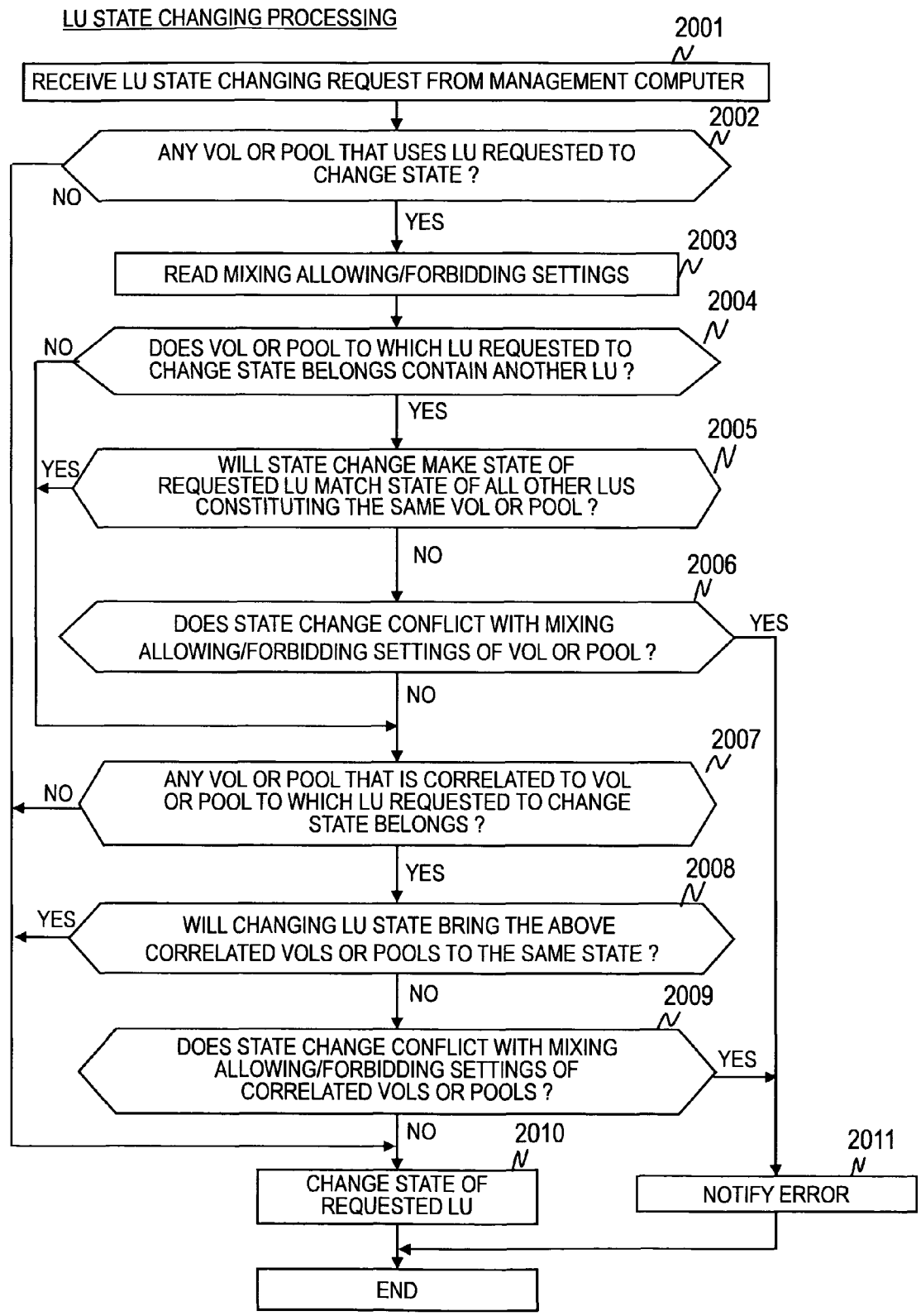
FIG. 20 is a flow chart showing an example of control processing which is executed, when the storage area state is changed on an LU basis, by the encryption setting program of each storage system in accordance with a first embodiment of this invention.

FIG. 20 is a flow chart showing an example of control processing which is executed, when the storage area state is changed on an LU basis, by the encryption setting program 210 of each storage system 120 according to the first embodiment of this invention.

The encryption setting program 210 of the storage system 120 receives from the management computer 140 a request to change the state of an LU (Step 2001). The received state change request contains information about which LU is to be changed to which state. For example, the request contains information saying that an LU in CLA1-000 is to be changed from the encrypted state to the plaintext state.

The encryption setting program 210 next judges whether or not the LU whose state is requested to be changed is used by any Vol or Pool (Step 2002). Specifically, the encryption setting program 210 refers to the item 704 to check whether or not the LU whose state is requested to be changed is registered and, when the LU is registered, judges that there is a Vol or Pool that uses the LU.

When it is judged that there is a Vol or Pool that uses the LU, the encryption setting program 210 reads the mixing allowing/forbidding settings information 207 (Step 2003). When it is judged that no Vol or Pool uses the LU, the encryption setting program 210 proceeds to Step 2010.

The encryption setting program 210 next judges whether or not the Vol or Pool that uses the LU contains another LU (Step 2004). Specifically, the encryption setting program 210 judges that the Vol or Pool that uses the LU contains another LU when other LUs are registered as the item 704 that is associated with this Vol or Pool.

When it is judged that the Vol or Pool that uses the LU does not contain another LU, the encryption setting program 210 proceeds to Step 2007. When it is judged that the Vol or Pool that uses the LU contains another LU, the encryption setting program 210 judges whether or not the requested state change puts the LU and all other LUs found in Step 2004 in the same state (Step 2005). Specifically, the encryption setting program 210 judges the state of every LU found in Step 2004 by referring to the item 305 of FIG. 3.

When it is judged that the requested state change puts the LU and all the other LUs in the same state, the encryption setting program 210 proceeds to Step 2007. When it is judged that the requested state change does not put the LU and all the other LUs in the same state, the encryption setting program 210 judges from the mixing allowing/forbidding settings information 207 read in Step 2003 whether or not changing the state of the LU as requested conflicts with the mixing allowing/forbidding settings in actual Vol or Pool creation (Step 2006). Whether the state change causes a conflict or not is judged the same way as in Step 1706, by referring to the item 1201, 1211, 1222, or 1232 of FIGS. 12A to 12D.

When it is judged that changing the state of the LU as requested conflicts with the mixing allowing/forbidding settings in actual Vol or Pool creation, the encryption setting program 210 proceeds to Step 2011. When it is judged that changing the state of the LU as requested does not conflict with the mixing allowing/forbidding settings in actual Vol or Pool creation, the encryption setting program 210 judges whether or not any Vol or Pool is correlated to the Vol or Pool that uses the LU whose state is requested to be changed (Step 2007). Specifically, the encryption setting program 210 refers to the item 706 that is associated with the Vol or Pool that uses the LU whose state is requested to be changed and, when a Vol or Pool is registered as the item 706, judges that there is a correlated Vol or Pool.

When it is judged that no Vol or Pool is correlated to the Vol or Pool that uses the LU whose state is requested to be changed, the encryption setting program 210 proceeds to Step 2010. When it is judged that there is a Vol or Pool correlated to the Vol or Pool that uses the LU whose state is requested to be changed, the encryption setting program 210 judges whether or not changing the state of the LU as requested puts the Vol or Pool that uses the LU and all of its correlated Vols or Pools in the same state (Step 2008). Specifically, the encryption setting program 210 refers to the item 705 to obtain the state of every correlated Vol or Pool and judges whether or not changing the state of the LU as requested causes the Vol or Pool that uses the LU to shift to a state that matches the obtained state of every correlated Vol or Pool.

When it is judged that changing the state of the LU as requested puts the Vol or Pool that uses the LU and all of its correlated Vols or Pools in the same state, the encryption setting program 210 proceeds to Step 2010. When it is judged that changing the state of the LU as requested does not put the Vol or Pool that uses the LU and all of its correlated Vols or Pools in the same state, the encryption setting program 210 judges from the mixing allowing/forbidding settings information 207 read in Step 2005 whether or not the requested state change conflicts with the mixing allowing/forbidding settings (Step 2009).

When it is judged that the requested state change does not conflict with the mixing allowing/forbidding settings, the encryption setting program 210 changes the state of the LU as requested (Step 2010). Whether or not the requested state change conflicts with the mixing allowing/forbidding settings is judged by the same way as in Step 1905, by referring to the item 1202 of FIG. 12A, the item 1212 of FIG. 12B, the item 1223 of FIG. 12C, or the item 1232 of FIG. 12D. When it is judged in Step 2009 that the requested state change conflicts with the mixing allowing/forbidding settings, the encryption setting program 210 notifies the management computer 140 of the error and ends the processing (Step 2011).

As a specific example of the control processing that uses an LU as the processing unit in a state change operation, a state change of an LU that constitutes a capacity-expanded Vol will be described.

An expanded Vol1 is a Vol obtained by combining LU1 and LU2, and an expanded Vol2 is a Vol obtained by combining LU3 and LU4. The expanded Vol1 and the expanded Vol2 form a copy pair. Specifically, the expanded Vol1 is P-Vol1 and the expanded Vol2 is S-Vol1, and data is copied from P-Vol1 to S-Vol1. P-Vol1 (LU1 and LU2) and S-Vol1 (LU3 and LU4) are both in the encrypted state. Mixing allowing/forbidding settings are set by the method of FIG. 12A, "1" is set in the item 1201, and "1, 4, 7" is set in the item 1202.

In this setup, upon reception of a request to change LU3 from the encrypted state to the plaintext state, the encryption setting program 210 executes steps up through Step 2004 and, since S-Vol1 contains another LU in addition to LU3, namely, LU4 (Step 2004), further proceeds to Step 2005.

In Step 2005, changing the state of LU3 puts LU3 and LU4 in different states (changes S-Vol1 to the mixed state). The encryption setting program 210 proceeds to Step 2006.

In Step 2006, it is judged that the state change of LU3 does not conflict with the mixing allowing/forbidding settings since "1" is set in the item 1201, allowing the S-Vol to be in the mixed state. The encryption setting program 210 accordingly proceeds to Step 2007.

In Step 2007, S-Vol1 is correlated with P-Vol1. The encryption setting program 210 accordingly proceeds to Step 2008.

In Step 2008, changing the state of LU3 makes the state of S-Vol1 differ from the encrypted state of P-Vol1 by changing S-Vol1 to the mixed state. The encryption setting program 210 accordingly proceeds to Step 2009.

In Step 2009, "1" set in the item 1202 forbids the S-Vol to be in any other states than the encrypted state while the P-Vol is in the encrypted state. The encryption setting program 210 therefore judges that the state change of LU3 conflicts with the mixing allowing/forbidding settings and the state change is not allowed, and proceeds to Step 2011, where the management computer 140 is notified of the error and the processing is ended.

This is the end of the description on a specific example of the control processing that uses an LU as the processing unit in a state change operation.

As a special example of the control processing in an operation of changing the storage area state, control processing in an operation of changing the state of the S-Vol in the snapshot function will be described.

The S-Vol in the snapshot function is a virtual Vol which does not store actual data. The S-Vol which is a virtual Vol is dependent on the relation between the state of the P-Vol and the state of the Pool, and its own state is determined by the relation between the state of the P-Vol and the state of the Pool. The state of the S-Vol can therefore be changed to any state by changing the state of the P-Vol or the state of the Pool, which means that it is not always necessary for the computer system to have a configuration that can make a state change request directly to the virtual S-Vol. In the following description, however, a state change request can be made directly to the virtual S-Vol, and control processing in a state change operation in this setup will be described.

Figure 25:
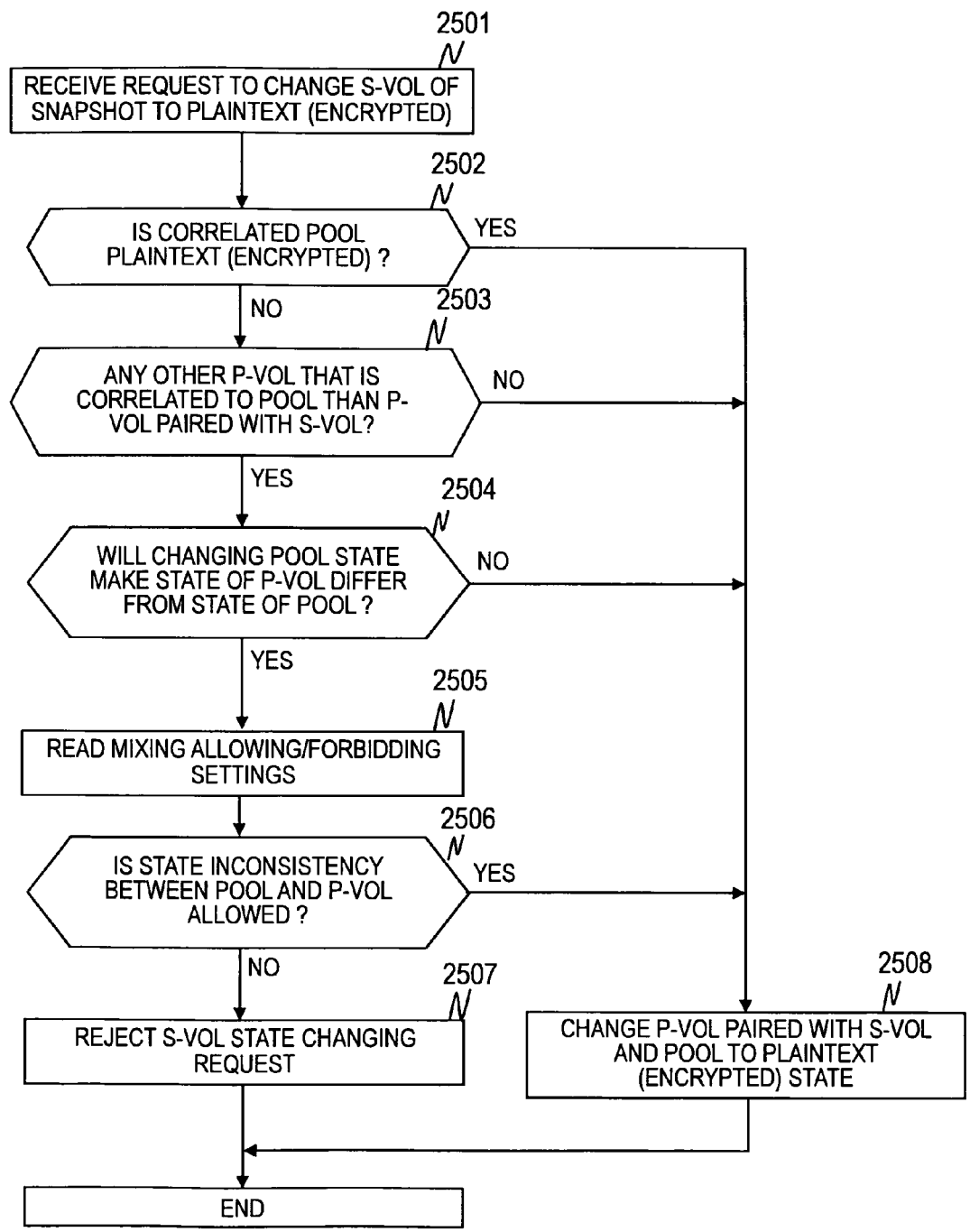
FIG. 25 is a flow chart showing an example of control processing in an operation of changing the state of the S-Vol in the snapshot function which is executed by the encryption setting program of each storage system in accordance with the first embodiment of this invention.

FIG. 25 is a flow chart showing an example of control processing in an operation of changing the state of the S-Vol in the snapshot function which is executed by the encryption setting program 210 of each storage system 120 according to the first embodiment of this invention.

The encryption setting program 210 of the storage system 120 receives from the management computer 140 a request to change the S-Vol of a snapshot pair to the plaintext state (or the encrypted state) (Step 2501).

The encryption setting program 210 judges whether or not a Pool which the S-Vol of the snapshot pair refers to is in the plaintext state (or the encrypted state) (Step 2502).

When it is judged that the Pool which the S-Vol refers to is in the plaintext state (or the encrypted state), the encryption setting program 210 proceeds to Step 2508. When it is judged that the Pool which the S-Vol refers to is not in the plaintext state (or the encrypted state), the encryption setting program 210 judges whether or not any other P-Vol is correlated with the Pool which the S-Vol refers to than the P-Vol paired with the S-Vol (Step 2503). Specifically, the encryption setting program 210 judges whether or not other P-Vols than the P-Vol paired with the S-Vol are registered as the item 706 for the referred-to Pool.

When it is judged that no other P-Vol is correlated to the Pool which the S-Vol refers to, the encryption setting program 210 proceeds to Step 2508. When it is judged that another P-Vol is correlated to the Pool which the S-Vol refers to, the encryption setting program 210 judges whether or not changing the Pool which the S-Vol refers to to the plaintext state (or the encrypted state) makes the state of the other P-Vol correlated to the Pool which the S-Vol refers to differ from the state of the Pool which the S-Vol refers to (Step 2504).

When it is judged that the state change of the Pool which the S-Vol refers to does not make the state of the Pool differ from the state of the other P-Vol correlated to the Pool, the encryption setting program 210 proceeds to Step 2508. When it is judged that the state change of the Pool which the S-Vol refers to makes the state of the Pool differ from the state of the other P-Vol correlated to the Pool, the encryption setting program 210 reads the mixing allowing/forbidding settings information 207 (Step 2505).

The encryption setting program 210 judges from the mixing allowing/forbidding settings information 207 read in Step 2505 whether or not state inconsistency is allowed between the Pool which the S-Vol refers to and its other correlated P-Vol (Step 2506). Specifically, it is judged that the state inconsistency is allowed when, for example, "1" is set in the item 1113.

When it is judged that state inconsistency is not allowed between the Pool which the S-Vol refers to and its other correlated P-Vol, the encryption setting program 210 rejects the request to change the state of the S-Vol (Step 2507). In Step 2507, instead of rejecting the state change request, the encryption setting program 210 may change the state of the Pool and the states of all P-Vols relevant to the Pool, in which case the state inconsistency is not caused. When it is judged in Step 2506 that state inconsistency is allowed between the Pool which the S-Vol refers to and its other correlated P-Vol, the encryption setting program 210 changes the P-Vol paired with the S-Vol and the Pool which the S-Vol refers to the plaintext state (encrypted state) (Step 2508).

In addition to the above-mentioned processing method, the encryption setting program 210 can perform such processing as prohibiting further state changes of the S-Vol after the state of the S-Vol is changed once. This is the end of the description on a special example of the control processing in a state change operation.

The above-mentioned processing of changing the storage area state requires the administrator to explicitly specify a Vol or Pool whose state is to be changed. Alternatively, the state of a Vol or Pool may be changed automatically accompanying a change made by the administrator to the mixing allowing/forbidding settings.

For example, when the P-Vol is in the encrypted state and the S-Vol is in the plaintext state, the mixing allowing/forbidding settings are changed from "allow the S-Vol to be in the plaintext state while the P-Vol is in the encrypted state" to "change the S-Vol from the plaintext state to the encrypted state when the P-Vol is in the encrypted state". In this case, the change made to the mixing allowing/forbidding settings changes the S-Vol to the encrypted state. The storage area is thus changed when the mixing allowing/forbidding settings are changed to enhance the security.

Given below is a description on control processing in an operation of changing the storage area state by changing the mixing allowing/forbidding settings. There are two types of mixing allowing/forbidding settings change: a change made to the mixing allowing/forbidding settings of a Vol or Pool (the items 1102 and 1112) and a change made to the settings of state consistency/inconsistency between correlated Vols or Pools (the items 1103 and 1113). The following describes control processing in each of the two types of settings change taking the management window 1101 of FIG. 11A as an example.

(Control Processing in a State Change Accompanying a Change in Mixing Allowing/Forbidding Settings)

Figure 26A:
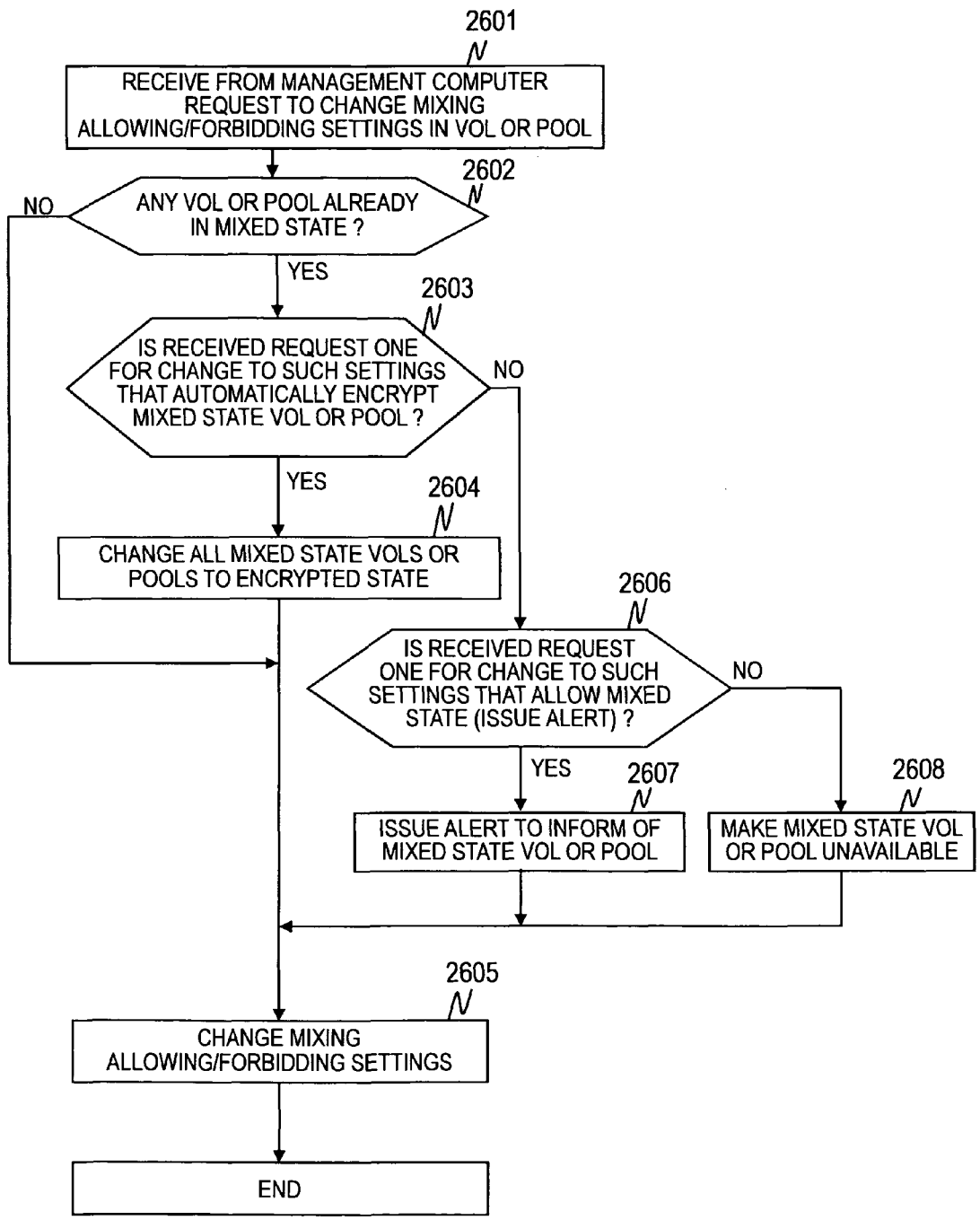
FIG. 26A is a flow chart showing an example of control processing in an operation of changing the storage area state accompanying a change in mixing allowing/forbidding settings of a Vol or Pool which is executed by the mixing allowing/forbidding setting program of each storage system in accordance with the first embodiment of this invention.

FIG. 26A is a flow chart showing an example of control processing in an operation of changing the storage area state accompanying a change in mixing allowing/forbidding settings of a Vol or Pool which is executed by the mixing allowing/forbidding setting program 211 of each storage system 120 according to the first embodiment of this invention.

The mixing allowing/forbidding setting program 211 of the storage system 120 receives from the management computer 140 a request to change the mixing allowing/forbidding settings of a Vol or Pool (Step 2601). The received change request contains information about new settings which are to replace the current settings.

The mixing allowing/forbidding setting program 211 next refers to the item 705 to judge whether or not the storage system 120 has any mixed state Vol or Pool (Step 2602).

When it is judged that there is no mixed state Vol or Pool, the mixing allowing/forbidding setting program 211 proceeds to Step 2605. When it is judged that there is a mixed state Vol or Pool, the mixing allowing/forbidding setting program 211 judges whether or not the requested change of the mixing allowing/forbidding settings is a change to "automatically encrypt any mixed state Vol or Pool" (Step 2603).

When it is judged that the requested change is a change to "automatically encrypt any mixed state Vol or Pool", the mixing allowing/forbidding setting program 211 changes every mixed state Vol or Pool to the encrypted state (Step 2604). The mixing allowing/forbidding setting program 211 then changes the mixing allowing/forbidding settings as requested (Step 2605).

When it is judged in Step 2603 that the requested change is not a change to "automatically encrypt any mixed state Vol or Pool", the mixing allowing/forbidding setting program 211 judges whether or not the requested change is a change to "allow the mixed state (issue an alert)" (Step 2606) and, when it is true, notifies the management computer 140 of mixed state Vols or Pools (Step 2607) before moving to Step 2605.

When it is judged in Step 2606 that the requested change is not a change to "allow the mixed state (issue an alert)", the mixing allowing/forbidding setting program 211 makes mixed state Vols or Pools unavailable to the management computer 140 and the computers 100 (Step 2608). Mixed state Vols or Pools are made unavailable by, for example, processing of forbidding data read/write in mixed state Vols or Pools, or processing of prohibiting the execution of management functions (such as taking a snapshot) that use mixed state Vols or Pools. After making mixed state Vols or Pools unavailable to the management computer 140 and the computers 100, the mixing allowing/forbidding setting program 211 proceeds to Step 2605.

Processing executed in Step 2608 may be, instead of processing of making mixed state Vols or Pools unavailable, processing of changing every mixed state Vol or Pool to the plaintext state or the encrypted state, or processing of changing every mixed state Vol or Pool to the plaintext state or the encrypted state and then requesting the management computer 140 to change the mixing allowing/forbidding settings, or processing of notifying the management computer 140 of the fact that the requested change of the mixing allowing/forbidding settings is not possible.

Figure 26B:
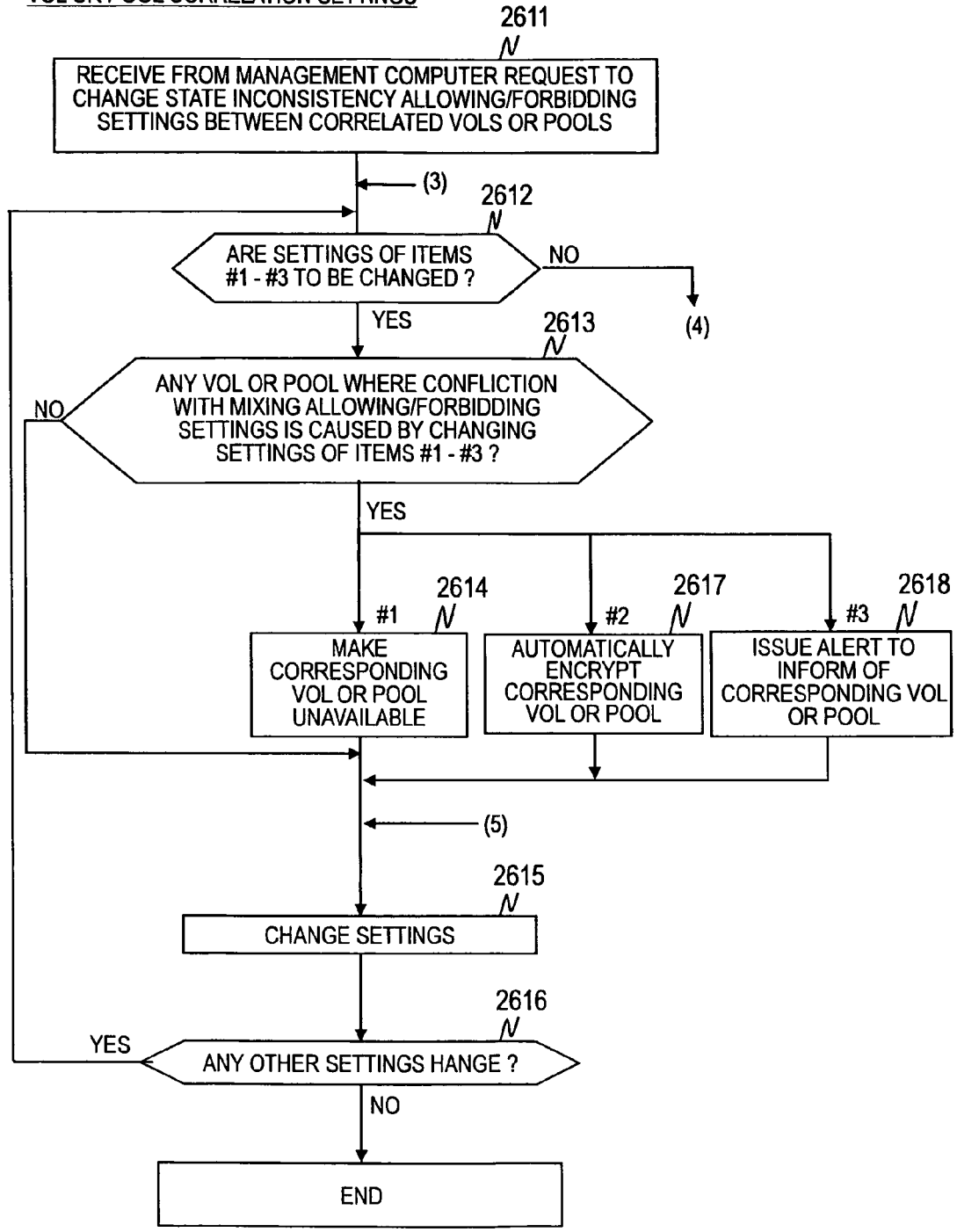
FIGS. 26B to 26D are flow charts each showing an example of control processing in an operation of changing the state by changing the mixing allowing/forbidding settings of correlated Vols or Pools which is executed by the mixing allowing/forbidding setting program of each storage system in accordance with the first embodiment of this invention.
Figure 26C:
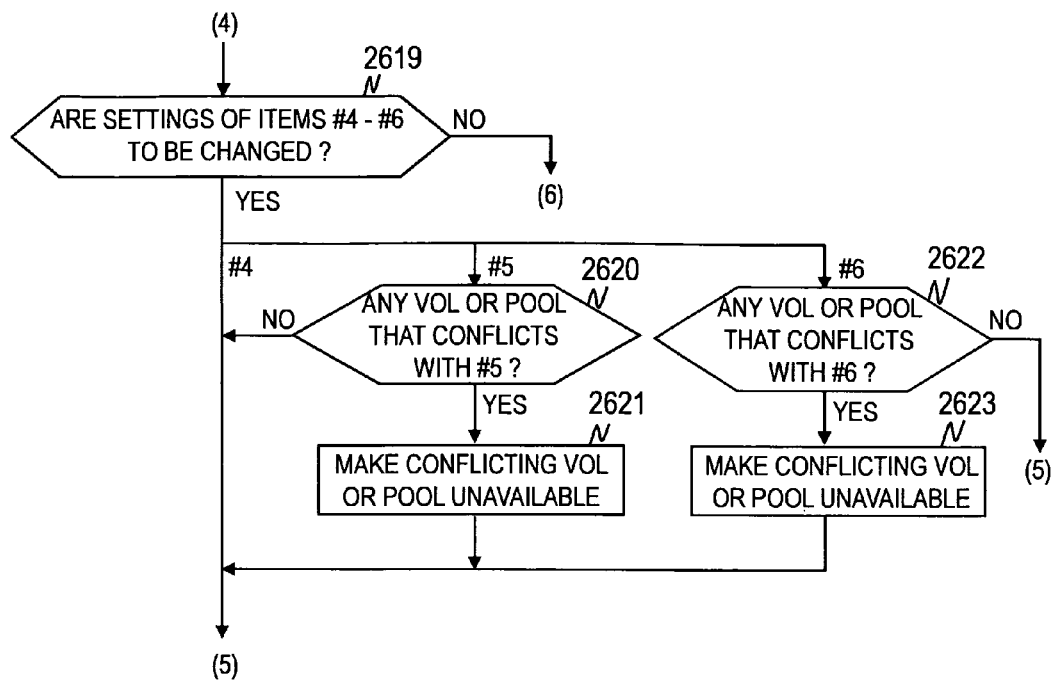
Figure 26D:
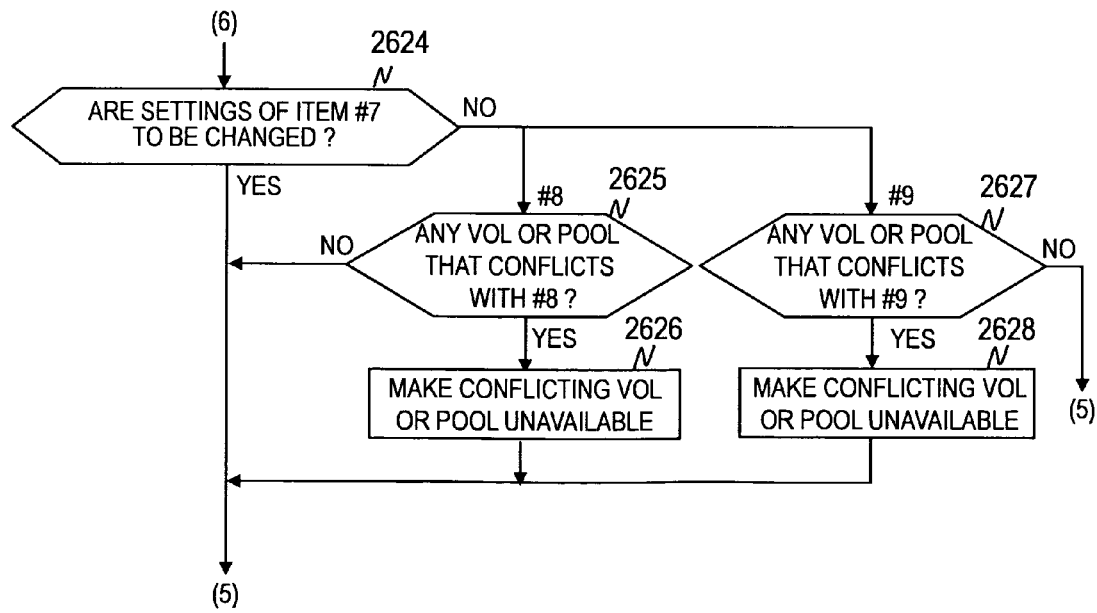

FIGS. 26B to 26D are flow charts showing an example of control processing in an operation of changing the state by changing the mixing allowing/forbidding settings of correlated Vols or Pools which is executed by the mixing allowing/forbidding setting program 211 of each storage system 120 according to the first embodiment of this invention.

The mixing allowing/forbidding setting program 211 of the storage system 120 receives from the management computer 140 a request to change the mixing allowing/forbidding settings of correlated Vols or Pools (Step 2611). The received change request contains information about new settings which are to replace the current settings.

The mixing allowing/forbidding setting program 211 next judges from the received change request whether or not one of the settings items #1 to #3 in the item 1103 is requested to be changed (Step 2612).

When it is judged that the requested change is a change of one of the settings items #1 to #3 in the item 1103, the mixing allowing/forbidding setting program 211 judges whether or not there are Vols or Pools that conflict with the mixing allowing/forbidding settings (e.g., correlated Vols with the secondary Vol or the subsidiary Vol being in other states than the encrypted state despite the primary Vol being in the encrypted state) (Step 2613). To give a specific example, in the case of the copy function, the mixing allowing/forbidding setting program 211 judges whether or not the P-Vol which is the primary Vol is in the encrypted state (see the item 705) and the S-Vol which is the secondary Vol to the P-Vol (see the item 706) is in the encrypted state as shown in FIG. 8.

When it is judged that no Vols or Pools conflict with the mixing allowing/forbidding settings, the mixing allowing/forbidding setting program 211 proceeds to Step 2615.

When it is judged that there are Vols or Pools that conflict with the mixing allowing/forbidding settings, and that the requested change is a switch to the settings #1, the mixing allowing/forbidding setting program 211 makes Vols or Pools that conflict with the settings #1 unavailable (Step 2614). Vols or Pools that conflict with the mixing allowing/forbidding settings are made unavailable by, for example, processing of dissolving the correlation between Vols or Pools that conflict with the mixing allowing/forbidding settings (such as dissolving the pairing of a P-Vol and an S-Vol), or processing of forbidding data read/write in Vols or Pools that conflict with the mixing allowing/forbidding settings, or processing of prohibiting the execution of management functions (such as making a copy) that use Vols or Pools that conflict with the mixing allowing/forbidding settings.

Processing executed in Step 2614 may be, instead of processing of making Vols or Pools that conflict with the mixing allowing/forbidding settings unavailable, processing of changing all Vols or Pools that conflict with the mixing allowing/forbidding settings to the encrypted state, or processing of changing all Vols or Pools that conflict with the mixing allowing/forbidding settings to the encrypted state and then requesting the management computer 140 to change the settings, or processing of notifying the management computer 140 of the fact that the requested change of the mixing allowing/forbidding settings of the Vols or Pools is not possible.

When it is judged in Step 2613 that there are Vols or Pools that conflict with the mixing allowing/forbidding settings, and that the requested change is a switch to the settings #2, the encryption setting program 210 automatically sets the Vols or Pools that conflict with the mixing allowing/forbidding settings to the encrypted state (Step 2617).

When it is judged in Step 2613 that there are Vols or Pools that conflict with the mixing allowing/forbidding settings, and that the requested change is a switch to the settings #3, the mixing allowing/forbidding setting program 211 notifies the management computer 140 of the Vols or Pools that conflict with the mixing allowing/forbidding settings (Step 2618).

After executing Steps 2614, 2617, and 2618, the mixing allowing/forbidding setting program 211 changes the mixing allowing/forbidding settings of the Vols or the Pools as requested (Step 2615). The mixing allowing/forbidding setting program 211 then judges whether or not there is another settings change request (Step 2616).

When it is judged that no other settings change requests have been received, the mixing allowing/forbidding setting program 211 ends the processing. When it is judged that there is another settings change request, the mixing allowing/forbidding setting program 211 proceeds to Step 2612.

When it is judged in Step 2612 that the requested change is not a change of one of the setting items #1 to #3 in the item 1103, the mixing allowing/forbidding setting program 211 judges whether or not one of the settings items #4 to #6 in the item 1103 is requested to be changed (Step 2619).

When it is judged that the requested change is a switch to the settings #4 in the item 1103, the mixing allowing/forbidding setting program 211 proceeds to Step 2615.

When it is judged that the requested change is a switch to the settings #5 in the item 1103, the mixing allowing/forbidding setting program 211 judges whether or not there are Vols or Pools that conflict with the settings #5 (e.g., correlated Vols with the secondary Vol or the subsidiary Vol being in the encrypted state despite the primary Vol being in the plaintext state) (Step 2620). Specifically, the same judging method as the one used in Step 2613 is employed.

When it is judged that there are Vols or Pools that conflict with the settings #5, the mixing allowing/forbidding setting program 211 makes the Vols or Pools that conflict with the settings #5 unavailable (Step 2621). Vols or Pools that conflict with the settings #5 are made unavailable by one of the methods given as examples in the description of Step 2614, or by changing all Vols or Pools that conflict with the settings #5 to the plaintext/mixed state. When it is judged that no Vols or Pools conflict with the settings #5, the mixing allowing/forbidding setting program 211 proceeds to Step 2615.

When it is judged that the requested change is a switch to the settings #6 in the item 1103, the mixing allowing/forbidding setting program 211 judges whether or not there are Vols or Pools that conflict with the settings #6 (e.g., correlated Vols with the secondary Vol or the subsidiary Vol being in other states than the plaintext state despite the primary Vol being in the plaintext state) (Step 2622). Specifically, the same judging method as the one used in Step 2613 is employed.

When it is judged that there are Vols or Pools that conflict with the settings #6, the mixing allowing/forbidding setting program 211 makes the Vols or Pools that conflict with the settings #6 unavailable (Step 2623). Vols or Pools that conflict with the settings #6 are made unavailable by one of the methods given as examples in the description of Step 2614, or by changing all Vols or Pools that conflict with the settings #6 to the plaintext state. When it is judged that no Vols or Pools conflict with the settings #6, the mixing allowing/forbidding setting program 211 proceeds to Step 2615.

After executing Steps 2621 and 2623, the mixing allowing/forbidding setting program 211 proceeds to Step 2615.

When it is judged in Step 2619 that the requested change is not a change of one of the settings items #4 to #6 in the item 1103, the mixing allowing/forbidding setting program 211 judges whether or not one of the settings items #7 to #9 in the item 1103 is requested to be changed (Step 2624).

When it is judged that the requested change is a switch to the settings #7 in the item 1103, the mixing allowing/forbidding setting program 211 proceeds to Step 2615.

When it is judged that the requested change is a switch to the settings #8 in the item 1103, the mixing allowing/forbidding setting program 211 judges whether or not there are Vols or Pools that conflict with the settings #8 (e.g., correlated Vols with the secondary Vol or the subsidiary Vol being in the encrypted state despite the primary Vol being in the mixed state) (Step 2625). Specifically, the same judging method as the one used in Step 2613 is employed.

When it is judged that there are Vols or Pools that conflict with the settings #8, the mixing allowing/forbidding setting program 211 makes the Vols or Pools that conflict with the settings #8 unavailable (Step 2626). The methods listed in the description of Step 2621 can be used to make Vols or Pools that conflict with the settings #8 unavailable. When it is judged that no Vols or Pools conflict with the settings #8, the mixing allowing/forbidding setting program 211 proceeds to Step 2615.

When it is judged that the requested change is a switch to the settings #9 in the item 1103, the mixing allowing/forbidding setting program 211 judges whether or not there are Vols or Pools that conflict with the settings #9 (Step 2627). Specifically, the same judging method as the one used in Step 2613 is employed.

When it is judged that there are Vols or Pools that conflict with the settings #9, the mixing allowing/forbidding setting program 211 makes the Vols or Pools that conflict with the settings #9 unavailable (Step 2628). Vols or Pools that conflict with the settings #9 are made unavailable by one of the methods listed in the description of Step 2623, or by changing all Vols or Pools that conflict with the settings #9 to the mixed state. When it is judged that no Vols or Pools conflict with the settings #9, the mixing allowing/forbidding setting program 211 proceeds to Step 2615.

This is the end of the description on the control processing in an operation of changing the storage area state accompanying a change in mixing allowing/forbidding settings.

Described next is administrator authentication processing which is performed in the management computer 140. The above-mentioned encryption setting processing, mixing allowing/forbidding setting processing, and storage management processing of the storage systems 120 are carried out under instructions from an administrator authenticated by the management computer 140.

Details of the administrator authentication processing will be given below. Administrator authentication is performed in the management computer 140 in this embodiment, but may instead be performed in, for example, the storage systems 120.

(Administrator Authentication Processing in the Management Computer)

The access control program 246 of the management computer 140 receives a login request from an administrator and performs authentication on the administrator based on the administrator authentication information 242. Specifically, the access control program 246 judges that the administrator is successfully authenticated when a user ID and a password that are received from the administrator are registered as the items 901 and 902 in one of the entries of the administrator authentication information 242. When the administrator fails the authentication, the access control program 246 ends the processing.

In the case where the administrator is successfully authenticated, the access control program 246 checks a role that indicates the administrator's authority information, and allows the authenticated administrator to execute an operation that is permitted in the checked role. Specifically, the access control program 246 refers to the item 903 and, when the administrator has a role of the security administrator, for example, enables the administrator to execute security-related operations such as encryption setting. From then on, the management computer 140 executes processing in response to an operation request made by the successfully authenticated administrator.

This concludes the description of the first embodiment of this invention.

A second embodiment of this invention will now be described.

The system configuration in the second embodiment is the same as the one in the first embodiment which has been described with reference to FIG. 1. A description on the system configuration is therefore omitted here.

In the first embodiment, it is not possible to discern whether encrypted storage areas store only data that actually needs protection by encryption or data that by nature does not need protection by encryption (namely, data that poses no problems when stored in the plaintext state) is stored in encrypted storage areas simply because no free capacity is left anywhere else. To make it possible to discriminate between the former and the latter in the first embodiment, data that does not need protection has to be stored only in plaintext storage areas, otherwise this hinders the effective utilization of the storage area capacity.

The second embodiment makes sure that a storage area storing data that needs protection by encryption is distinguishable by attaching a new attribute (protection attribute) to the storage area. Details will be given in the following description, where components and processing of the second embodiment that are the same as those of the first embodiment will not be described.

FIG. 27 is an explanatory diagram showing an example of the LU management information 201 according to the second embodiment of this invention.

The LU management information 201 of the second embodiment contains an additional data item 2708.

Items 2701, 2702, 2703, 2704, 2705, 2706, and 2707 of FIG. 27 are the same as the items 301 to 307, respectively, of FIG. 3 in the first embodiment.

The item 2708 is protection attribute information, which indicates whether or not data stored in an LU of the storage system 120 needs protection (in other words, whether or not the stored data needs to be encrypted). In the example of FIG. 27, "attached" is stored as the item 2708 when the data needs protection and "not attached" is stored as the item 2708 when the data does not need protection. In the following description, an LU to which the protection attribute is attached is set to the encrypted state, but this embodiment is not limited thereto. For example, attaching the protection attribute to other areas than encrypted storage areas may be prohibited. The state of an LU, Vol, or Pool to which the protection attribute is attached is "encrypted (protected)" or the like.

Figure 28:
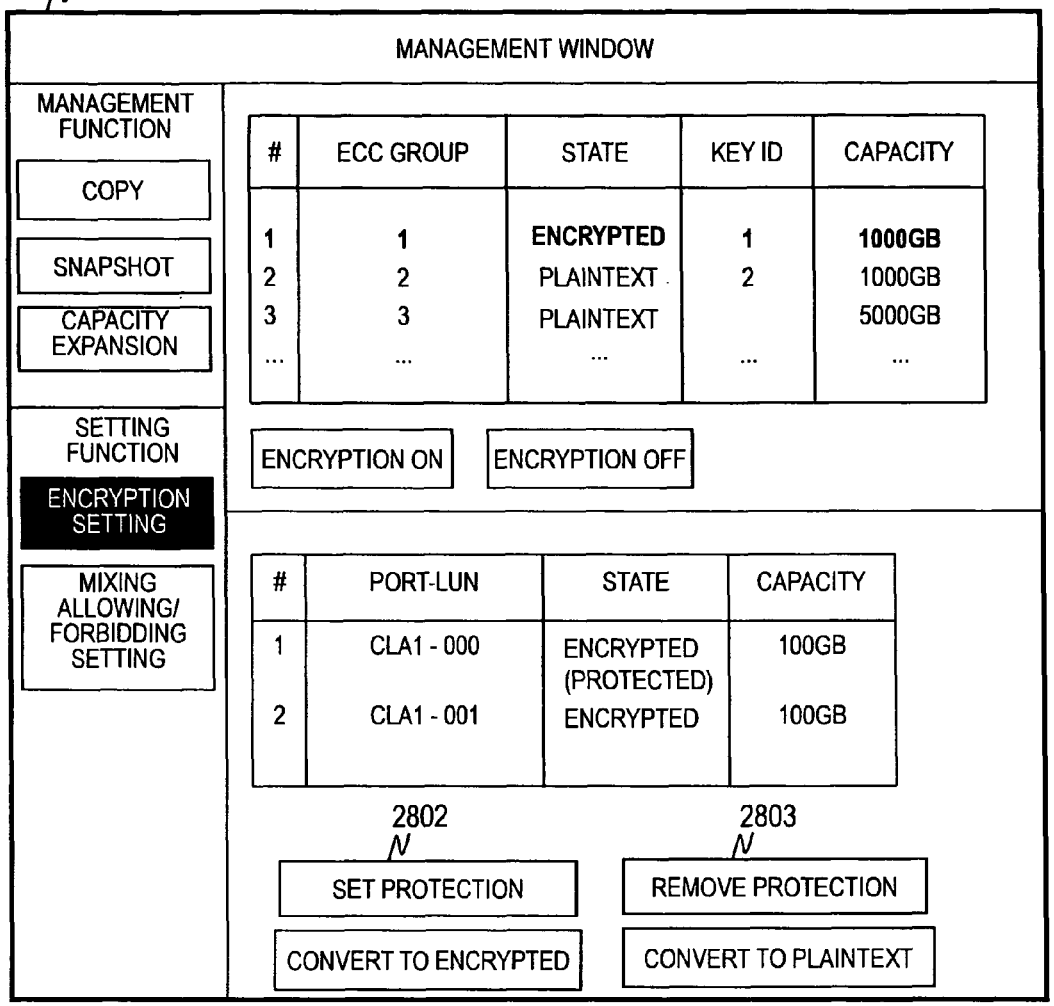
FIG. 28 is an explanatory diagram showing an example of an encryption setting window in accordance with the second embodiment of this invention.

FIG. 28 is an explanatory diagram showing an example of an encryption setting window 2801 according to the second embodiment of this invention.

A management window 2801 is the same as the management window 1001 shown in FIG. 10, except for newly added display items 2802 and 2803. The item 2802 is an operating button for setting the protection attribute (the item 2708) to an LU. The item 2803 is an operating button for removing the protection attribute (the item 2708) set to an LU.

FIGS. 29A to 29D are explanatory diagrams showing examples of a mixing allowing/forbidding setting window according to the second embodiment of this invention.

FIGS. 29A to 29D correspond to FIGS. 11A to 11D, which illustrate the mixing allowing/forbidding setting windows in the first embodiment of this invention.

The mixing allowing/forbidding setting window of FIG. 29A is denoted by 2901 and contains four display items: items 2902, 2903, 2904, and 2905.

The items 2904 and 2905 are the same as the items 1104 and 1105 of FIG. 11A described in the first embodiment.

The items 2902 and 2903 are the same as the items 1102 and 1103 of FIG. 11A, except for newly added settings items about the protection attribute. Specifically, settings items #4 to #6 are added in the item 2902, and settings items #10 to #12 and settings items #13 to #15 are added in the item 2903. Details of those settings items will be described later.

For example, setting #4 in the item 2902 prohibits an operation of adding a plaintext LU to a Pool to which the protection attribute is attached. This is because setting #4 prohibits an operation that brings a Pool to the mixed state. When the protection attribute is attached to a P-Vol (the primary Vol) with #10 set in the item 2903, an S-Vol (the secondary Vol) paired with this P-Vol is also set to the encrypted state.

The mixing allowing/forbidding setting window of FIG. 29B is denoted by 2911 and contains five display items: items 2912, 2913, 2914, 2915, and 2916.

The items 2912, 2913, 2915, and 2916 are the same as the items 1112 to 1115 of FIG. 11B described in the first embodiment. The display item 2914, which is about protection attribute settings, is a new addition to the mixing allowing/forbidding setting window 2911 of this embodiment.

For example, when the protection attribute is attached to a P-Vol with #1 set in the item 2914, a Pool (the subsidiary Vol) correlated to this P-Vol is also set to the encrypted state.

The mixing allowing/forbidding setting window of FIG. 29C is denoted by 2921 and contains six display items: items 2922, 2923, 2924, 2925, 2926, and 2927.

The items 2922, 2923, 2924, 2926, and 2927 are the same as the items 1122, 1123, 1124, 1126, and 1127 of FIG. 11C described in the first embodiment.

The item 2925 is the same as the item 1125 of FIG. 11C, except for newly added settings items about the protection attribute. Specifically, settings items #10 to #12 and settings items #13 to #15 are added in the item 2925.

The mixing allowing/forbidding setting window of FIG. 29D is denoted by 2931 and contains six display items: items 2932, 2933, 2934, 2935, 2936, and 2937.

The items 2932, 2933, 2934, 2935, and 2936 are the same as the items 1132 to 1136 in the first embodiment.

The display item 2937, which is about protection attribute settings, is a new addition to the mixing allowing/forbidding setting window 2931 of this embodiment.

FIGS. 30A to 30D are explanatory diagrams showing examples of the mixing allowing/forbidding settings information 207 according to the second embodiment of this invention.

FIGS. 30A to 30D correspond to FIGS. 12A to 12D, which illustrate mixing allowing/forbidding settings information according to the first embodiment of this invention.

FIG. 30A shows the mixing allowing/forbidding settings information 207 that is obtained when mixing allowing/forbidding settings are set by the method of FIG. 29A.

The mixing allowing/forbidding settings information 207 of FIG. 30A contains two data items: items 3001 and 3002.

The items 3001 and 3002 are the same as the items 1201 and 1202 of FIG. 12A. However, the item 3001 is information set in the item 2902 and the item 3002 is information set in the item 2903. In the example of FIG. 29A, #1, #4, #7, #10, and #13 are set in the item 2903. Accordingly, "1, 4, 7, 10, 13" is stored as the item 3002 in the example of FIG. 30A.

FIG. 30B shows the mixing allowing/forbidding settings information 207 that is obtained when mixing allowing/forbidding settings are set by the method of FIG. 29B. The mixing allowing/forbidding settings information 207 of FIG. 30B is composed of three data items: items 3011 to 3013.

The items 3011 and 3012 are the same as the items 1211 and 1212 of FIG. 12B. However, the item 3011 is information set in the item 2912, the item 3012 is information set in the item 2913, and the item 3013 is information set in the item 2914.

FIG. 30C shows the mixing allowing/forbidding settings information 207 that is obtained when mixing allowing/forbidding settings are set by the method of FIG. 29C.

The mixing allowing/forbidding settings information 207 of FIG. 30C contains three data items: items 3021, 3022, and 3023.

The item 3021 is information about what management function the storage system 120 has. The item 3022 is information set in the item 2924. The item 3023 is information set in the item 2925.

FIG. 30D shows the mixing allowing/forbidding settings information 207 that is obtained when mixing allowing/forbidding settings are set by the method of FIG. 29D. The mixing allowing/forbidding settings information 207 of FIG. 30D contains three data items: items 3031, 3032, and 3033.

The item 3031 is information about what management function the storage system 120 has. The item 3032 is information set in the item 2934. The item 3033 is information set in the item 2937.

Processing in which the storage systems 120 attach the protection attribute to storage areas will be described next.

(Protection Attribute Attaching Processing)

Figure 32A:
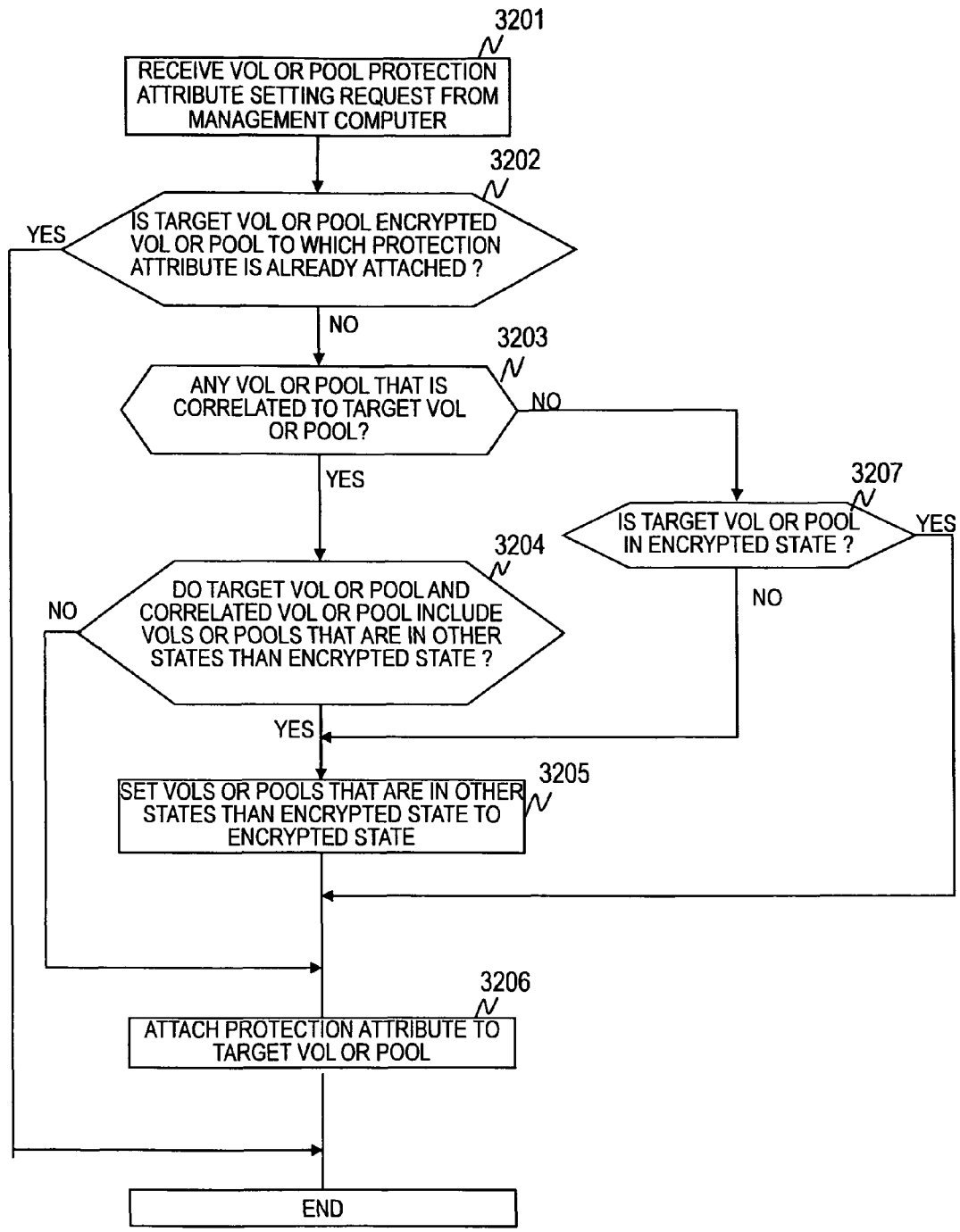
FIG. 32A is a flow chart showing an example of processing of attaching the protection attribute to a Vol or Pool which is executed by the encryption setting program of each storage system in accordance with the second embodiment of this invention.

FIG. 32A is a flow chart showing an example of processing of attaching the protection attribute to a Vol or Pool which is executed by the encryption setting program 210 of each storage system 120 according to the second embodiment of this invention.

The encryption setting program 210 of the storage system 120 receives from the management computer 140 a request to attach the protection attribute to a storage area such as a Vol or Pool (Step 3201). The received request contains information specifying to which Vol or Pool the protection attribute is to be attached.

The encryption setting program 210 judges whether or not the protection attribute has already been attached to the specified Vol or Pool by referring to the item 705 (Step 3202). When "encrypted (protected)" is stored as the item 705, for example, it is judged that the protection attribute has already been attached.

When it is judged that the protection attribute has already been attached, the encryption setting program 210 ends the processing. When it is judged that the protection attribute has not been attached, the encryption setting program 210 judges whether or not any Vol or Pool is correlated to the specified Vol or Pool (Step 3203). Specifically, the encryption setting program 210 refers to the item 706 that is associated with the specified Vol or Pool and, when there is a Vol or Pool registered as the item 706, judges that there is a correlated Vol or Pool.

When it is judged that there is a correlated Vol or Pool, the encryption setting program 210 judges whether or not at least one of the specified Vol or Pool and its correlated Vol or Pool is the storage area in other states than the encrypted state (i.e., the plaintext state or the mixed state) (Step 3204). Specifically, the states of the specified Vol or Pool and its correlated Vol or Pool are obtained from the item 705 to make a judgment.

When it is judged that at least one of the specified Vol or Pool and its correlated Vol or Pool is the storage area in other states than the encrypted state, the encryption setting program 210 sets the storage area that is in other states than the encrypted state to the encrypted state (Step 3205).

The encryption setting program 210 then attaches the protection attribute to the specified Vol or Pool (by updating the item 705 of FIG. 7A to "encrypted (protected)") (Step 3206) and ends the processing.

When it is judged in Step 3203 that no Vol or Pool is correlated to the specified Vol or Pool, the encryption setting program 210 judges whether or not the specified Vol or Pool is in the encrypted state (Step 3207).

When it is judged that the specified Vol or Pool is not in the encrypted state, the encryption setting program 210 proceeds to Step 3205. When it is judged that the specified Vol or Pool is in the encrypted state, the encryption setting program 210 proceeds to Step 3206.

When it is judged in Step 3204 that the specified Vol or Pool and its correlated Vol or Pool are both in the encrypted state, the encryption setting program 210 proceeds to Step 3206.

This is the end of the description on the processing of attaching the protection attribute.

As a modification example of the above protection attribute attaching processing, protection attribute attaching processing in the storage system 120 that can have a cascade configuration will be described with reference to FIG. 32B. The description focuses on differences from FIG. 32A.

Figure 32B:
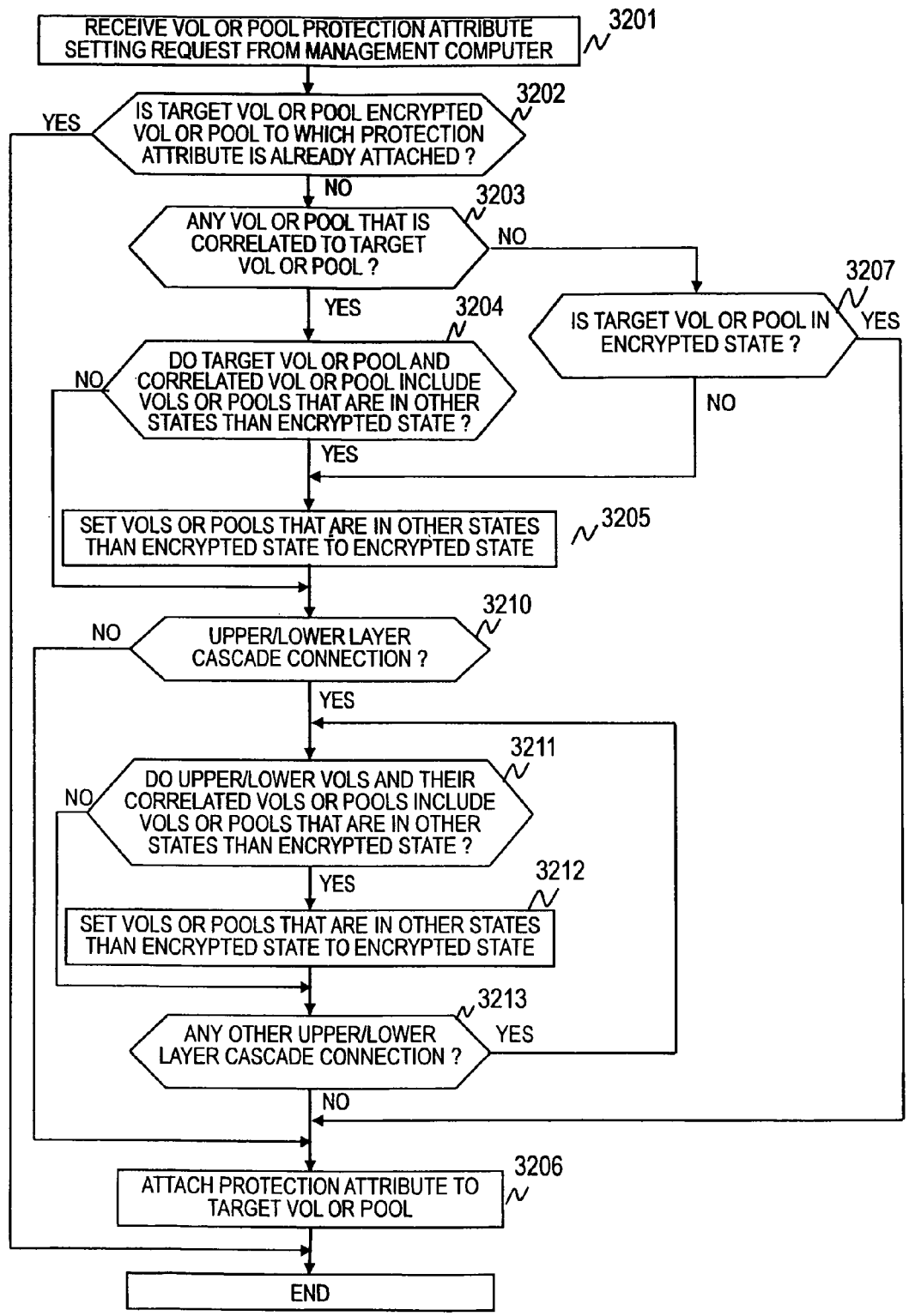
FIG. 32B is a flow chart showing a modification example of the processing of FIG. 32A.

FIG. 32B is a flow chart showing a modification example of the processing of FIG. 32A.

Steps 3201 to 3207 of FIG. 32B are the same as Steps 3201 to 3207 of FIG. 32A.

After Step 3204 is executed and the answer is "No", or after Step 3205 is executed, the encryption setting program 210 judges whether or not the Vol specified as a volume to which the protection attribute is to be attached is a part of a cascade configuration and there is a Vol in a layer above or below the specified Vol. In other words, the encryption setting program 210 judges whether or not the specified Vol has a cascade connection with at least one of an upper layer and a lower layer (Step 3210).

Specifically, the encryption setting program 210 judges whether or not the specified Vol constitutes a cascade configuration by referring to the item 707 of FIG. 7B. Whether or not there is a storage area in an upper layer or a lower layer is judged by referring to the "layer" part of the item 707 of FIG. 7B.

For instance, when the value of the "layer" part of the item 707 that is associated with the specified Vol is 1, the specified Vol is the topmost layer and it is judged that there is no Vol connected by cascade connection in a layer above the specified Vol. When the value of the "layer" part is 2, on the other hand, it is judged that there is a Vol connected by cascade connection in a layer above the specified Vol.

The encryption setting program 210 refers to the item 707 of FIG. 7B to check for lower layer connection and, when a Vol in a layer below the specified Vol is registered in a group to which the specified Vol belongs, judges that there is a Vol connected by cascade connection in a layer below the specified Vol. When no Vol in a layer below the specified Vol is registered in the group, on the other hand, it is judged that there is no Vol connected by cascade connection in a layer below the specified Vol.

When it is judged that neither an upper layer nor a lower layer has a Vol connected by cascade connection, the encryption setting program 210 proceeds to Step 3206.

When it is judged that at least one of an upper layer and a lower layer has a Vol connected by cascade connection, the encryption setting program 210 judges whether or not at least one storage area out of the Vols in layers above and below the specified Vol and their correlated Vols or Pools is in other states than the encrypted state (Step 3211). Specifically, the encryption setting program 210 obtains information about the correlated Vols or Pools from the item 706 of FIG. 7B, and refers to the item 705 of FIG. 7B to judge whether or not those upper/lower layer Vols and their correlated Vols or Pools include a storage area that is in other states than the encrypted state.

When it is judged that those upper/lower layer Vols and their correlated Vols or Pools are all in the encrypted state, the encryption setting program 210 proceeds to Step 3213. When it is judged that at least one of the upper/lower layer Vols and their correlated Vols or Pools is a storage area that is in other states than the encrypted state, the encryption setting program 210 sets this storage area that is not in the encrypted state to the encrypted state (Step 3212).

The encryption setting program 210 next judges whether or not there is another Vol connected by cascade connection in a layer above or below the specified Vol (Step 3213). The encryption setting program 210 refers to the item 707 of FIG. 7B to make a judgment.

When it is judged that there are no other Vols connected by cascade connection in an upper or lower layer, the encryption setting program 210 proceeds to Step 3206. When it is judged that there is another Vol connected by cascade connection in an upper or lower layer, the encryption setting program 210 proceeds to Step 3211. In this case, the encryption setting program 210 executes Steps 3211 to 3213 for every Vol that is connected by cascade connection in an upper or lower layer, and then proceeds to Step 3206.

The protection attribute attaching processing in the storage system 120 that can have a cascade configuration has been described above. In the above-described processing, the protection attribute is attached on a Vol or Pool basis which is defined specifically to the respective functions of the storage system 120. However, the unit of attaching the protection attribute may be finer and the protection attribute may be attached on an LU basis which constitutes a Pool.

Control processing of the storage systems 120 for attaching the protection attribute on an LU basis will be described next.

Figure 32C:
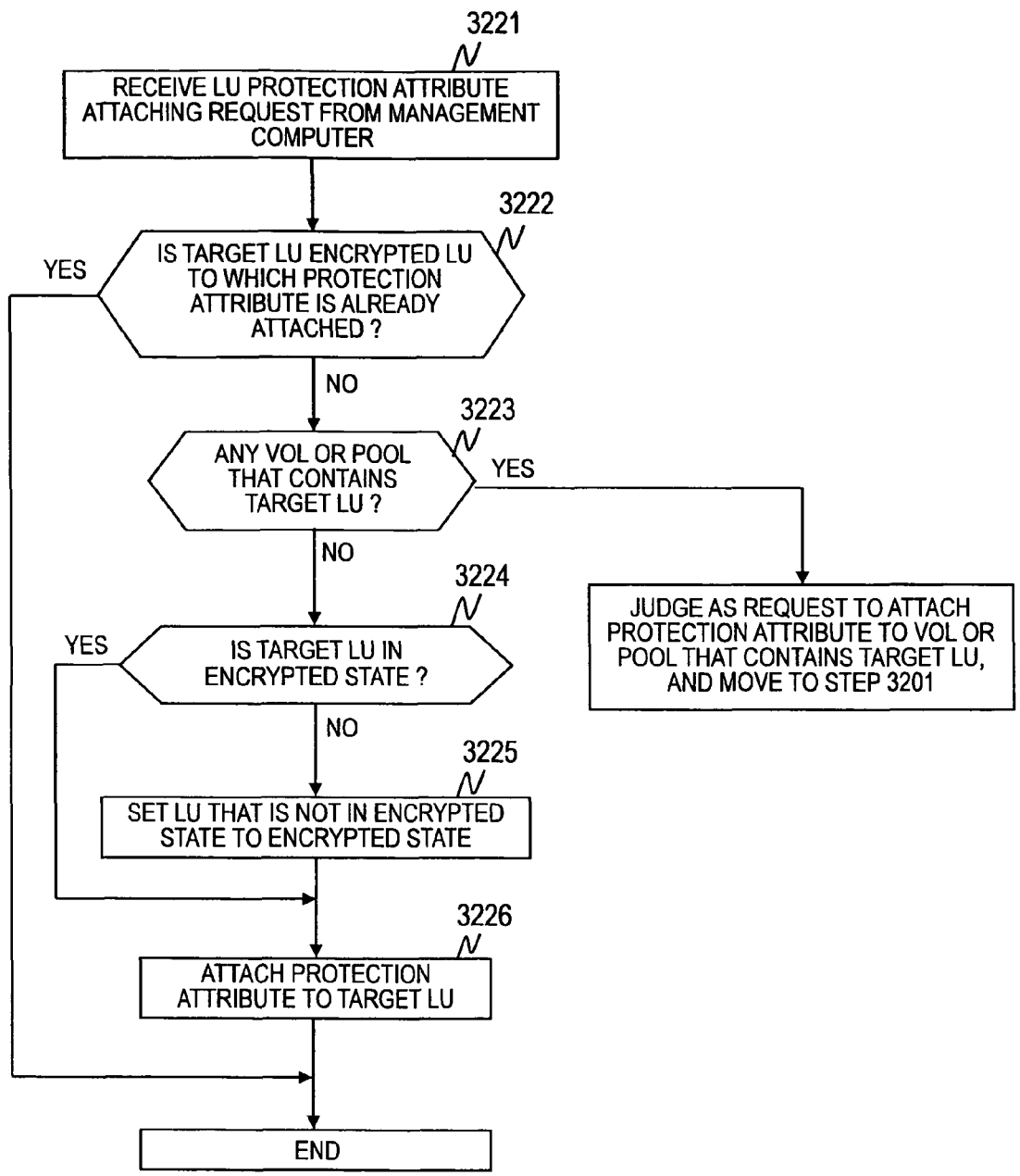
FIG. 32C is a flow chart showing an example of processing of attaching the protection attribute on an LU basis which is executed by the encryption setting program of each storage system in accordance with the second embodiment of this invention.

FIG. 32C is a flow chart showing an example of processing of attaching the protection attribute on an LU basis which is executed by the encryption setting program 210 of each storage system 120 according to the second embodiment of this invention.

The encryption setting program 210 of the storage system 120 receives from the management computer 140 a request to attach the protection attribute to an LU (Step 3221). The received request contains information about to which LU the protection attribute is to be attached. For example, the received request contains information saying that the protection attribute is to be attached to an LU in CLA1-000.

The encryption setting program 210 next judges whether or not the protection attribute has already been attached to the specified LU by referring to the item 2708 of FIG. 27 (Step 3222).

The encryption setting program 210 then judges whether or not any Vol or Pool uses the specified LU (Step 3223). Specifically, the encryption setting program 210 checks whether or not the specified LU is registered as the item 704 and, when the specified LU is registered, judges that there is a Vol or Pool that uses this LU.

When it is judged that there is a Vol or Pool that uses the specified LU, the encryption setting program 210 assumes that attaching the protection attribute to the Vol or Pool that uses the specified LU, and proceeds to Step 3201 to execute the processing of attaching the protection attribute to the Vol or Pool.

When it is judged that no Vol or Pool uses the specified LU, the encryption setting program 210 judges whether or not this LU is in the encrypted state (Step 3224).

When it is judged that the specified LU is in the encrypted state, the encryption setting program 210 proceeds to Step 3226. When it is judged that the specified LU is not in the encrypted state, the encryption setting program 210 sets the specified LU to the encrypted state (Step 3225).

The encryption setting program 210 then attaches the protection attribute to the specified LU (by updating the item 2708) (Step 3226), and ends the processing.

In the above protection attribute attaching processing, when a Vol, Pool, or LU to which the protection attribute is to be attached is in other states than the encrypted state, data stored in this storage area is encrypted and further the protection attribute is attached to the storage area. However, other modes may be employed. For example, mixing allowing/forbidding settings that prohibit attaching the protection attribute to a Vol, Pool, or LU that is not in the encrypted state. In this case, the protection attribute cannot be attached to a Vol, Pool, or LU to which the protection attribute is requested to be attached unless the Vol, Pool, or LU is in the encrypted state.

The description given next is about control processing according to the second embodiment in such operations as creating a new Vol or Pool, changing the configuration of an existing Vol or Pool (e.g., adding a capacity), setting a correlation between Vols or Pools, and changing the state of a Vol or Pool.

The flow of the control processing is the same as in the first embodiment. The second embodiment differs from the first embodiment in that settings items about the protection attribute are newly added as items of mixing allowing/forbidding settings. Details of the settings about the protection attribute will be described below with reference to FIGS. 29A to 29D. The protection attribute settings items in FIG. 29C are the same as those in FIG. 29A, and the protection attribute settings items in FIG. 29D are the same as those in FIG. 29B. The description therefore will be made with reference to FIGS. 29A and 29B.

The protection attribute settings items in FIG. 29A are #4 to #6 of the item 2902, and #10 to #12 and #13 to #15 of the item 2903.

4 to #6 of the item 2902 define how an actual Vol or Pool is to be controlled while the protection attribute is attached to the actual Vol or Pool (or when the protection attribute is going to be attached).

10 to #12 of the item 2903 define how the secondary or subsidiary Vol correlated to the primary Vol is to be controlled while the protection attribute is attached to the primary Vol (or when the protection attribute is going to be attached).

13 to #15 of the item 2903 define, while the protection attribute is not attached to the primary Vol but is attached to other volumes than the primary Vol (or when the protection attribute is going to be attached to the other volumes), how their correlated primary Vol and other Vols are to be controlled.

The settings #10 to #12 of the item 2903 and the settings #13 to #15 of the item 2903 are separated in order to make it possible to, for example, prohibit attaching the protection attribute to the secondary Vol and the subsidiary Vol unless the protection attribute is attached to the primary Vol, while setting all Vols relevant to the primary Vol to the encrypted state when the protection attribute is attached to the primary Vol.

The individual settings of the item 2902 will be described next.

According to the settings #4, attaching the protection attribute to an actual Vol or Pool sets the entire actual Vol or Pool to the encrypted state. From then on, this overrides other settings. In other words, processing that brings an actual Vol or Pool to which the protection attribute has been attached to the plaintext/mixed state is prohibited. With the settings #4 overriding other settings, processing that brings a Vol or Pool to the plaintext/mixed state is prohibited with respect to an actual Vol or Pool to which the protection attribute has been attached, even when, for example, the settings #1 which allow the mixed state are selected.

According to the settings #5, when the protection attribute is going to be attached (or is already attached) to an actual Vol or Pool, other settings are overridden and the entire actual Vol or Pool is automatically set to the encrypted state.

According to the settings #6, the protection attribute can be attached only to actual Vols or Pools that are in the encrypted state. In other words, the protection attribute cannot be attached to an actual Vol or Pool that is not in the encrypted state. From then on, this overrides other settings and processing that brings an actual Vol or Pool to which the protection attribute has been attached to the plaintext/mixed state is prohibited.

The individual settings of the item 2903 will be described next.

According to the settings #10, attaching the protection attribute to a primary Vol sets all of its correlated secondary and subsidiary Vols to the encrypted state automatically. Also, correlating a secondary Vol or a subsidiary Vol that is in other states than the encrypted state to a primary Vol to which the protection attribute has already been set always sets the secondary Vol or the subsidiary Vol to the encrypted state.

According to the settings #11, attaching the protection attribute to a primary Vol sets all of its correlated secondary and subsidiary Vols to the encrypted state, and further attaches the protection attribute to those correlated Vols. Also, correlating a secondary Vol or a subsidiary Vol that is in other states than the encrypted state to a primary Vol to which the protection attribute has already been set always sets the secondary Vol or the subsidiary Vol to the encrypted state, and further attaches the protection attribute to the secondary Vol or the subsidiary Vol.

According to the settings #12, in the case where the protection attribute has been set to a primary Vol and at least one of a secondary Vol and a subsidiary Vol that are going to be correlated with the primary Vol is not an encrypted state storage area, setting this correlation is not permitted. Also, in the case where the protection attribute is about to be attached to a primary Vol and at least one of its already correlated secondary Vol and subsidiary Vol is not an encrypted state storage area, attaching the protection attribute to this primary Vol is not permitted.

According to the settings #13, when the protection attribute is not attached to a primary Vol but is attached to its correlated secondary Vol or subsidiary Vol, the primary Vol and other correlated Vols are all set to the encrypted state. Also, in the case where the protection attribute is already attached to a Vol that is not a primary Vol, correlating a primary or other types of Vol to this non-primary Vol always sets the primary or other types of Vol to the encrypted state.

According to the settings #14, when the protection attribute is not attached to a primary Vol but is attached to its correlated secondary Vol or subsidiary Vol, the primary Vol and other correlated Vols are all set to the encrypted state, and further, the protection attribute is attached to those now encrypted Vols. Also, in the case where the protection attribute is already attached to a Vol that is not a primary Vol, correlating a primary or other types of Vol to this non-primary Vol always sets the primary or other types of Vol to the encrypted state, and further attaches the protection attribute to the now encrypted Vol.

According to the settings #15, in the case where the protection attribute has not been attached to a primary Vol but has been attached to at least one of a secondary Vol and a subsidiary Vol that are about to be correlated to the primary Vol, setting this correlation is not permitted. Also, in the case where the protection attribute is about to be attached to a Vol that is not a primary Vol but has not been attached to a primary or other types of Vol already correlated to this non-primary Vol, attaching the protection attribute to the non-primary Vol is not permitted.

The protection attribute settings items in FIG. 29B are #1 to #3 of the item 2914. The settings #1 to #3 define how Vols correlated to a Vol to which the protection attribute has been (or is going to be) attached are to be controlled. The individual settings of the item 2914 will be described below.

According to the settings #1, attaching the protection attribute to an arbitrary Vol sets all of its correlated Vols to the encrypted state. Also, when the protection attribute is already set to an arbitrary Vol, correlating another Vol to this Vol always sets the other Vol to the encrypted state.

According to the settings #2, attaching the protection attribute to an arbitrary Vol sets all of its correlated Vols to the encrypted state, and further attaches the protection attribute to all the correlated Vols. Also, when the protection attribute is already set to an arbitrary Vol, correlating another Vol to this Vol always sets the other Vol to the encrypted state, and further attaches the protection attribute to the other Vol.

According to the settings #3, in the case where the protection attribute has been attached to an arbitrary Vol and a Vol that is about to be correlated to the arbitrary Vol contains a storage area that is not in the encrypted state, setting this correlation is not permitted. Also, in the case where the protection attribute is about to be attached to an arbitrary Vol and a Vol already correlated to the arbitrary Vol contains a storage area that is not in the encrypted state, attaching the protection attribute to the arbitrary Vol is not permitted.

This is the end of the description on the newly added settings items of mixing allowing/forbidding settings.

Described next as typical processing that uses mixing allowing/forbidding settings with the additional settings items are processing of adding an LU to a Pool to which the protection attribute has been attached and processing of creating a snapshot using a P-Vol to which the protection attribute has been attached. The former processing and the latter processing will be described with reference to FIG. 17B and FIG. 18, respectively. To simplify the description of FIG. 17B, the Pool has not been correlated to another Vol yet. The following descriptions of FIG. 17B and FIG. 18 are examples of a case where #4 is set in the item 2902 of FIG. 29A and #12 is set in the item 2903 of FIG. 29A.

The descriptions given below will discuss differences between the processing of FIG. 17B and the processing of FIG. 18 according to the second embodiment and their equivalent processing according to the first embodiment.

(Processing of Adding an LU to a Pool to which the Protection Attribute has been Set)

The storage management program 212 of the storage system 120 receives a request made by the management computer 140 to add an LU to a Pool (Step 1711). The received request contains information about which LU is to be added to which Pool.

The storage management program 212 next checks the state (encrypted state or plaintext state) of the specified Pool (Step 1712) by referring to the item 704 of FIG. 7B. In this example, where the protection attribute is already attached to the specified Pool, so information such as "encrypted (protected)" is registered as the item 704.

The storage management program 212 judges whether or not the Pool and the LU that are specified by the request are in different states (Step 1713). Specifically, the storage management program 212 refers to the item 2705 of FIG. 27 using the information received in Step 1711 about the LU that is requested to be added. The storage management program 212 judges that the specified Pool and LU are not in different states when the item 2705 is "encrypted", and judges that the specified Pool and LU are in different states when the item 2705 holds any other value than "encrypted".

When the specified Pool and LU are in different states (i.e., when a plaintext state LU is to be added to the Pool), the storage management program 212 checks the mixing allowing/forbidding settings information 207 (Step 1714).

From the mixing allowing/forbidding settings information 207 read in Step 1714, the storage management program 212 judges whether the mixed state is allowed or not (Step 1715). In this example, the protection attribute has been attached to the Pool and #4 is set in the item 2902 as the protection attribute settings (which means that setting a Vol to the plaintext or mixed state while the protection attribute is set to the Vol is prohibited). The requested operation (adding a plaintext LU to an encrypted (protected) state Pool) is therefore prohibited (Step 1718).

When the specified Pool and LU are in the same state (when an encrypted state LU is to be added to the Pool) in Step 1713, the requested operation (adding an encrypted state LU to an encrypted (protected) state Pool) is permitted (Step 1717).

This is the end of the description on an example of the processing of adding an LU to a Pool to which the protection attribute has been set.

Described next is the processing of creating a snapshot using a P-Vol to which the protection attribute has been attached.

(Processing of Creating a Snapshot Using a P-Vol to which the Protection Attribute has been Attached)

The storage management program 212 of the storage system 120 receives from the management computer 140 a request to take a snapshot using a P-Vol (with the protection attribute attached) and a Pool (Step 1801). The received request contains information about which Vol and Pool are to be correlated for the snapshot.

The storage management program 212 next checks the states (encrypted state or plaintext state) of the specified Vol and Pool (Step 1802). Specifically, in the case where Vols already registered (as the item 703) are to be correlated, the storage management program 212 checks the state of the Vol by referring to the item 705. In the case where unregistered Vols are to be correlated, the storage management program 212 uses the information received in Step 1801 about Vols (which LU is to be used as the P-Vol and which LU is to be used as the Pool) to search the LU management information 201 for the item 2705 that is associated with any of those LUs used as the P-Vol and the Pool. Values held as the item 2705 that the storage management program 212 refers to are the states of the P-Vol and the Pool.

The storage management program 212 next judges whether or not the specified Vol and Pool are all in the same state (for example, all are in the encrypted state) (Step 1803). In this example, where the protection attribute has been attached to the P-Vol, so when a plaintext Pool is requested to be used in creating a snapshot, the storage management program 212 judges that the P-Vol and the Pool are not in the same state and reads the mixing allowing/forbidding settings information 207 (Step 1804).

From the mixing allowing/forbidding settings information 207 read in Step 1804, the storage management program 212 judges whether or not the requested snapshot creation conflicts with the mixing allowing/forbidding settings (Step 1805). In this example, the protection attribute has been attached to the P-Vol and #12 is set in the item 2903 as the protection attribute settings (which means that a Pool or other storage areas correlated to a P-Vol are forbidden to be in the plaintext/mixed state while the protection attribute is attached to the P-Vol). The requested snapshot creation is therefore not executed (Step 1807).

When it is judged in Step 1803 that the specified Vol and Pool are all in the same states (when the specified Pool is in the encrypted state), the requested snapshot creation is permitted (Step 1806).

Examples of the control processing in a management operation that uses a Pool and a Vol to which the protection attribute has been attached have been described above.

According to the second embodiment, a judgment can be made on more subjects than in the first embodiment also in a management operation that uses a Pool and a Vol to which the protection attribute is not attached. For instance, when a plaintext LU is requested to be added to an encrypted state LU, whether or not adding the plaintext LU is permitted cannot be judged in the first embodiment. If this is dealt with by simply forbidding the mixed state, for example, it prohibits adding a plaintext LU to an encrypted state Pool that does not need protection by encryption (Pool that is in the encrypted state only because no other storage areas than encrypted storage areas are available), and accordingly hinders the efficient utilization of the storage area capacity.

In the second embodiment, whether adding the plaintext LU is permitted or not can be judged by judging whether or not the protection attribute has been attached to the encrypted state Pool. Specifically, the second embodiment is capable of accurate control such as adding a plaintext LU to a Pool that does not need protection by encryption while keeping a plaintext LU from being added to a Pool that needs protection by encryption. The storage area capacity is thus utilized more efficiently in the second embodiment than in the first embodiment.

Described next is control processing in an operation of changing the storage area state accompanying a change in mixing allowing/forbidding settings according to the second embodiment. The flow of this processing is basically the same as in the first embodiment, except that there are more branches in processing of FIGS. 26B to 26D due to the addition of the protection attribute. In the processing of FIG. 26A, however, a change of the settings #4 to #6 in the item 2902 which are new settings items added in the second embodiment does not change the states of relevant actual Vols and Pools. The flow of the processing of FIG. 26A according to the second embodiment is the same as that of the processing of FIG. 26A according to the first embodiment. Differences of the processing of the second embodiment from the processing of the first embodiment will be described below with reference to FIGS. 31A to 31C.

Figure 31A:
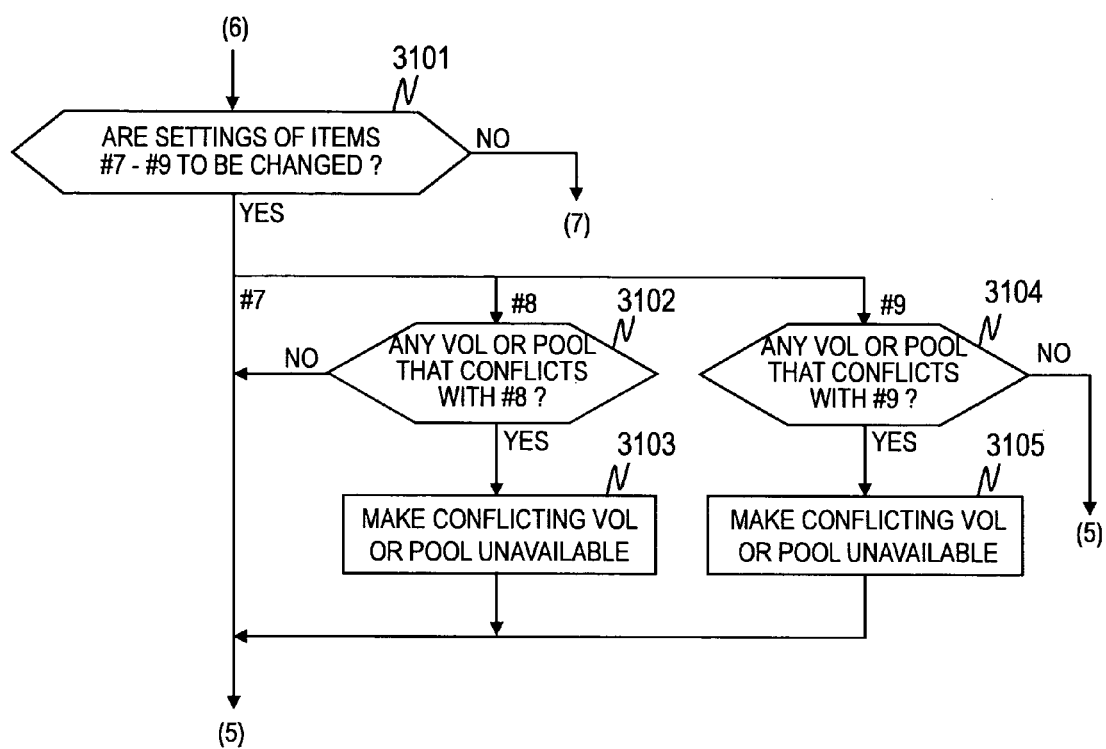
FIGS. 31A to 31C are flow charts each showing an example of control processing in an operation of changing the storage area state accompanying a change in settings of state consistency/inconsistency between correlated Vols and Pools which is executed by the mixing allowing/forbidding setting program of each storage system in accordance with the second embodiment of this invention.
Figure 31B:
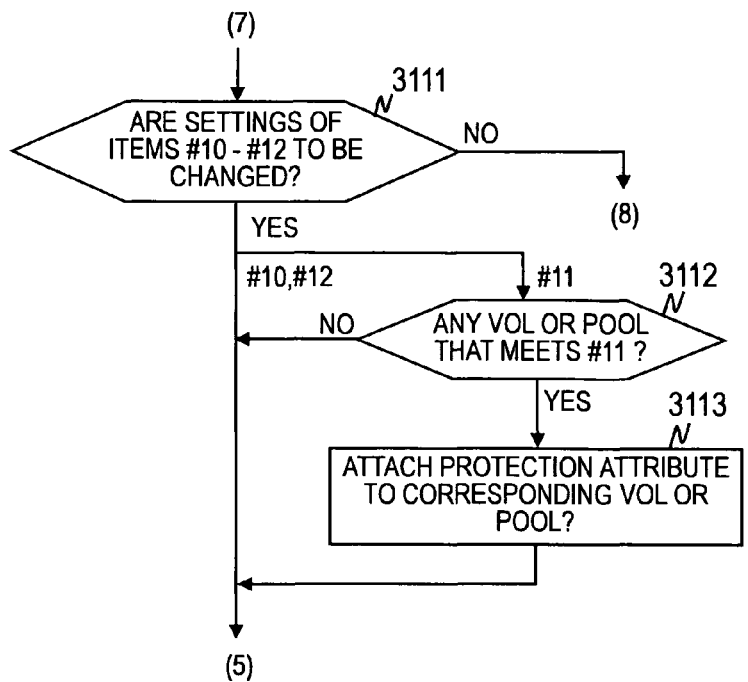
Figure 31C:
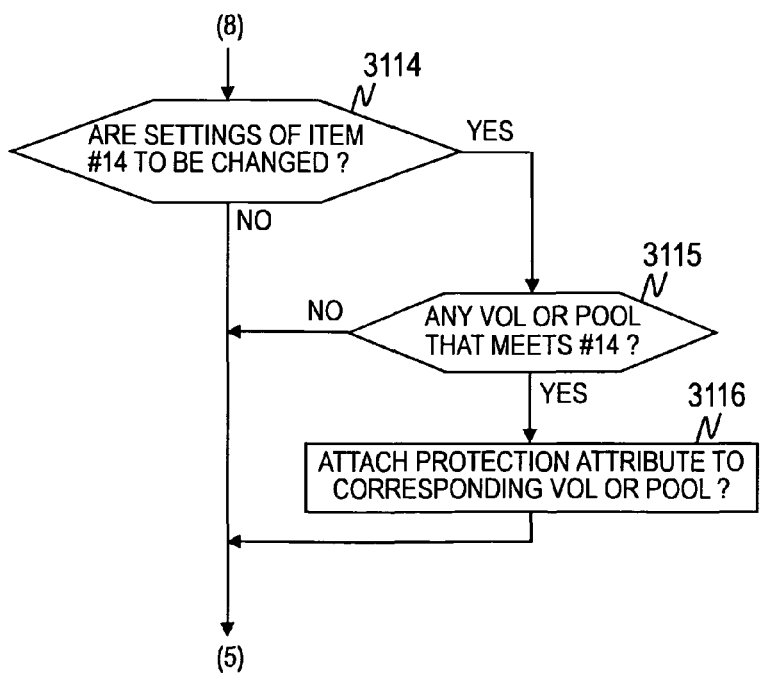

FIGS. 31A to 31C are flow charts showing an example of control processing in an operation of changing the storage area state accompanying a change in settings of state consistency/inconsistency between correlated Vols and Pools which is executed by the mixing allowing/forbidding setting program 211 of each storage system 120 according to the second embodiment of this invention.

When it is judged in Step 2619 of FIG. 26C that the requested change is not a change of one of the settings items #4 to #6 of the item 2903, the mixing allowing/forbidding setting program 211 of the storage system 120 judges whether or not one of the settings items #7 to #9 of the item 2903 is requested to be changed (Step 3101).

When the requested change is a change of one of the settings items #7 to #9 of the item 2903, the mixing allowing/forbidding setting program 211 judges whether or not a switch to the settings #7 is requested. The mixing allowing/forbidding setting program 211 proceeds to Step 2615 when it is a switch to the settings #7 that is requested and, when it is a switch to the settings #8 or the settings #9 that is requested, executes the same processing as in the first embodiment (Steps 2620, 2612, and others).

When the requested change is not a change of one of the settings items #7 to #9 of the item 2903 in Step 3101, the mixing allowing/forbidding setting program 211 judges whether or not one of the settings items #10 to #12 of the item 2903 is requested to be changed (Step 3111).

When the requested change is a change of one of the settings items #10 to #12 of the item 2903, the mixing allowing/forbidding setting program 211 judges whether or not a switch to the settings #10 or the settings #12 is requested. When it is a switch to the settings #10 or the settings #12 that is requested, the mixing allowing/forbidding setting program 211 proceeds to Step 2615.

When it is a switch to the settings #11 that is requested, the mixing allowing/forbidding setting program 211 judges whether or not there are Vols or Pools that meet the settings #11, for example, correlated Vols or Pools with the protection attribute attached to the primary Vol but not to the secondary Vol and the subsidiary Vol (Step 3112). Specifically, the mixing allowing/forbidding setting program 211 searches for a primary Vol to which the protection attribute has been attached by referring to the item 705. The mixing allowing/forbidding setting program 211 then refers to the item 706 of the primary Vol to which the protection attribute has been attached, obtains information of a Vol or Pool that is correlated to the primary Vol, obtains the state of the correlated Vol or Pool from the item 705, and uses the obtained state information to make a judgment in Step 3112.

When no Vols or Pools meet the settings #11, the mixing allowing/forbidding setting program 211 proceeds to Step 2615. When there are Vols or Pools that meet the settings #11, the mixing allowing/forbidding setting program 211 attaches the protection attribute to those Vols or Pools (Step 3113).

When it is judged in Step 3111 that the requested change is not a change of one of the settings items #10 to #12, the mixing allowing/forbidding setting program 211 judges whether or not a switch to the settings #14 is requested (Step 3114).

When the requested change is not a switch to the settings #14, the mixing allowing/forbidding setting program 211 proceeds to Step 2615. When the requested change is a switch to the settings #14, the mixing allowing/forbidding setting program 211 judges whether or not any Vols or Pools meet the settings #14 (Step 3115). Vols or Pools meet the settings #14 when, for example, the protection attribute is attached to other volumes than a primary Vol but is not attached to their correlated primary Vol and other Vols. Specifically, the mixing allowing/forbidding setting program 211 searches for a non-primary Vol to which the protection attribute has been attached by referring to the item 705. The mixing allowing/forbidding setting program 211 refers to the item 706 of this Vol to which the protection attribute has been attached to obtain information of its correlated Vol or Pool, obtains the state of the correlated Vol or Pool from the item 705, and uses the obtained state information to make a judgment in Step 3115.

When no Vols or Pools meet the settings #14, the mixing allowing/forbidding setting program 211 proceeds to Step 2615. When there are Vols or Pools that meet the settings #14, the mixing allowing/forbidding setting program 211 attaches the protection attribute to those Vols or Pools (Step 3116).

This concludes the description of the second embodiment.

In the first and second embodiments, mixing allowing/forbidding settings for actual Vols and Pools may include, in addition to settings about whether to allow mixing of the encrypted state and the plaintext state, settings about whether to allow mixing of encryption algorithms which are used to encrypt data before storing the data in an encrypted storage area.

Specifically, when creating a Pool from a plurality of LUs is requested, the states of those LUs are checked by referring to the item 305. When the states of the LUs are found to be "encrypted", the item 306 is referred to for each of the LUs to obtain encryption key identifier information. An encryption algorithm used by an encryption key that is identified by the obtained key identifier is obtained from the item 604. When the plurality of LUs all have the same encryption algorithm information, it is judged that there is no mixing of encryption algorithms and, when even one of the plurality of LUs has a different encryption algorithm from the rest, it is judged that encryption algorithms are mixed. Information about whether to allow this mixing of encryption algorithms can also be included in the mixing allowing/forbidding settings.

Similarly, in the first and second embodiments, Vol or Pool correlation settings may include, in addition to settings about whether to allow storage area state consistency/inconsistency, settings about whether to allow encryption algorithm information consistency/inconsistency between encryption keys which are used to encrypt data before storing the data in an encrypted storage area.

Specifically, when correlating Pools or Vols is requested, in the case where already registered (as the item 703) Vols or Pools are to be correlated, the states of the Vols or the Pools are checked by referring to the item 705. In the case where unregistered Vols or Pools are to be correlated, information received along with the correlation request about the Vols or the Pools, namely, information for identifying LUs that are used by the Vols or the Pools, is used to search the LU management information 201 for the item 305 of any one of the LUs, and the states of the Vols or the Pools are checked by referring to the item 305.

When the states of the Pools or the Vols are found to be "encrypted", the item 306 of each LU constituting the Vols or the Pools is referred to to obtain encryption key identifier information, and an encryption algorithm associated with the key identifier is obtained from the item 604. LUs constituting the Vols or the Pools are identified by referring to the item 704 in the case where the Vols or the Pools have been registered as the item 703 and, in the case where the Vols or the Pools have not been registered as the item 703, by referring to the LU management information about the Vols or the Pools which is received along with the correlation request. When the plurality of LUs all have the same encryption algorithm information, it is judged that there is no mixing of encryption algorithms and, when even one of the plurality of LUs has a different encryption algorithm from the rest, it is judged that encryption algorithms are mixed. Information about whether to allow this mixing of encryption algorithms can also be included in the correlation settings.

Also, the protection attribute may include other attributes in addition to the attribute that indicates whether or not data protection by encryption is necessary (for example, an attribute indicating which encrypted data needs protection). For instance, an attribute that indicates whether or not encryption algorithm or key length protection is necessary may be added. Encryption algorithm or key length protection means, for example, prohibiting mixing of different encryption algorithms or different key lengths, or prohibiting changing the currently used encryption algorithm or key length.

According to the embodiments of this invention, in a computer system composed of, for example, a computer, a management computer, and a storage system having an encrypting function, the storage system holds information indicating the storage area state (whether a storage area stores encrypted data, or plaintext data, or a mixture of encrypted data and plaintext data), information for controlling the storage area state, information indicating what type of storage areas are available, and identification information for discriminating data that needs protection by encryption from data that does not need protection by encryption.

The storage system uses the information indicating what type of storage areas are available to control storage areas that are available to the computer or the management computer. The storage system uses the information for controlling the storage area state to control whether the use of mixed state storage areas is allowed or not, and the state consistency/inconsistency between correlated storage areas. The storage system uses the identification information for discriminating data that needs protection by encryption from data that does not need protection by encryption to discriminate which encrypted data needs protection and which encrypted data does not.

The storage system having an encrypting function can thus prevent data that should be protected from being stored in a mixed state or plaintext storage area accidentally. Also, in a storage system that provides encrypted storage areas and plaintext storage areas, when data that by nature does not need protection by encryption is stored in an encrypted storage area because no free capacity is left in other storage areas than encrypted storage areas, an administrator can tell which data stored in the storage system needs protection by encryption and which data does not. Data that needs protection by encryption is properly encrypted as a result. Accordingly, the risk of an information leak from a stolen disk or the like is reduced and a storage system capable of efficient capacity utilization is provided.

This invention is in no way limited to the embodiments described above, and can be carried out in various other modes without departing from the scope of this invention.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a host computer; and
at least one storage system coupled to the host computer via a network,
wherein the host computer comprises a first interface coupled to the network, a first processor coupled to the first interface, and a first memory coupled to the first processor,
wherein each storage system of the at least one storage system respectively comprises a second interface coupled to the network, a second processor coupled to the second interface, and a second memory coupled to the second processor,
wherein each storage system of the at least one storage system respectively provides a plurality of storage areas where data written from the host computer is stored,
wherein the plurality of storage areas of each storage system includes at least one encrypted storage area storing data that needs protection by encryption and at least one plaintext storage area storing data that does not need protection by encryption, and
wherein each storage system of the at least one storage system is configured to:

encrypt, in the case of reception of a request to write data in an encrypted storage area from the host computer, the data requested to be written with an encryption key that is assigned to the encrypted storage area, and write the encrypted data in the encrypted storage area;

receive an instruction indicating a type of storage area the host computer is allowed to use;

if the type of storage area indicated by the received instruction is encrypted only, only allow the host computer to use the at least one encrypted storage area provided by the storage system;

if the type of storage area indicated by the received instruction is both encrypted and plaintext, allow the host computer to use either of the at least one encrypted storage area and the at least one plaintext storage area provided by the storage system;

in the case of reception of a request to write data that does not need protection from the host computer that does not specify a storage area, write the data requested to be written in, if the type of storage area indicated by the received instruction is encrypted only, the at least one encrypted storage area provided by the storage system or, if the type of storage area indicated by the received instruction is both encrypted and plaintext, either of the at least one encrypted storage area and the at least one plaintext storage area provided by the storage system;

upon reception of a state change request from the host computer for a storage area provided by the storage system, determine whether to change a state of the storage area in accordance with the state change request;

manage protection information for each of the at least one encrypted storage area provided by the storage system that indicates whether any data that needs protection is currently stored in the encrypted storage area; and reference the protection information for an encrypted storage area provided by the storage system in determining whether to change the state of the encrypted storage area based on a state change request from the host computer for the encrypted storage area.

2. The computer system according to claim 1, wherein the host computer or another computer is further configured to send an instruction to each storage system about mixing settings that indicate whether to allow or forbid inclusion of a plaintext storage area and an encrypted storage area within a first storage area provided by the storage system; and each storage system of the at least one storage system is further configured to judge, based on the received instruction about the mixing settings, whether to provide the host computer with the first storage area in a state where an encrypted storage area and a plaintext storage area are included within the first storage area, and judge whether to notify the host computer that has given the instruction of inclusion of an encrypted storage area and a plaintext storage area within the first storage area.

3. The computer system according to claim 2, wherein the plurality of storage areas provided by each of the at least one storage system further includes a second storage area, and wherein each of the at least one storage system is further configured to:

reference mixing settings that indicate whether to allow or forbid inclusion of a plaintext storage area and an encrypted storage area within the second storage area upon receiving a correlation instruction to correlate the first storage area and the second storage area with each other;

judge whether the second storage area correlated to the first storage area according to the received correlation instruction is in a state that conforms to the mixing settings of the second storage area;

allow correlation of the first storage area and the second storage area with each other if the second storage area is in a state that conforms to the mixing settings of the second storage area; and forbid, if the second storage area is in a state that does not conform to the mixing settings of the second storage are, correlation of the first storage area and the second storage area with each other, and notify the host computer.

4. The computer system according to claim 3, wherein each of the at least one storage system is further configured to:

judge whether any second storage area is correlated to the first storage area whose state is instructed to be changed if the storage system receives an instruction to change the state of the first storage area;

reference the mixing settings of the first storage area and the mixing settings of the second storage area and a state of the second storage area to judge whether to allow the state change of the first storage area if there is a second storage area that is correlated to the first storage area whose state is instructed to be changed;

forbid the state change of the first storage area and issue an alert to the host computer that has given the instruction upon determining that, as a result of the judging, that the state of the first storage area and the state of the second storage area after the change do not conform to the mixing settings of the first storage area and the mixing settings of the second storage area;

judge whether to allow the state change of the first storage area according to the mixing settings of the first storage area if there is no second storage area correlated to the first storage area whose state is instructed to be changed; and forbid the state change of the first storage area, and notify the host computer that has given the instruction upon determining that, as a result of the judging, that the state of the first storage area after the change does not conform to the mixing settings of the first storage area.

5. The computer system according to claim 4, wherein each of the at least one storage system is configured to change the state of the second storage area that is correlated to the first storage area whose state is to be changed according to the mixing settings of the second storage area in the case of which the state of the first storage area is changed.

6. The computer system according to claim 5, wherein each of the at least one storage system is configured to provide the host computer that has given the instruction of a mixed state with management information including the state of the first storage area, the mixing settings of the first storage area and the mixing settings of the second storage area, and the type of available storage area.

7. The computer system according to claim 3, wherein each of the at least one storage system is further configured to:

reference the protection information in the case of judging whether to change the state of the first storage area and whether to correlate the first storage area and the second storage area; and forbid, when the protection information indicates that the encrypted storage area is storing data that needs protection, a state change of the first storage area from encrypted to plaintext, reference the mixing settings of the first storage area and the mixing settings of the second storage area and the state of the first storage area and the state of the second storage area to allow or forbid correlation of the first storage area and the second storage area with each other, and notify the host computer that has given the instruction.

8. The computer system according to claim 3, wherein each of the at least one storage system is further configured to:
manage information of encryption methods which are used to encrypt data stored in the first storage area;
reference the information of encryption methods when judging whether to allow inclusion of an plaintext storage area and an encrypted storage area within the first storage area;
prohibit using more than one of a plurality of encryption methods in the first storage area and notify the host computer that has given the instruction about the mixing settings if the information of encryption methods includes settings that forbid using more than one of the plurality of encryption methods in the first storage area;
judge whether the information of encryption methods of the first storage area matches with the information of encryption methods of the second storage area upon judging whether to allow correlation of the first storage area and the second storage area with each other;
allow correlation of the first storage area and the second storage area with each other in the case of which the information of encryption methods of the first storage area match with the information of encryption methods of the second storage area; and
forbid, in the case of which the information of encryption methods of the first storage area does not match with the information of encryption methods of the second storage area, correlation of the first storage area and the second storage area with each other, and notify the host computer that has given the instruction to correlate the first storage area and the second storage area.

9. A state control method for a computer system having a host computer and at least one storage system coupled to the host computer via a network, the host computer having a first interface coupled to the network, a first processor coupled to the first interface, and a first memory coupled to the first processor, each storage system of the at least one storage system respectively having a second interface coupled to the network, a second processor coupled to the second interface, and a second memory coupled to the second processor, each storage system of the at least one storage system respectively provides a plurality of storage areas where data written from the host computer is stored, the plurality of storage areas of each storage system including at least one encrypted storage area storing data that needs protection by encryption and at least one plaintext storage area storing data that does not need protection by encryption,
the state control method comprising:
encrypting, by a first storage system of the at least one storage system, in the case of reception of a request to write data in an encrypted storage area from the host computer, the data requested to be written with an encryption key that is assigned to the encrypted storage area, and writing the encrypted data in the encrypted storage area;
receiving, by the first storage system, an instruction indicating a type of storage area the host computer is allowed to use;
if the type of storage area indicated by the received instruction is encrypted only, controlling by the first storage system to only allow the host computer to use the at least one encrypted storage area provided by the first storage system;
if the type of storage area indicated by the received instruction is both encrypted and plaintext, controlling by the first storage system to allow the host computer to use either of the at least one encrypted storage area and the at least one plaintext storage area provided by the first storage system;
writing, by the first storage system, in the case of reception of a request to write data that does not need protection from the host computer that does not specify a storage area, the data requested to be written in, if the type of storage area indicated by the received instruction is encrypted only, the at least one encrypted storage area provided by the first storage system or, if the type of storage area indicated by the received instruction is both encrypted and plaintext, either of the at least one encrypted storage area and the at least one plaintext storage area provided by the first storage system;
determining, by the first storage system, upon reception of a state change request from the host computer for a storage area provided by the first storage system, whether to change a state of the storage area in accordance with the state change request;
managing, by the first storage system, protection information for each of the at least one encrypted storage area provided by the first storage system that indicates whether any data that needs protection is currently stored in the encrypted storage area; and
referencing, by the first storage system, the protection information for an encrypted storage area provided by the first storage system in determining whether to change the state of the encrypted storage area based on a state change request from the host computer for the encrypted storage area.

10. The state control method according to claim 9, further comprising the steps of: receiving, by the first storage system from the host computer or another computer, about mixing settings that indicate whether to allow or forbid inclusion of a plaintext storage area and an encrypted storage area within a first storage area provided by the storage system; and
judging, by the first storage system, based on the received instruction about the mixing settings, whether to provide the host computer with the first storage area in a state where an encrypted storage area and a plaintext storage area are included within the first storage area, and judge whether to notify the host computer that has given the instruction of inclusion of an encrypted storage area and a plaintext storage area within the first storage area.

11. The state control method according to claim 10, wherein the plurality of storage areas provided by each of the at least one storage system further includes a second storage area, and wherein the state control method further comprises the steps of:
referencing, by the first storage system, mixing settings that indicate whether to allow or forbid inclusion of a plaintext storage area and an encrypted storage area within the second storage area upon receiving a correlation instruction to correlate the first storage area and the second storage area with each other;
judging, by first one storage system, whether the second storage area correlated to the first storage area according to the received correlation instruction is in a state that conforms to the mixing settings of the second storage area;
allowing, by first one storage system, correlation of the first storage area and the second storage area with each other if the second storage area is in a state that conforms to the mixing settings of the second storage area; and
forbidding, by first one storage system, if the second storage area is in a state that does not conform to the mixing settings of the second storage are, correlation of the first storage area and the second storage area with each other, and notifying the host computer.

12. The state control method according to claim 11, further comprising the steps of:
   judging, by the first storage system, whether any second storage area is correlated to the first storage area whose state is instructed to be changed if the storage system receives an instruction to change the state of the first storage area;
   referencing, by the first storage system, to the mixing settings of the first storage area and the mixing settings of the second storage area and a state of the second storage area to judge whether to allow the state change of the first storage area if there is a second storage area that is correlated to the first storage area whose state is instructed to be changed;
   forbidding, by the first storage system, the state change of the first storage area and issue an alert to the host computer that has given the instruction upon determining that, as a result of the judging, that the state of the first storage area and the state of the second storage area after the change do not conform to the mixing settings of the first storage area and the mixing settings of the second storage area;
   judging, by the first storage system, whether to allow the state change of the first storage area according to the mixing settings of the first storage area if there is no second storage area correlated to the first storage area whose state is instructed to be changed; and
   forbidding, by the first storage system, the state change of the first storage area, and notify the host computer that has given the instruction upon determining that, as a result of the judging, that the state of the first storage area after the change does not conform to the mixing settings of the first storage area.

13. The state control method according to claim 12, further comprising the step of changing, by first one storage system, the state of the second storage area that is correlated to the first storage area whose state is to be changed according to the mixing settings of the second storage area in the case of which the state of the first storage area is changed.

14. The state control method according to claim 13, further comprising the step of providing, by the first storage system, the host computer that has given the instruction of a mixed state with management information including the state of the first storage area, the mixing settings of the first storage area and the mixing settings of the second storage area, and the type of available storage area.

15. The state control method according to claim 11, wherein the state control method further comprises the steps of:
   referencing, by the first storage system, the protection information in the case of judging whether to change the state of the first storage area and whether to correlate the first storage area and the second storage area; and
   forbidding, by the first storage system, when the protection information indicates that the encrypted storage area is storing data that needs protection, a state change of the first storage area from encrypted to plaintext, reference the mixing settings of the first storage area and the mixing settings of the second storage area and the state of the first storage area and the state of the second storage area to allow or forbid correlation of the first storage area and the second storage area with each other, and notifying the host computer that has given the instruction.

16. The state control method according to claim 11, wherein the first storage system manages the information of encryption methods which are used to encrypt data stored in the first storage area, and wherein the state control method further comprises the steps of:
   referencing, by the first storage system, the information of encryption methods when judging whether to allow inclusion of an plaintext storage area and an encrypted storage area within the first storage area;
   prohibiting, by the first storage system, using more than one of a plurality of encryption methods in the first storage area and notify the host computer that has given the instruction about the mixing settings if the information of encryption methods includes settings that forbid using more than one of the plurality of encryption methods in the first storage area;
   judging, by the first storage system, whether the information of encryption methods of the first storage area matches with the information of encryption methods of the second storage area upon judging whether to allow correlation of the first storage area and the second storage area with each other;
   allowing, by the first storage system, correlation of the first storage area and the second storage area with each other in the case of which the information of encryption methods of the first storage area match with the information of encryption methods of the second storage area; and
   forbidding, by the first storage system, in the case of which the information of encryption methods of the first storage area does not match with the information of encryption methods of the second storage area, correlation of the first storage area and the second storage area with each other, and notifying the computer that has given the instruction to correlate the first storage area and the second storage area.

17. A computer coupled to a host computer and to a storage subsystem having a storage device, comprising:
   a first interface coupled to the host computer;
   a second interface coupled to the storage subsystem;
   a processor coupled to the first interface and the second interface; and
   a memory coupled to the processor, wherein the computer provides, by way of the storage device in the storage subsystem, a plurality of storage areas where data written from the host computer is stored,
   wherein the plurality of storage areas includes at least one encrypted storage area storing data that needs protection by encryption and at least one plaintext storage area storing data that does not need protection by encryption,
   wherein, upon receiving a request to write data in an encrypted storage area from the host computer, the storage device encrypts the data requested to be written with an encryption key that is assigned to the encrypted storage area, and writes the encrypted data in the encrypted storage area,
   wherein the computer receives an instruction indicating a type of storage area the host computer is allowed to use,
   if the type of storage area indicated by the received instruction is encrypted only, the computer only allows the host computer to use the at least one encrypted storage area provided via the storage device,
   if the type of storage area indicated by the received instruction is both encrypted and plaintext, the computer allows the host computer to use either of the at least one encrypted storage area and the at least one plaintext storage area provided via the storage device, wherein the computer, in the case of reception of a request to write data that does not need protection from the host computer that does not specify a storage area, writes the data requested to be written in, if the type of storage area indicated by the received instruction is encrypted only, the at least one encrypted storage area provided by the storage device or, if the type of storage area indicated by the received instruction is both encrypted and plaintext, either of the at least one encrypted storage area and the at least one plaintext storage area provided by the storage device, wherein the computer, upon reception of a state change request from the host computer for a storage area provided by the storage device, determines whether to change a state of the storage area in accordance with the state change request, wherein the computer manages protection information for each of the at least one encrypted storage area provided by the storage device that indicates whether any data that needs protection is currently stored in the encrypted storage area, and wherein the computer references the protection information for an encrypted storage area provided by the storage device in determining whether to change the state of the encrypted storage area based on a state change request from the host computer for the encrypted storage area.

18. The computer according to claim 17, wherein the computer is configured to:

receive an instruction about mixing settings that indicate whether to allow or forbid inclusion of a plaintext storage area and an encrypted storage area within a first storage area from the host computer or another computer; and judge, based on the received instruction about the mixing settings, whether to provide the host computer with the first storage area in a state where an encrypted storage area and a plaintext storage area are included within the first storage area, and judge whether to notify the host computer that has given the instruction of inclusion of an encrypted storage area and a plaintext storage area within the first storage area.

19. The computer according to claim 18, wherein the plurality of storage areas further includes a second storage area, and wherein the computer is further configured to:

reference mixing settings that indicate whether to allow or forbid inclusion of a plaintext storage area and an encrypted storage area within the second storage area upon receiving a correlation instruction to correlate the first storage area and the second storage area with each other;

judge whether the second storage area correlated to the first storage area according to the received correlation instruction is in a state that conforms to the mixing settings of the second storage area;

allow correlation of the first storage area and the second storage area with each other if the second storage area is in a state that conforms to the mixing settings of the second storage area;

and forbid, if the second storage area is in a state that does not conform to the mixing settings of the second storage are, correlation of the first storage area and the second storage area with each other, and notify the host computer.

20. The computer according to claim 18, wherein the computer is further configured to:

manage information of encryption methods which are used to encrypt data stored in the first storage area;

judge, upon receiving mixing settings that indicate whether to allow inclusion of an plaintext storage area and an encrypted storage area, based on the received instruction about the mixing settings whether to provide the host computer with the first storage area in a state where the encrypted storage area and the plaintext storage area are mixed, and reference the information of encryption methods;

using more than one of a plurality of encryption methods in the first storage area and notify the host computer that has given the instruction about the mixing settings if the information of encryption methods includes settings that forbid using more than one of the plurality of encryption methods in the first storage area;

reference, upon receiving a correlation instruction to correlate the first storage area and the second storage area with each other, mixing settings that indicate whether to allow mixing of a plaintext storage area and an encrypted storage area in the second storage area, and judge whether the second storage area correlated to the first storage area according to the received correlation instruction is in a state that conforms to the mixing settings of the second storage area are;

judge whether the information of encryption methods of the first storage area matches with the information of encryption methods of the second storage area upon judging whether to allow correlation of the first storage area and the second storage area with each other;

allow correlation of the first storage area and the second storage area with each other in the case of which the information of encryption methods of the first storage area match with the information of encryption methods of the second storage area; and forbid, in the case of which the information of encryption methods of the first storage area does not match with the information of encryption methods of the second storage area, correlation of the first storage area and the second storage area with each other, and notify the host computer that has given the instruction to correlate the first storage area and the second storage area.

* * * * *